US010296880B2

(12) United States Patent
Miller

(10) Patent No.: US 10,296,880 B2
(45) Date of Patent: May 21, 2019

(54) INVOICE ANALYTICS SYSTEM

(71) Applicant: Lisa Therese Miller, Belmar, NJ (US)

(72) Inventor: Lisa Therese Miller, Belmar, NJ (US)

( * ) Notice: Subject to any disclaimer, the term of this patent is extended or adjusted under 35 U.S.C. 154(b) by 0 days.

(21) Appl. No.: 15/817,353

(22) Filed: Nov. 20, 2017

(65) Prior Publication Data

US 2018/0144314 A1 May 24, 2018

Related U.S. Application Data

(60) Provisional application No. 62/424,559, filed on Nov. 21, 2016.

(51) Int. Cl.
*G06Q 20/00* (2012.01)
*G06Q 20/14* (2012.01)
*G06Q 20/40* (2012.01)
*G06F 3/0482* (2013.01)
*G06Q 10/04* (2012.01)

(52) U.S. Cl.
CPC ............ *G06Q 20/14* (2013.01); *G06Q 20/405* (2013.01); *G06F 3/0482* (2013.01); *G06Q 10/04* (2013.01)

(58) Field of Classification Search
None
See application file for complete search history.

(56) References Cited

U.S. PATENT DOCUMENTS

| | | |
|---|---|---|
| 8,326,709 B1 | 12/2012 | Spreng et al. |
| 8,326,754 B2 | 12/2012 | Bandych et al. |
| 2003/0115080 A1* | 6/2003 | Kasravi ................... G06F 17/27 715/254 |
| 2008/0065439 A1 | 3/2008 | Daren et al. |
| 2008/0177615 A1* | 7/2008 | Chen-Ritzo ........ G06Q 10/0635 705/7.28 |
| 2010/0106653 A1* | 4/2010 | Sandholm .............. G06Q 10/04 705/80 |
| 2012/0053987 A1 | 3/2012 | Satyavolu et al. |
| 2012/0116788 A1* | 5/2012 | Dukes .................... G06Q 10/06 705/1.1 |
| 2014/0039984 A1 | 2/2014 | Sharma et al. |

(Continued)

OTHER PUBLICATIONS

International business machines investor briefing—final. (May 9, 2012). Fair Disclosure Wire. (Year: 2012).*

*Primary Examiner* — Abby J Flynn
(74) *Attorney, Agent, or Firm* — Ashok Tankha; Lipton, Weinberger, & Husick

(57) ABSTRACT

A method and an invoice analytics system (IAS) for analyzing an entity's business service transactional invoice data (BSTID) and performing invoice analytics (IA) in real time are provided. The IAS extracts contract line item (CLI) data from contracts and stores the CLI data in a CLI database. The IAS transforms the CLI data into a quick view format and generates a contract quick view interface that displays the CLI data on an entity device. The IAS extracts and segments invoice line item (ILI) data from aggregated BSTID, stores the ILI data in an ILI database, and reconciles the invoices in accordance with the contracts by identifying and rectifying errors and off-contract business service items. The IAS performs IA on the ILI data for computing cost savings and generates an interactive, dynamic, and searchable IA report including graphical data representations of purchase patterns, outliers, variations, and predictive analytics for the entity.

17 Claims, 67 Drawing Sheets

(56) References Cited

U.S. PATENT DOCUMENTS

| | | |
|---|---|---|
| 2015/0348213 A1 | 12/2015 | Mohanty et al. |
| 2015/0379026 A1* | 12/2015 | Todd .................... G06F 16/125 |
| | | 707/694 |
| 2016/0253364 A1* | 9/2016 | Gomadam ............ G06F 16/353 |
| | | 707/739 |
| 2017/0004411 A1* | 1/2017 | Hassan ............... G06F 16/2462 |
| 2017/0177608 A1* | 6/2017 | Cismas ............. G06F 17/30165 |

\* cited by examiner

| PROFESSIONAL SERVICES FOR THE PERIOD: 06/01/16 TO 03/30/16 | | | |
|---|---|---|---|
| PROFESSIONAL PERSONNEL | HOURS | UNIT PRICE | TOTAL |
| PRINCIPAL III<br>JIM FLOOR | 4.00 | 160.00 | 640.00 |
| ASSOCIATE II<br>STAN BYMEE | 28.00 | 130.00 | 3,640.00 |
| SENIOR ENGINEER/PLANNER III<br>MARY KRISSMAS | 11.00 | 120.0 | 1,320.00 |
| TECHNICIAN I<br>PHILINBLANK | 18.00 | 100.00 | 1,800.00 |
| ADMINISTRATIVE ASSISTANT IV<br>SUZY QUEUE | 1.00 | 80.00 | 80.00 |
| TOTALS | 62.00 | | 7,480.00 |
| TOTAL LABOR EXPENSE | | | 7,480.00 |
| REIMBURSABLE EXPENSES | | | |
| EXAMPLE SUBCONSULTANT FIRM | | | 5,100.10 |
| DATA COLLECTION SERVICES | | | 1,200.00 |
| PROJECT REPRODUCTION | | | 40.00 |
| MILEAGE | | | 99.90 |
| LODGING | | | 293.84 |
| PER DIEM | | | 147.50 |
| TOTAL REIMBURSABLES | | 6,881.34 | 6,881.34 |
| TOTAL CURRENT INVOICE | | | $14,361.34 |

FIG. 4

| ◄ ◄ | 1 | OF | 1 | ► ►| | INVOICES ▼ |

TOTAL SCOPE MANAGEMENT SYSTEM　　　PAGE: 1
SCOPE REPAIR HISTORY
ABC HOSPITAL
ACCOUNTS PAYABLE
FROM 01/01/2016 TO 12/31/2016

SERIAL NUMBER AND MODEL

123456　　　　　　XYZ 659847
PICKUPDATE: 03/22/2016　　INVOICE DATE: 03/23/2016　　0.00
COMPLAINT: BLURRY IMAGE

| REPAIR ITEM DESCRIPTION | (APPR?) |
|---|---|
| !STANDARD RIGID REPAIR LEVEL 1 | N |
| !DISASSEMBLED AND INSPECTED | Y |
| CLEAN AND SECURE LENS TRAIN | N |
| COMPLETE SOAK TEST (HOT/COLD LIQUID) | N |
| NO REPAIRS PERFORMED | Y |

CUSTOMER DENIES REPAIRS

| OCULAR CENTRATION REPAIR | N |
| OPTICAL/LIGHT FIBER POLISH AND BOND | N |
| REPLACE UPTO (8) ROD/ACHROMATIC 1 | N |

FIG. 5C

| ◀◀ ◀ 1 OF 1 ▶ ▶▶  INVOICES ▼ |

TOTAL SCOPE MANAGEMENT SYSTEM  PAGE: 1
SCOPE REPAIR HISTORY
ABC HOSPITAL
ACCOUNTS PAYABLE
FROM 01/01/2016 TO 12/31/2016

SERIAL NUMBER AND MODEL

123456  XYZ 659847

PICKUPDATE: 03/22/2016  INVOICE DATE: 03/23/2016  0.00

COMPLAINT: BLURRY IMAGE

REPAIR ITEM DESCRIPTION  (APPR?)

| !STANDARD RIGID REPAIR LEVEL 1 | Y |
| DISASSEMBLED AND INSPECTED | N |
| CLEAN AND SECURE LENS TRAIN | Y |
| COMPLETE SOAK TEST (HOT/COLD LIQUID) | Y |
| NO REPAIRS PERFORMED | N |

CUSTOMER DENIES REPAIRS

| OCULAR CENTRATION REPAIR | Y |
| OPTICAL/LIGHT FIBER POLISH AND BOND | Y |
| REPLACE UPTO (8) ROD/ACHROMATIC 1 | Y |

FIG. 5G

| GROUP/CATEGORY | DETAILS/COMMENTS | | QTY/PRICE | | AMOUNT | SALES TAX | TOTAL |
|---|---|---|---|---|---|---|---|
| BILLING PERIOD (SERVICE) | 11/27/2016 TO 12/26/2016 | | | | | | |
| BILLING PERIOD (VARIABLE) | 10/27/2016 TO 11/26/2016 | | | | | | |
| BILLING PERIOD (USAGE) | 10/27/2016 TO 11/26/2016 | | | | | | |
| SUMMARY | | | | | 74,100.63 | 0.00 | 74,100.63 |
| USAGE | CONSOLIDATED CONTRACTUAL AMOUNT (CCA) | | 1 | 46,866.9 | 46,866.97 | 0.00 | 46,866.97 |
| | USAGE-BLACK AND WHITE (UBW) | | 73594 | 0.004 | 294.37 | 0.00 | 294.37 |
| | USAGE-COLOR | | 446140 | 0.045 | 20,076.31 | 0.00 | 20,076.31 |
| | USAGE-TOTAL | | 129196 | 0.004 | 516.78 | 0.00 | 516.78 |
| MS JOB BASED CHARGES (MSJBC) | | | 1 | 6,379.95 | 6,379.95 | 0.00 | 6,379.95 |
| WASTE COPIES | | | 1 | -33.75 | -33.75 | 0.00 | -33.75 |
| | | | | TOTAL AMOUNT | 74,100.63 | 0.00 | 74,100.63 |

| NO | ORDER NO | POS | QUANTITY | QU | AMOUNT | D-RATE | D-AMOUNT | SURCHARGE | PU | TOTAL AMOUNT | ARTICLE NO | ARTICLE TEXT |
|---|---|---|---|---|---|---|---|---|---|---|---|---|
| 1 | | | 1 | EA | 46,866.97 | | 0.00 | 0.00 | 1 | 46,866.97 | | CCA |
| 2 | | | 73594 | EA | 294.37 | | 0.00 | 0.00 | 1 | 294.37 | | UBW |
| 3 | | | 446140 | EA | 20,076.31 | | 0.00 | 0.00 | 1 | 20,076.31 | | USAGE-COLOR |
| 4 | | | 129196 | EA | 516.78 | | 0.00 | 0.00 | 1 | 516.78 | | USAGE-TOTAL |
| 5 | | | 1 | EA | 6,379.95 | | 0.00 | 0.00 | 1 | 6,379.95 | | MSJBC |
| 6 | | | 1 | EA | -33.75 | | 0.00 | 0.00 | 1 | -33.75 | | WASTE COPIES |

| | INVOICE | |
|---|---|---|
| REMIT TO:<br>VENDOR1<br>ADDRESS<br>PHONE NUMBER | DATE<br>04/25/2016 | NUMBER<br>04160760 |
| | DUE DATE<br>UPON RECEIPT | CUST #<br>531041 |
| | INVOICE AMOUNT<br>$398.00 | AMOUNT REMITTED |

SOLD TO:
ABC
ADDRESS

FOR:
XYZ
ADDRESS

MAKE ALL CHECKS PAYABLE TO: VENDOR1
RETURN THIS PORTION WITH YOUR PAYMENT

VENDOR1
ADDRESS
PHONE NUMBER

SOLD TO:
ABC
ADDRESS

FOR:
XYZ
ADDRESS

| INVOICE NO | DATE | CUST NO | SLSMN NO | PO NUMBER | | DUE DATE |
|---|---|---|---|---|---|---|
| | 04/25/2016 | | | | | UPON RECEIPT |
| QUANTITY | DESCRIPTION | | | | UNIT PRICE | EXTENDED PRICE |
| 1 | 4/25/16 – GENERAL CLEANING OF ABC OFFICE ON MARCH 9, 16 & 30 AND APRIL 6, 13 & 20 | | | | 398.00 | 398.00 |
| | | | | | AMOUNT OF SALE | $ 398.00 |
| | | | | | SALES TAX | $ 0.00 |

FILE  SESSION  IMAGE VIEW  NAVIGATION  TOOLS  WINDOW  HELP

SESSION VIEW
- OPEN
- SCAN

COMPLETED AP INVOICE

INDEXED AP INVOICE

2 PAGES IN 2 DOCUMENTS
ADOBE PDF (PDF) — 707

FORM VIEW - VIA HEALTH #1

| Field | Value |
|---|---|
| VENDOR | VENDOR1 |
| DATE | 1/1/2016 |
| REF NO | 1234 |
| PO N | 2019482 |
| SUBTOTAL | 34116.23 |
| TAX | 0.00 |
| SHIPPING AND HANDLING | |
| AMOUNT DUE | 34116.23 |

| ITEM | DESCRIPTION | QTY | UNIT PRICE | LINE TOTAL | CATEGORY | SUB TABLE |
|---|---|---|---|---|---|---|
| | Monthly Service Fee | 1 | 15205 | 15205 | | |
| | Monthly Service Fee | 1 | 853 | 853 | | |

ZOOM VIEW

296008

IMAGE VIEW — 701, 801

INVOICE

SOLD TO         FOR

→ 705
→ 802
→ 703
→ 706

| SOLD TO:<br>ABC<br>ADDRESS | REMIT TO:<br>VENDOR1<br>ADDRESS | | INVOICE | |
|---|---|---|---|---|
| | | | DATE<br>01/01/2016 | NUMBER<br>1234 |
| | FOR:<br>GHI | | DUE DATE<br>01/31/2016 | PURCHASE<br>ORDER NO<br>2019842 |
| | | | AMOUNT<br>REMITTED | |
| | MAKE ALL CHECKS PAYABLE TO: VENDOR1<br>RETURN THIS PORTION WITH YOUR PAYMENT | | | |

VENDOR1, ADDRESS

BILLING FOR JANUARY 2016

| CUSTOMER NO. | SERVICE LOCATION | ITEM DESCRIPTION | QUANTITY | PRICE ($) | EXTENDED AMOUNT ($) |
|---|---|---|---|---|---|
| | Location1 | 1 Monthly service fee | | 15,205.00 | 15,250.00 |
| | Location2 | 2 Monthly service fee | | 853.00 | 853.00 |
| | Location3 | 3 Monthly service fee | | 1,540.00 | 1,540.00 |
| | Location4 | 4 Monthly service fee | | 652.00 | 652.00 |
| | Location5 | 5 Monthly service fee | | 1,708.99 | 1,708.99 |
| | Location6 | 6 Monthly service fee | | 2,880.00 | 2,880.00 |
| | Location7 | 7 Monthly service fee | | 1,500.00 | 1,500.00 |
| | Location8 | 8 Monthly service fee | | 910.00 | 910.00 |
| | Location9 | 9 Monthly service fee | | 2,367.24 | 2,367.24 |
| | Location10 | 10 Day porter fee | | 5,200.00 | 5,200.00 |
| | Location11 | 11 Day porter fee | | 1,300.00 | 1,300.00 |
| | | AMOUNT OF SALE | | | $34,116.23 |
| | | SALES TAX | | | $0.00 |
| | | TOTAL | | | $34,116.23 |

PURCHASE ORDER# 2019482

| | | | | | |
|---|---|---|---|---|---|
| FILE SESSION IMAGE VIEW NAVIGATION TOOLS WINDOW HELP | | | | | |

FORM VIEW - VIA HEALTH #1

SESSION VIEW
- OPEN
- SCAN

COMPLETED AP INVOICE

COMPLETED AP INVOICE

COMPLETED AP INVOICE

VENDOR: VENDOR2
DATE: 7/31/2016
REF NO: 4006-482737
PO N:
SUBTOTAL: 12784.21
TAX: 0.00
SHIPPING AND HANDLING:
AMOUNT DUE: 22587.42

IMAGE VIEW

INVOICE

SOLD TO                 FOR

| ITEM | DESCRIPTION | QTY | UNIT PRICE | LINE TOTAL | CATEGORY | SUB TABLE |
|---|---|---|---|---|---|---|
| T0010 | MONTHLY FEE RECYCLING | 1 | 95.190 | 95.19 | | |
| 877331 | ADMINISTRATIVE FEES | 1 | 6.000 | 6.00 | | |

701, 901, 705, 703, 902, 707

| VENDOR2 | PHONE NUMBER | | | | |
|---|---|---|---|---|---|
| ABC | | CUSTOMER #: 2107822 | INVOICE#: 4006482737 | INVOICE DATE#: 07/31/2016 | PAGE 2 OF 6 |
| DATE | MANIFEST/ORDER NUMBER | QUANTITY/ CONTAINERS | DESCRIPTION | WEIGHT | PRICE | TOTAL |

SITE 001: CLINIC 1, ADDRESS

| 07/01/2016 | | 1.00 | MONTHLY FEE RECYCLING | 0.00LB | $95.190 EA | $95.19 |
| | | | SITE 001 SUB TOTAL | | | $0.00 |
| | | | SITE 001 TAX TOTAL | | | $0.00 |
| | | | SITE 001 TOTAL | | | $95.19 |

SITE 002: CLINIC 2, ADDRESS

| 07/01/2016 | T0010877331 | 1.00 | ADMINISTRATIVE FEES | 0.00LB | $56.000 EA | 56.00 |
| | | | SITE 002 SUB TOTAL | | | $0.00 |
| | | | SITE 002 TAX TOTAL | | | $0.00 |
| | | | SITE 002 TOTAL | | | $56.00 |

IF CURRENT ACCOUNT INFORMATION HAS CHANGED, PLEASE ENTER THE CORRECT INFORMATION

BILLING INFORMATION CHANGE    SERVICE INFORMATION CHANGE

ACCOUNT NAME

CONTACT        ADMIN    SAFETY OSHA    OTHERS

EMAIL

| VENDOR2 | PHONE NUMBER | | | | | |
|---|---|---|---|---|---|---|
| ABC | | CUSTOMER #: | 123 | INVOICE #: 4006-482737 | INVOICE DATE#: 07/31/2016 | PAGE 3 OF 6 |
| DATE | MANIFEST/ORDER NUMBER | QUANTITY/ CONTAINERS | DESCRIPTION | WEIGHT | PRICE | TOTAL |
| SITE 005: CLINIC 5, ADDRESS | | | | | | |
| 07/01/2016 | T001087734 | 1.00 | FUEL SURCHARGE | 0.00LB | $15.30 EA | $15.30 |
| | | | SITE 005 SUB TOTAL | | | $0.00 |
| | | | SITE 005 TAX TOTAL | | | $0.00 |
| | | | SITE 005 TOTAL | | | $15.30 |
| SITE 006: CLINIC 6, ADDRESS | | | | | | |
| 07/01/2016 | | 1.00 | LQ DOT ONLINE TRAINING | 0.00LB | $0.00 EA | 0.00 |
| | | | SITE 006 SUB TOTAL | | | $0.00 |
| | | | SITE 006 TAX TOTAL | | | $0.00 |
| | | | SITE 006 TOTAL | | | $0.00 |
| SITE 007: CLINIC 7, ADDRESS | | | | | | |
| 07/01/2016 | T001087735 | 1.00 | ADMINISTRATIVE FEES | 0.00LB | $5.000 EA | $5.00 |
| 07/01/2016 | | 1.00 | MONTHLY FEE FRONT LOAD SERVICE | 0.00LB | $257.580 | $257.58 |

INVOICE

SOLD TO

FOR

| | | 701 |
| | | 1101 |
| | | 705 |
| | | 703 |
| | | 1102 |

VENDOR: VENDOR2
DATE: 7/31/2017
REF NO: 4006482707
PO N:
ADDRESS: ADDRESS
SUBTOTAL: 1130.96
TAX: 0.00
SHIPPING AND HANDLING:
AMOUNT DUE: 3361.97

| ADD | DESCRIPTION | QTY | UNIT PRICE | DB PRICE | LINE TOTAL | CATEGORY |
|---|---|---|---|---|---|---|
| | PREVIOUS BALANCE | | | 0.00 | 2231.01 | |
| | CURRENT ADJUS | | | 0.00 | 0.00 | |

FIG. 11B

| CUSTOMER ID NAME: | | | INVOICE NUMBER: ← 1201 INVOICE DATE: 03/31/2017 | |
|---|---|---|---|---|
| DESCRIPTION | QTY | RATE | AMOUNT | |
| STORAGE LF,MEDICAL 04/01/2017 | 4831.00 | 0.872 | 4212.63 | |
| STORAGE, REGULAR 04/01/2017 | 1255.20 | 0.375 | 470.70 | |
| TOTAL STORAGE | | | 4683.33 | |
| OPEN SHELF RETRIEVAL | 3.00 | 0.000 | 0.00 | |
| TRANSPORTATION HANDLING | 2.20 | 0.000 | 0.00 | |
| TRIP CHARGE, HALF DAY DELIVERY | 2.00 | 0.000 | 0.00 | |
| TOTAL SERVICE | | | 0.00 | |
| RECORDS TRANSMITTAL FORMS, 3PART | 1.00 | 0.000 | 0.00 | |
| TOTAL SUPPLIES | | | 0.00 | |
| ADMINISTRATION FEE | 1.00 | 64.100 | 64.10 | |
| TOTAL OTHER | | | 64.10 | |
| SUB TOTAL | | | 4747.43 | |
| INVOICE AMOUNT DUE | | | 4747.43 ← 1202 | |

FIG. 12A

| CUSTOMER ID NAME: | | | INVOICE NUMBER:<br>INVOICE DATE: 03/31/2017 | |
|---|---|---|---|---|
| DESCRIPTION | | QTY | RATE | AMOUNT |
| STORAGE LF,MEDICAL 04/01/2017 | | 4831.00 | 0.872 | 4212.63 |
| STORAGE, REGULAR 04/01/2017 | | 1255.20 | 0.375 | 470.70 |
| TOTAL STORAGE | | | | 4683.33 |
| OPEN SHELF RETRIEVAL | | 3.00 | 0.000 | 0.00 |
| TRANSPORTATION HANDLING | | 2.20 | 0.000 | 0.00 |
| TRIP CHARGE,HALF DAY DELIVERY | | 2.00 | 0.000 | 0.00 |
| TOTAL SERVICE | | | | 0.00 |
| RECORDS TRANSMITTAL FORMS, 3 PART | | 1.00 | 0.000 | 0.00 |
| TOTAL SUPPLIES | | | | 0.00 |
| ADMINISTRATION FEE | | 1.00 | 64.100 | 64.10 |
| TOTAL OTHER | | | | 64.10 |

| No. | PosDescription | PosQty | PosRate | PosAmount | PosSection |
|---|---|---|---|---|---|
| | STORAGE LF,MEDICAL 04/01/2017 | 4831.00 | 0.872 | 4212.63 | STORAGE |
| | STORAGE, REGULAR 04/01/2017 | 1255.20 | 2.20 | 470.70 | STORAGE |
| | OPEN SHELF RETRIEVAL | 3.00 | 2.00 | 0.00 | SERVICE |
| | TRANSPORTATION HANDLING | 2.20 | | 0.00 | SERVICE |
| | TRIP CHARGE,HALF DAY DELIVERY | 2.00 | 0.000 | 0.00 | SERVICE |
| | RECORDS TRANSMITTAL FORMS, 3PART | 1.00 | 0.000 | 0.00 | SUPPLIES |
| | ADMINISTRATION FEE | 1.00 | 64.100 | 64.10 | OTHER |

FIG. 12C

| INVOICE NUMBER | INVOICE DATE MONTH/DATE/YEAR | SHIP TO NUMBER | SHIP TO | CATEGORY | MATERIAL NUMBER | CONTRACT PRICE | UNIT PRICE | QTY SHIPPED | AMOUNT |
|---|---|---|---|---|---|---|---|---|---|
|  | AUG 31, 2017 |  |  | BULK – FACILITY FEE | RNTBULKACC |  | $670.00 | 2.0 | $670.00 |
|  | AUG 31, 2017 |  |  | BULK – MISC FEE | ALMEDICALBUL |  |  | 1.0 | $0.00 |
|  | SEP 01, 2017 |  |  | CYLINDER-GAS | NI NF230LT22 |  |  | 3.0 | $155.58 |
|  | SEP 05, 2017 |  |  | CYLINDER-GAS | NI NF230LT22 |  |  | 1.0 | $51.86 |
|  | SEP 06, 2017 |  |  | CYLINDER-MISC FEES | ENERGY SURCHARGE |  |  |  | $2.86 |
|  | SEP 07, 2017 |  |  | CYLINDER-GAS | CY-Z02HE7012003 |  |  | 0.0 | $0.00 |

1501 → UNIT PRICE

FIG. 15

| BREAKOUT OF SAVINGS LINE ITEMS | | | | | | | | | |
|---|---|---|---|---|---|---|---|---|---|
| DESCRIPTION | QTY | PRICE | EXTENDED AM.. | BIC | BIC IMPACT | BIC SAVINGS | MC | MC IMPACT | MC SAVINGS |
| ANTIBODY SCREEN | 474 | | 19,671 | | 0 | 9,243 | | 0 | 5,451 |
| SALINE REPLACEMENT | 2 | | 107 | | 1 | 71 | | 1 | 57 |
| ABO RH | 335 | | 10,720 | | 1 | 5,695 | | 0 | 4,020 |
| DAT IGG | 5 | | 108 | | 0 | 33 | | 0 | 18 |
| DAT POLY | 15 | | 323 | | 0 | 98 | | 0 | 53 |
| DAT POLY RXN | 1 | | 22 | | 0 | 7 | | 0 | 4 |
| RECOLLECT FEE | 3 | | 78 | | 0 | 33 | | 0 | 0 |
| ELECTRONIC CROSSMATCH | 501 | | 20,040 | | 1 | 13,026 | | 0 | 6,012 |
| DELIVERY FEE | 4 | | 120 | | | | | | |
| PICK UP | 370 | | 19,107 | | | | | | |

| LINE | ITEM | DELIVERY UNIT | NAME/DESCRIPTION | SIZES | MON 10/10 | TUE 10/11 | WED 10/12 | THU 10/13 | FRI 10/14 | SAT 10/15 | SUN 10/16 | ICMRDEDIT | TOTAL | PRICE | AMOUNT |
|---|---|---|---|---|---|---|---|---|---|---|---|---|---|---|---|
| 11 | 2320 | PBS | GOWN, OBESE IV 5XL AZTEC | | | | | | | | | | 70 | 1.1465 | $80.20 |
| 12 | 2330 | PBS | GOWN, OBESE IV 10XL GRY PRN | | 10 | | | | | 10 | | | 20 | 1.4066 | $26.14 |
| 13 | 3220 | PBS | BABY T-SHIRT, LS W/CUFF | | 20 | 30 | 30 | 30 | 30 | 30 | | | 170 | 0.5623 | $91.60 |
| 14 | 3310 | PBS | BABY BLANKET | | 80 | 100 | 100 | 100 | 50 | | | | 430 | 0.4509 | $163.89 |

DATE: 10/16/2016  INVOICE: 73954  DAY: SUN  FREQ: 8  TERM: CHG  ACCOUNT: 9300-09307  ROUTE: 26

| NO | QUANTITY | AMOUNT | D-RATE | D-AMOUNT | SURCHARGE | PU | TOTAL AMOUNT | ARTICLE NO. | ARTICLE TEXT | PosSite |
|---|---|---|---|---|---|---|---|---|---|---|
| 1 | 70 | 1.1465 | | 0.00 | 0.00 | 1 | 80.2 | 1310 | GOWN, OBESE IV 5XL AZTEC | <EMPTY> |
| 2 | 20 | 1.4066 | | 0.00 | 0.00 | 1 | 26.14 | 1320 | GOWN, OBESE IV 10XL GRY PRN | <EMPTY> |
| 3 | 170 | 0.5623 | | 0.00 | 0.00 | 1 | 91.60 | 1340 | BABY T-SHIRT, LS W/CUFF PRN | <EMPTY> |

FIG. 18

EXHIBIT B

| TEST | CPT | FEES |
|---|---|---|
| 91 IDENTIFICATION, | 87088 | $20.00 |
| ADMISSION SURVEILLANCE SCREEN:C.DIFF AG PCR/TOXIN A | 87324 | $38.25 |
| ADMISSION SURVEILLANCE SCREEN:MRSA SCREEN | 87081 | $10.75 |
| ADMISSION SURVEILLANCE SCREEN:SPUTUM CULTURE AND GRAM STAIN | 87070 | $13.97 |
| ADMISSION SURVEILLANCE SCREEN:VRE SCREEN | 87081 | $10.75 |
| ADMISSION SURVEILLANCE SCREEN:WOUND CULTURE | 87070 | $13.97 |
| AFB CULTURE AND SMEAR | 87015, 87116, 87206 | $37.04 |
| ANCA SCREEN | 86021 | $42.14 |
| BILIRUBIN INDIRECT | 82247 | $8.13 |
| BODY FLUID + CULTURE | 87070 | $13.97 |

REF./EFFECTIVE: 09/01/2017

INITIAL:
DATE:

FIG. 20A

|   | A | B | C | D |
|---|---|---|---|---|
| 1 | EFFECTIVE DATE | TEST | CPT | FEES |
| 2 | 9/1/2017 | 91 IDENTIFICATION, | 87088 | 20 |
| 3 | 9/1/2017 | ADMISSION SURVEILLANCE SCREEN:C.DIFF AG PCR/TOXIN A | 87324 | 38.25 |
| 4 | 9/1/2017 | ADMISSION SURVEILLANCE SCREEN:MRSA SCREEN | 87081 | 10.75 |
| 5 | 9/1/2017 | ADMISSION SURVEILLANCE SCREEN:SPUTUM CULTURE AND GRAM STAIN | 87070 | 13.97 |
| 6 | 9/1/2017 | ADMISSION SURVEILLANCE SCREEN:VRE SCREEN | 87081 | 10.75 |
| 7 | 9/1/2017 | | | |
| 8 | 9/1/2017 | ADMISSION SURVEILLANCE SCREEN:WOUND CULTURE | 87070 | 13.97 |
| 9 | 9/1/2017 | AFB CULTURE AND SMEAR A | 870,158, 711, 687, 206 | 37.04 |
| 10 | 9/1/2017 | ANCA SCREEN | 86021 | 42.14 |
| 11 | 9/1/2017 | BILIRUBIN INDIRECT | 82247 | 8.13 |
| 12 | 9/1/2017 | BILIRUBIN- TOTAL | 82247 | 8.13 |
| 13 | 9/1/2017 | BODY FLUID-AMYLASE | 82150BF | 10.51 |
| 15 | 9/1/2017 | BODY FLUID –CELL COUNT W/DIFF | 89051 | 8.93 |
| 16 | 9/1/2017 | BODY FLUID-CULTURE | 87070 | 13.97 |

FIG. 20B

| DATE | ACCN NO | PROCEDURES | FEES |
|---|---|---|---|
| 8/31/2017 | | 85025 CBC W/DIFF & PLT | $12.60 |
| 8/31/2017 | | 80048 BASIC METABOLIC PRO | $13.71 |
| 8/31/2017 | | G0471 VENIPUNCTURE | $3.57 |
| 8/31/2017 | | 80048 BASIC METABOLIC PRO | $13.71 |
| 8/31/2017 | | 85025 CBC W/DIFF & PLT | $12.60 |
| 8/31/2017 | | 84100 PHOSPHORUS | $7.69 |
| 8/31/2017 | | 83735 MAGNESIUM | $10.85 |
| 8/31/2017 | | G0471 VENIPUNCTURE | $3.57 |
| 8/31/2017 | | 80053 COMP METABOLIC PANE | $17.12 |
| 8/31/2017 | | 82150 AMYLASE | $10.51 |
| 8/31/2017 | | 83690 LIPASE | $11.16 |
| 8/31/2017 | | G0471 VENIPUNCTURE | $3.57 |

| PRICING ERROR RECORDS | | | | |
|---|---|---|---|---|
| ACC NO | DATE (MONTH/.) | CPT | PROCEDURE | FEE | PRICING SHEET FEE |
| NULL | APR 17, 2017 | 87186 | -91. SENSITIVITY.YEA | 380 | 28 |
| | APR 26, 2017 | 87184 | SENSITIVITY.YEAST | 190 | 14 |
| | APR 29, 2017 | 87184 | E-TEST | 62 | 40 |
| | APR 30, 2017 | 87184 | E-TEST | 62 | 40 |
| | | 87186 | E-TEST | 92 | 80 |
| | MAY 01, 2017 | 87186 | -91. SENSITIVITY.YEA SENSITIVITY.YEAST | 380 190 | 28 14 |
| | MAY 02, 2017 | 87184 | -91. SENSITIVITY.YEA SENSITIVITY.YEAST | 1,140 760 | 84 56 |
| | MAY 03, 2017 | 87186 | E-TEST | 62 | 40 |
| | | 87184 | -91. SENSITIVITY.YEA SENSITIVITY.YEAST | 380 190 | 28 14 |
| | MAY 11, 2017 | 87186 | E-TEST | 31 | 40 |
| | | 85610 | -91. SENSITIVITY.YEA SENSITIVITY.YEAST | 760 190 | 56 14 |
| | | | PT-INR | 20 | 6 |

FIG. 23

| DELIVERY NUMBER DESCRIPTION ▶ | SERVICE DESCRIPTION NUMBER ▶ | UNIT PRICE ▶ | PRICE UOM ▶ |
|---|---|---|---|
| 1061882989 | NSUSPBLK | | LB |
| 8066919624 | NI NF200 | | CL |
| 8066919624 | OX USP200 | | CL |
| 8066996829 | Z03NI804ME0014 | | CL |
| 8067029117 | Z04NI6852003016 | | CL |
| 8067000443 | Z03NI804ME0014 | | CL |
| 8067068876 | NI NF200 | | CL |
| 8067147443 | OX USPAWB | | CL |
| 8067460359 | OX USPBLK | | CCF |
| 8067532461 | NINFDEWARREFILL | | LT |
| 8067532461 | NINFDEWARREFILL | | LT |
| 8067878154 | OX USPBLK | | CCF |
| 8067873395 | OX USPBLK | | CCF |
| 8067878157 | OX USPBLK | | CCF |

ELECTRIC BEDS – REPAIR TIME AND LABOR RATE BY MODEL

2502

- AVERAGE REPAIR TIME BY MODEL
  - MODEL A= 36 MINUTES
  - MODEL B = 33 MINUTES
  - MODEL C= 29 MINUTES
  - MODEL D = 23 MINUTES

- AVERAGE RATE FOR REPAIR LABOR: NOT $109 PER HOUR. OVERALL ACTUALLY $116/HOUR
  - MODEL A= $119/HOUR
  - MODEL B= $116/HOUR
  - MODEL C= $113/HOUR
  - MODEL D= $109/HOUR

FIG. 25B

INVOICE ANALYTICS SYSTEM

CROSS-REFERENCE TO RELATED APPLICATIONS

This application claims priority to and the benefit of the provisional patent application titled "Invoice Analytics System", application No. 62/424,559, filed in the United States Patent and Trademark Office on Nov. 21, 2016. The specification of the above referenced patent application is incorporated herein by reference in its entirety.

BACKGROUND

Most entities, for example, businesses, companies, organizations, etc., typically procure supplies and products from third parties, for example, vendors, suppliers, manufacturers, etc., for their business. An entity provides a list of products the entity desires to purchase from a vendor and issues a purchase order containing line item details for the desired products. The vendor issues an invoice for the products shipped to the entity and the entity checks the delivered products against the products ordered. The vendor validates the delivered products with the products ordered using a purchase order number and the line item details in the purchase order. Since the products are delivered based on the entity's initiation of the purchase order, there is a process validation of the line item details in the purchase order with the line item details in the invoice issued for the delivered products. The products are ordered first by line item and then delivered, utilized, and paid.

Furthermore, entities procure professional services, and/or purchased services, and/or outsourced services, hereafter collectively referred as "business services", from one or more third parties to conduct their business. Business services encompass a large demographic, for example, from temporary staffing and housekeeping, to laundry, document management, food service, lawn maintenance, transportation services, etc. For business services, an entity establishes a contract that indicates terms, conditions, and agreed prices for the business services with a vendor similar to an agreement for products between the entity and the vendor. However, the business services are not accounted in a detailed purchase order that is issued before the business services are provided. Since the vendor is acting on behalf of the entity, the business services, for example, legal services are provided based on the entity's requirement and cannot be pre-ordered. Moreover, the vendor typically provides the business services first and then accounts for the business services by submitting invoices to the entity based on utilization of the business services. Unlike products that are purchased, vendors provide business services first and then invoice the entity for payment. Also, when the vendor submits an invoice for payment to the entity for a business service such as a professional service, as the line items of the business service are specific to that vendor, the line items are not detailed in an operational system, for example, a business procurement system of the entity for validation or tracking but are instead rolled up or merged into one total invoice amount, that is, a total sum of the invoice in the entity's accounts payable system. As a result, the entity does not have visibility into the line item details of the business services other than by performing a manual process of physically examining the invoice. Hence, the entity can run only an internal report for the business services by vendor with a total sum of the invoice but not with the line item details of the business services. While the entity can run a report to show the total spend of the entity by month for the business services provided by the vendor, the entity does not have access to the line item details for the business services due to the nature of the spend. Therefore, if the entity wants to analyze their business services spend, then conventionally the entity must retrieve the actual paper invoices manually, review the retrieved invoices manually, and input the reviewed invoices manually into a spreadsheet or an electronic document, for example, a Microsoft® Word document or a Microsoft® Excel document of Microsoft Corporation. Hence, there is a need for a method and a system that automates analysis of business service transactional invoice data and reconciliation of business service transactions between an entity and a vendor.

An invoice is a commercial document provided by a vendor to an entity, relating to procurement of products and/or business services. The invoice indicates products and/or business services, quantities, and agreed prices for the products and/or business services provided by the vendor to the entity. The invoice for a business service, in general, indicates specific services performed, for example, a testing service, a cleaning service, a dietary service, a transportation service, etc., that may include a description of a job, number of people deployed for the job, number of man hours in performing the job, etc., unlike the invoice for purchase of products. The invoice for the business service comprises an extensive amount of service data present in the invoice that is sourced from the contract between the entity and the vendor. Vendor billing of the business service in accordance with the contract to the business entity is typically a manual task and as such has a substantial risk of billing errors that typically go unseen or are not identified by the entity.

The extensive amount of unique specific service data containing details of multiple business services provided by the vendor present in the invoice requires the entity, for example, a large organization, to spend a large amount of time and resources for reviewing the invoice. The entity receives and reviews the invoice to verify if any job under the contract is pending, and if no job is pending, the entity processes the invoice for payment. Moreover, the invoice has to be manually verified for pricing accuracy. In general, the entity only conducts a brief summary review of the invoice. If the invoice remains fairly constant on a month-to-month basis, the invoice is paid without any further detailed reconcilement. However, due to complexity of the contract and the manual aspect of billing for the business service, the invoice for the business service typically contains multiple billing errors. Consider an example where a vendor provides a legal service to an entity and a contract between the vendor and the entity states that free copies of a legal document will be provided to the entity. A reviewer of the invoice may overlook this statement in the contract and the entity may end up paying for the copies of the legal document. Conventional methods for reconciling an invoice do not provide a means for the entity to assess errors in the invoice in real time, resulting in the entity having to pay high prices or get fees assessed that are not in compliance with the entity's contract. Reconciliation of business services is difficult as business services vary, for example, by number of contracts, various locations within a business entity, number of people deployed for a job, number of man hours, over time of people deployed for the job based on the classification of tasks under the business service, payer mixes, etc.

Unlike supplies that are generally ordered using catalogs or through an internal item master data table of the entity, business services are outsourced and purchased throughout an entity. And rather than being delivered to a loading dock under the supervision of procurement, business services enter every access point of the entity, and in some cases, may actually occur outside of the entity. An entity may outsource and purchase services throughout the entity from multiple and diverse groups of vendors. For example, the entity may use a national service provider for a food service and use a local service provider for lawn services and/or housekeeping services. The entity procures the business services based on particular requirements of the entity, resulting in diverse and varied pricing, and based on various ways the vendor invoices for the business services with additional fees. There may not be a catalog or a price guide from which the associated costs are derived. Because benchmarks on business service costs are not readily available, the diverse and varied pricing of services makes it difficult to determine whether spending is too much or too little and prevents the entity from negotiating appropriate costs. The business services may enter the entity from multiple access points and/or may occur outside of the entity without any supervision. In conventional methods, the complexity involved in purchasing, delivering, contracting, and monitoring business services prevents the entity from identifying errors in the invoices and does not provide real time visibility into the business services procured by the entity. Moreover, the conventional methods do not provide automated, ongoing line item visibility, real time pricing analysis, and benchmarks for the business services.

Line item cost details in invoices are foundational in understanding and measuring true costs for an entity. Consider an example where an entity utilizes waste disposal services at an agreed upon price. In this example, when a vendor such as a waste disposal service provider invoices the entity for waste pick-ups during a week, the waste disposal service provider adds minimum pick up charges, energy surcharge, and other miscellaneous fees which add to the costs of the waste disposal services but are not recited in the agreed upon terms in a contract between the entity and the vendor. Since the invoices have to be manually reviewed, and in large organizations, could contain hundreds to thousands of pages per month, most of the miscellaneous fees, overcharges, pricing errors, etc., are not identified. There is a need for a method and a system that automates identification of billing pricing errors, contract compliance errors, and line item service costs that are not under a contract or are off contract in the invoices for the business services and performs invoice analytics for price and utilization optimization of the business services and benchmarking for cost savings of the entity. Moreover, there is a need for a method and a system that performs an automated historical analysis of invoices received over a predefined duration of time and an automated real time analysis of invoices received in real time, for example, on a monthly basis as the invoices are received from the vendor.

Billing pricing errors are rarely found on a monthly basis in invoices for business services. Only when the entity conducts a retrospective accounts payable audit or a performance improvement initiative, some billing pricing errors are found. Moreover, in the accounts payable audit or the performance improvement initiative, only if the entity pulls all the previous invoices for the business services and compares every entry in each of the invoices with a corresponding contract, the entity may identify all of the billing pricing errors. The entity would rarely compare every entry in each of the invoices with the contract due to complexity of the contract and enormous resources and time the entity would need to conduct this reconciliation by business services, by vendor, by month, by line item, etc. In the manual process, contracts typically cannot be located to compare with the invoices. If the contract is located, it is laborious to identify relevant pricing, utilization terms, and financial terms that may impact the invoice. Therefore, there is a need for an automated method and a system for reconciling invoices to contracts for business services using a quick view interface that abstracts a contract and displays terms in the contract corresponding to every entry in the invoice for enhanced review, interpretation, comparison, and statistical analysis of the invoice.

Typically, reconciled invoices for products or supplies allow an entity to gauge utilization of the products or supplies by the entity over a predefined duration of time, for example, a month. Invoices for business services are difficult to reconcile on a monthly basis for validating the utilization of the business services. Consider an example where a vendor such as a laboratory testing service provider provides a laboratory testing service as an outsourced and purchased service to the entity. The laboratory testing service provider sends an invoice based on the number of patients tested, the number of patients on whom blood work was conducted, and by the number of tests conducted per month on all the patients. Validating the utilization of the laboratory testing service by the entity requires a reviewer of the invoice to access an operational system, for example, a registration system, an accounts payable system, etc., of the entity to validate the utilization for each month. There is a need for a method and a system for generating a utilization validation interface that links to an operational system of the entity for validating the utilization of the business services.

When an entity enters an invoice for a business service into an operational system, for example, an accounts payable system of the entity, basic invoice information, for example, vendor details, date, subtotal, fees, etc., is typically entered into the operational system without line item details for the business service. The operational system does not analyze the spend on the business service as the operational system does for products or supplies as no line item details are provided. Using the operational system alone, the entity cannot perform invoice analytics and utilization reviews by line item detail. Therefore, there is a need for a method and a system that performs invoice analytics by line item detail for price and utilization optimization of the business services in communication with the operational system of the entity.

Moreover, entities typically do not utilize insight from their monthly invoices to optimize their purchase patterns or spend habits for business services in real time and also do not trend the purchase patterns of the business services in real time to identify the purchase patterns' or variation problems as they happen to take corrective action in real time for cost control and utilization. Furthermore, for entities that perform optimization and trending on an annual basis or a two-year basis, which is a manual process, the entities have to review every invoice for that period of time and the line item details would have to be manually reviewed and transcribed into an electronic document, for example, a Microsoft® Word document or a Microsoft® Excel document of Microsoft Corporation, etc., for the analysis. There is a need for generating an interactive, dynamic, and searchable comprehensive report that allows the entity to identify and analyze purchase patterns, outliers, and variations, and perform predictive analysis of metrics of the entity.

Consider an example where entities such as hospitals transact with multiple vendors for different business services. More hospitals have been focusing on cost reduction initiatives on the business services spend. One of the reasons for the hospitals to rationalize business service costs is that most service items within the business services have a larger cost reduction opportunity compared to that in supply and equipment spends. Utilization of the business services varies over time and can even vary among hospitals within the same health system. Close monitoring and analysis of business services utilization expose the largest hospital cost reduction opportunities. These cost reduction opportunities can be realized by optimizing and better controlling utilization of the business services. However, the hospitals face challenges in realizing the cost reduction opportunities. One of the challenges is that a monthly reconciliation of invoices is either never performed or is performed in a cursory manner with approval routinely granted if the invoice is within about 10% of the previous month's invoice. Typically, in hospitals, every month, about 50% of non-labor spend falls within business services. 50% of the non-labor spend is manually reviewed and reconciled for contract compliance, for example, by department directors, vice presidents, and chief nursing officers. This manual reconciliation is substantially labor intensive and proves costly to the hospital. Therefore, there is a need for automating reconciliation of invoices in accordance with corresponding contracts in hospitals. Moreover, cost analysis conducted for the business services is typically not in-depth and/or not holistic. The typical cost analysis involves benchmarking only the contract pricing terms and reviewing invoices of only the current month. Furthermore, many business services cost reduction initiatives require subject matter experts to perform walk-throughs and a comprehensive reimbursement analysis for validating profitability. Another cost analysis approach is to request for a utilization spend report from the vendor. However, the utilization spend report typically prepared by vendors do not reflect what the paid invoices show and omit vendor fees, service charges, shipping charges, and other costs. Therefore, there is a need for performing a rigorous and comprehensive cost analysis for the business services provided to hospitals.

A majority of hospital business services spend is not addressed even by leading healthcare consulting firms that are specifically engaged to perform business services cost reductions. A reason for not addressing business services spend is that business services spend areas, for example, revenue cycle, finance, legal, marketing, and real estate leases are typically presumed to be beyond the scope of benchmarking or a utilization improvement review because expertise required to conduct an analysis is either unavailable or is subject to privacy concerns of sensitive relationships between vendors and entities. For example, a legal bill audit is an opportunity to measure contract compliance and benchmark legal fees, and potentially improve utilization of an entity such as a hospital. Hourly rates charged by attorneys and their staff need to be benchmarked and have pricing consistency throughout the hospital. The charges of a law firm for their time are used to determine overall legal expenses of the hospital. Minimum billing increments of quarter hours will lead to significantly higher billing amounts in invoices than tenth of an hour billing increments. Beyond billing rates, there are multiple other areas for cost improvement that a legal bill audit can uncover, for example, pyramiding, that is, charging for clerical work at attorney or accountant rates, changing hourly rates without prior approval, changing staffing for the convenience of the law firm without prior approval, billing for time spent creating or reviewing bills, using multiple attorneys to accomplish the work of a single attorney, billing improbably long days, billing in large minimum time segments such as 15 minutes for leaving a voicemail, billing for time in excess of what was actually spent, duplicate time charges, over staffing, inefficient procedures such as indecipherable invoice descriptions, excessive minimum time charges, bundling of described functions, markup on costs that should be passed through to clients, expert witnesses, other support services, etc. Therefore, there is a need for a method and system for auditing contract compliance and benchmarking fees for the business services.

Unlike medical items, supplies, and equipment that a hospital orders under a purchase order number, while each business services line item is consumed by the hospital, the utilization and invoicing are accounted for by the vendor. Because the vendor has disproportionate invoice accountability in the relationship between the hospital and the vendor, business services invoices need significant scrutiny and detailed data analytics. All cost savings take place at a line item detail level. A hospital cannot directly achieve cost savings from monthly category spend alone. While monthly spend by business services category can be indicative for cost savings opportunities, there is a need for examining and trending substantial detail from accounts payable spend by month, month over month to observe variability of the accounts payable spend. If an unusual monthly spend variance is identified, for example, an unusual spike in monthly spend, there is a need for analyzing invoice line item details during that month to identify the cause. However, spend variances are not easy to identify. Spend variances can increase gradually or are masked by countervailing other factors. In cases where monthly increases in category spend data takes place, an accounts payable department of the hospital pays two months of invoices in one month or capital or one time spend in a month. Therefore, there is a need for providing monthly invoice line item spend details to an entity for uncovering necessary insights for better spend decisions primarily around utilization of specific business services and identifying and rectifying invoice pricing errors and off-contract spend.

Hence, there is a long felt need for a method and a system for analyzing business service transactional invoice data of an entity and performing invoice analytics for the entity in real time for price and utilization optimization of business services and benchmarking in real time for cost savings of the entity. Moreover, there is a need for a method and a system for extracting and storing contract line item data from contracts and invoice line item data from invoices to identify, detail, and outline billing pricing errors, contract compliance errors, and off-contract business service items by line item for reconciliation of the invoices in accordance with the contracts by line item. Furthermore, there is a need for a method and a system for generating interfaces that allow optimal review, interpretation, comparison, and statistical analysis of the invoices in accordance with the contracts, and validation of utilization of the business services in communication with the operational system of the entity. Furthermore, there is a need for a method and a system for generating an interactive, dynamic, and searchable invoice analytics report that provides an enhanced visualization of purchase patterns, outliers, variations, and predictive analytics of metrics of the entity.

SUMMARY OF THE INVENTION

This summary is provided to introduce a selection of concepts in a simplified form that are further disclosed in the detailed description of the invention. This summary is not intended to determine the scope of the claimed subject matter.

The method and the system disclosed herein address the above recited needs for analyzing business service transactional invoice data corresponding to business service transactions, for example, professional service transactions, purchased service transactions, and outsourced service transactions between an entity and one or more vendors based on line item data of invoices corresponding to the business service transactions and performing invoice analytics for the entity in real time for price and utilization optimization of business services comprising, for example, professional services, purchased services, and outsourced services, and benchmarking in real time for cost savings of the entity. The method and the system disclosed herein perform a detail assessment of the invoices and contracts of the entity and reconciles the invoices in real time. The invoice analytics system performs data extraction, automated reconciliation of invoice line item data to contract line item data, automated reconciliation of invoice line item data to similar contract line item data, data segmentation, transformation of singular invoice line item data into monthly aggregated invoice line item data for performance improvement and analysis, generation of a graphically displayed interface with category specific reporting and key performance indicators, and transmission of line item data to procurement systems.

The method and the system disclosed herein extract and store contract line item data from contracts and invoice line item data from invoices to identify, detail, and outline billing pricing errors, contract compliance errors, and off-contract business service items by line item for reconciliation of the invoices in accordance with the contracts by line item. Moreover, the method and the system disclosed herein generate interfaces that allow optimal review, interpretation, comparison, and statistical analysis of the invoices in accordance with the contracts, and validation of utilization of the business services in communication with an operational system of the entity. Furthermore, the method and the system disclosed herein generate an interactive, dynamic, and searchable invoice analytics report that provides an enhanced visualization of purchase patterns, outliers, variations, and predictive analytics of metrics of the entity.

The method disclosed herein employs an invoice analytics system comprising at least one processor configured to execute computer program instructions for analyzing business service transactional invoice data of an entity and performing invoice analytics for the entity in real time. The invoice analytics system receives multiple contracts comprising agreement information on business service transactions between the entity and one or more vendors from one or more data sources and creates a contract terms database for storing the received contracts by vendor. The invoice analytics system extracts contract line item data from the received contracts and creates a contract line item database for storing the extracted contract line item data. The invoice analytics system transforms the extracted contract line item data into a quick view format and generates and renders a contract quick view interface on a graphical user interface of an entity device. The contract quick view interface displays the extracted contract line item data of the received contracts in the quick view format for optimal review, interpretation, comparison, and statistical analysis.

The invoice analytics system also receives multiple invoices comprising the business service transactional invoice data corresponding to the business service transactions between the entity and the vendors from the data sources and aggregates the business service transactional invoice data by vendor and by a predefined time duration, for example, a month, in an invoice aggregation database. The invoice analytics system extracts and segments invoice line item data from the aggregated business service transactional invoice data and creates an invoice line item database for storing the extracted and segmented invoice line item data. The invoice analytics system identifies, details, and outlines billing pricing errors, contract compliance errors, and off-contract business service items from the extracted and segmented invoice line item data with reference to the extracted contract line item data at predefined time intervals, for example, monthly, automatically in real time using the created invoice line item database and the created contract line item database. The invoice analytics system rectifies the identified, detailed, and outlined billing pricing errors and contract compliance errors, and resolves the off-contract business service items in real time to reconcile the received invoices in accordance with the received contracts for the predefined time intervals. The creation of the invoice line item database and the contract line item database allow the process of reconciliation of the received invoices to be fully automated. To perform a real time reconciliation of the invoices to the contracts with a push of a button, the invoice analytics system performs real time contract compliance. In an embodiment, the invoice analytics system generates a utilization validation interface that links to an operational system, for example, an accounts payable system, of the entity for validating utilization of the business services on the reconciliation of the received invoices.

The invoice analytics system, in communication with an operational system of the entity, performs invoice analytics on the extracted and segmented invoice line item data with supplementary data for price and utilization optimization of the business services and benchmarking in real time for cost savings. As a part of the invoice analytics, the invoice analytics system, in communication with an external database, computes cost savings for the entity based on analytics criteria comprising the identified billing pricing errors, the contract compliance errors, and the off-contract business service items. Based on the invoice analytics of the extracted and segmented invoice line item data, the invoice analytics system generates an interactive, dynamic, and searchable invoice analytics report comprising graphical data representations of purchase patterns, outliers, variations, and predictive analytics for the entity over the predefined time duration at the predefined time intervals.

The invoice analytics system minimizes manual processes by performing data collection and processing comprising, for example, data gathering, filtering, mapping, and reconciliation. This allows the invoice line item data to reside close to procurement sources, thereby reducing invoicing bottlenecks, while still allowing data to be accessible from a central location. The invoice analytics system aligns the invoice line item data with the contract line item data to allow the entity and vendors to have the same data sets.

In one or more embodiments, related systems comprise circuitry and/or programming for effecting the methods disclosed herein. The circuitry and/or programming can be any combination of hardware, software, and/or firmware configured to effect the methods disclosed herein depending upon the design choices of a system designer. Also, in an embodiment, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

FIG. 4 exemplarily illustrates an invoice comprising business service transactional invoice line item data received by the invoice analytics system for extracting and segmenting invoice line item data.

FIGS. 5A-5I exemplarily illustrate screenshots of an optical character recognition interface provided by the invoice analytics system for performing optical character recognition on an invoice received from a vendor to extract and segment invoice line item data from business service transactional invoice data of the invoice.

FIGS. 6A-6B exemplarily illustrate screenshots of a graphical user interface provided by the invoice analytics system, displaying an invoice received from a vendor and a table comprising invoice line item data extracted from business service transactional invoice data of the invoice and segmented by the invoice analytics system.

FIGS. 7A-7B exemplarily illustrate screenshots of an optical character recognition interface provided by the invoice analytics system for performing optical character recognition on an invoice received from a vendor to extract and segment invoice line item data from the invoice and populate a table for reconciliation of the received invoice.

FIGS. 8A-8C exemplarily illustrate screenshots of an optical character recognition interface provided by the invoice analytics system for performing optical character recognition on an invoice received from a vendor to extract and segment invoice line item data from the invoice and populate a table for reconciliation of the received invoice.

FIGS. 9A-9B exemplarily illustrate screenshots of an optical character recognition interface provided by the invoice analytics system for performing optical character recognition on an invoice received from a vendor to extract and segment invoice line item data from the invoice and populate a table for reconciliation of the received invoice.

FIGS. 10A-10B exemplarily illustrate screenshots of an optical character recognition interface provided by the invoice analytics system for performing optical character recognition on an invoice received from a vendor to extract and segment invoice line item data from the invoice and populate a table for reconciliation of the received invoice.

FIGS. 11A-11B exemplarily illustrate screenshots of an optical character recognition interface provided by the invoice analytics system for performing optical character recognition on an invoice received from a vendor to extract and segment invoice line item data and populate a table for reconciliation of the received invoice.

FIGS. 12A-12C exemplarily illustrate screenshots displaying an invoice of a vendor, a form comprising invoice line item data, and a table comprising the invoice line item data extracted from business service transactional invoice data of the invoice respectively.

FIG. 15 exemplarily illustrates a screenshot of a graphical user interface provided by the invoice analytics system, displaying a tabular representation of off-contract business service items identified in invoices received from a vendor.

FIG. 18 exemplarily illustrates a screenshot of a graphical user interface provided by the invoice analytics system, displaying an invoice received from a vendor and a table comprising invoice line item data extracted from the invoice and segmented by the invoice analytics system.

FIGS. 20A-20B exemplarily illustrate screenshots of a graphical user interface provided by the invoice analytics system, displaying a contract of an entity for a business service and a table comprising contract line item data extracted from the contract by the invoice analytics system respectively.

FIG. 21 exemplarily illustrates a screenshot of a graphical user interface provided by the invoice analytics system, displaying a tabular representation of invoice line item data by month extracted by the invoice analytics system from an invoice received from a vendor for a business service.

FIG. 23 exemplarily illustrates a screenshot of a graphical user interface provided by the invoice analytics system, displaying a reconciliation report comprising a tabular representation of pricing errors of business service line items identified in invoices received from a vendor by the invoice analytics system.

FIG. 24 exemplarily illustrates a business service item master data table for business services.

FIGS. 25A-25C exemplarily illustrate screenshots of graphical representations of invoice line item data utilized by the invoice analytics system for performing a comparative analysis of the invoice line item data extracted and segmented from invoices of vendors in a similar category of business services.

DETAILED DESCRIPTION OF THE INVENTION

Figure 1A:
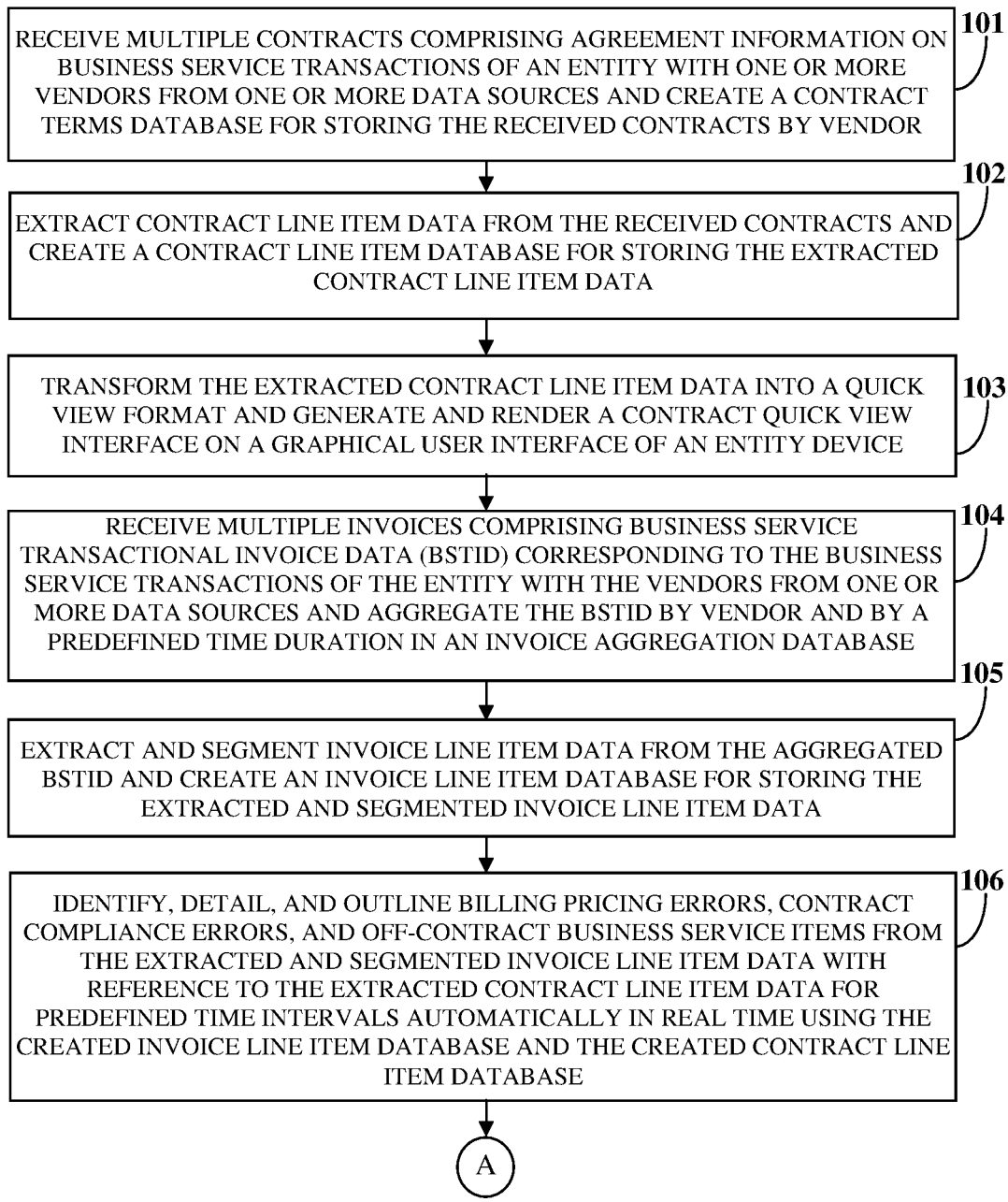
FIGS. 1A-1B illustrate a method for analyzing business service transactional invoice data of an entity and performing invoice analytics for the entity in real time.
Figure 1B:
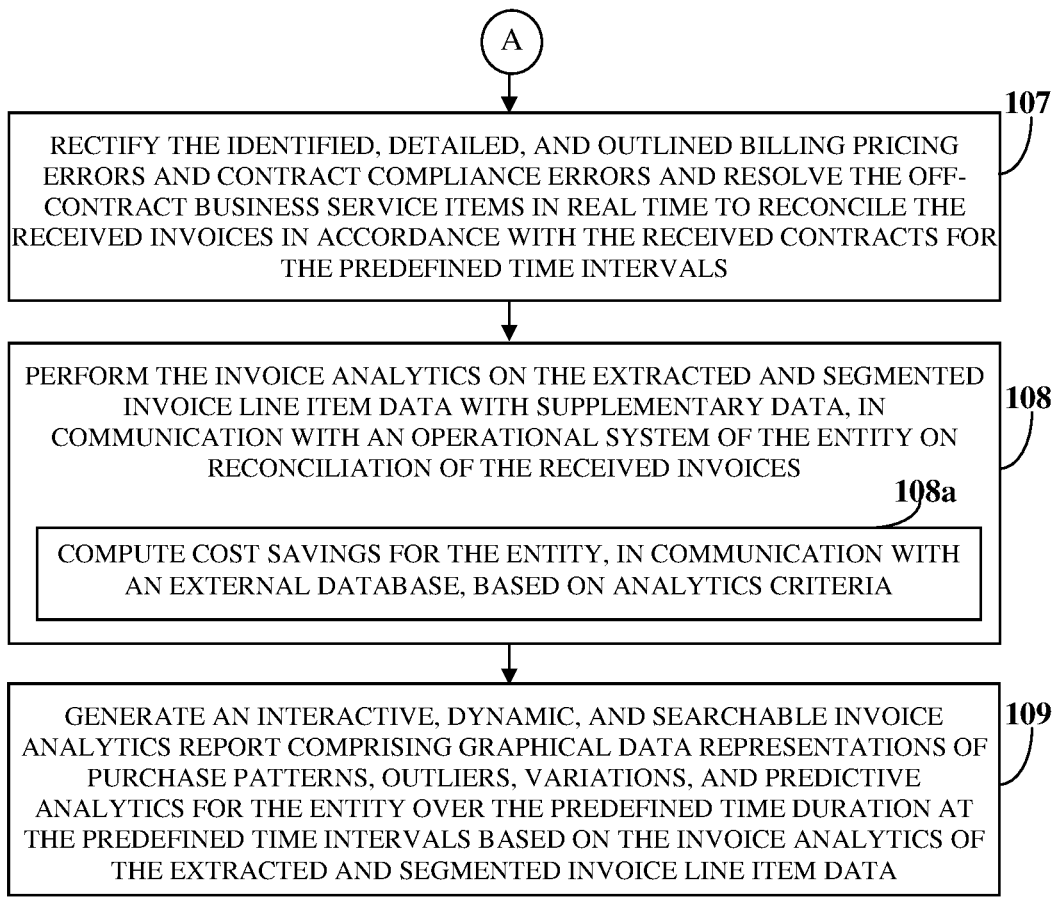

FIGS. 1A-1B illustrate a method for analyzing business service transactional invoice data of an entity and performing invoice analytics for the entity in real time. As used herein, the term "entity" refers to an individual such as a person, a business, a firm, a company, an organization, etc., that procures professional services, and/or purchased services, and/or outsourced services from vendors. Also, as used herein, the term "vendor" refers to an individual such as a person, a business, a firm, or an agency that sells business services to an entity or performs business services for the entity. Also, as used herein, "business service transactional invoice data" refers to information on an invoice that is generated when an entity is billed for business services which were performed by a vendor. The business service transactional invoice data encompasses information used for constructing an invoice for payment. The business service transactional invoice data comprises specific details of business service transactions, for example, description of the business services performed, a service number that is specific to a business service performed similar to an item number that is specific to a product ordered, a location where the business service was performed, quantity in terms of hours or days, units of pick-up, etc., prices paid for the business services performed, and additional fees that were not included in the business service, for example, travel, postage, late or minimum usage fees, etc. Also, as used herein, "business services" refer to non-supply and/or non-product services, for example, marketing services, linen services, dietary services, financial services, support services, etc., performed for, outsourced by, and purchased by an entity. The business services comprise, for example, professional services, purchased services, and outsourced services. The business services encompass a large demographic comprising, for example, temporary staffing services, housekeeping services, laundry services, document management services, food services, lawn maintenance services, transportation services, etc.

Also, as used herein, "business service transactions" refer to transactions, for example, financial transactions associated with business services provided by a vendor. The business service transactions comprise, for example, professional service transactions, purchased service transactions, and outsourced service transactions between an entity and a vendor. The business service transactions vary, for example, by people, number of man hours, overtime, classification of services, payer mixes, etc. Also, as used herein, the term "invoice" refers to a commercial document issued by a vendor to an entity, relating to a business service transaction between the vendor and the entity and indicating the business services the vendor provided to the entity and agreed prices. Also, as used herein, "invoice analytics" refers to systematic collection, interpretation, and analysis of multiple invoices of an entity for identifying trends, purchase patterns, outliers, variations, quality and utilization improvement opportunities, etc., for proactive management of business services spend of the entity over a predefined duration of time, for example, a month, a quarter, a year, etc. The entity can engage multiple vendors for the same business services or for different business services at any point in time.

The method disclosed herein employs an invoice analytics system comprising at least one processor configured to execute computer program instructions for analyzing business service transactional invoice data of an entity and performing invoice analytics for the entity in real time. In an embodiment, the invoice analytics system is implemented within a data lake architecture where data inputted to and generated by the invoice analytics system is stored in a data storage repository called a data lake as disclosed in the detailed description of FIG. 27. In another embodiment, the invoice analytics system is implemented as a web based platform hosted on a server or a network of servers accessible via a network, for example, the internet, a wireless network, a mobile telecommunication network, etc. In another embodiment, the invoice analytics system is implemented in a cloud computing environment. As used herein, "cloud computing environment" refers to a processing environment comprising configurable computing physical and logical resources, for example, networks, servers, storage media, virtual machines, applications, services, etc., and data distributed over the network, for example, the internet. The cloud computing environment provides on-demand network access to a shared pool of the configurable computing physical and logical resources.

In another embodiment, the invoice analytics system comprises a software application downloadable and usable on a user device, for example, a personal computer, a tablet computing device, a mobile computer, a mobile phone, a smart phone, a portable computing device, a laptop, a personal digital assistant, a wearable device such as the Google Glass® of Google Inc., the Apple Watch® of Apple Inc., the Android Smartwatch® of Google Inc., etc., a touch centric device, a workstation, a server, a client device, a portable electronic device, a network enabled computing device, an interactive network enabled communication device, a web browser, any other suitable computing equipment, combinations of multiple pieces of computing equipment, etc., and configured to perform functions of the invoice analytics system. In another embodiment, the invoice analytics system is configured as a cloud computing based platform implemented as a service for analyzing business service transactional invoice data of an entity and performing invoice analytics for the entity in real time. In another embodiment, the invoice analytics system is configured as a software as a service (SaaS) business intelligence and analytics platform that performs invoice reconciliation and contract optimization with real time benchmarking performed on a monthly basis for spend associated with the business services. In another embodiment, the invoice analytics system is implemented in a parallel computing environment where different computations are performed by the invoice analytics system simultaneously.

The invoice analytics system receives 101 multiple contracts comprising agreement information on business service transactions between the entity and one or more vendors from one or more data sources. As used herein, "contracts" refers to service agreements made between a vendor and the entity. The data sources can be any storage area or medium used for storing data and files. The data sources comprise, for example, local databases of the entity, vendor databases, etc. In an embodiment, the invoice analytics system receives multiple contracts in the form of physical documents and/or electronic documents, for example, as portable document format (pdf) files, Microsoft® Word document files of Microsoft Corporation, etc., from one or more data sources. The physical documents, for example, paper based documents are scanned using a scanner and stored as scanned documents in the data sources. In an embodiment, the invoice analytics system receives the contracts on a timely basis, for example, a monthly basis. The invoice analytics system creates a contract terms database for storing the received contracts by vendor.

The invoice analytics system scans the received contracts in the contract terms database by vendor and extracts 102 contract line item data from the received contracts. As used herein, "contract line item data" refers to units of business service transaction information comprising, for example, pricing information, payment structure, etc., separately identified and present in lines of the received contracts agreed upon by the entity and the vendors. The contract line item data comprises, for example, pricing, operational information, quality information, payment information such as payment structure, etc., of the business service transactions recited in the received contracts. The contract line item data further comprises, for example, financial data that impacts line item pricing for business services spend of the entity. The invoice analytics system creates 102 a contract line item database for storing the extracted contract line item data. The contract line item database is created through both the extraction of the contract line item data, for example, line item pricing details in the terms of each contract and also through a manual review of each contract by reading each contract to ensure that financial terms that exist embedded in each contract and separate from the line item pricing are analyzed and formatted in the contract line item database for a quantitative analysis. The invoice analytics system performs a detailed subject matter expert analysis of each contract to extract contract terms into a financial analysis format. The invoice analytics system performs optical character recognition on the financial analysis format and inputs the contract line item data into the contract line item database. The invoice analytics system analyzes the received contracts individually and extracts relevant contract line item data from each of the received contracts in a predefined pattern using one or more data extraction processes as disclosed in the detailed description of FIG. 2. The data extraction processes comprise, for example, a full extraction process or an incremental extraction process. The invoice analytics system transforms the contracts for the business services in the contract terms database into the contract line item database that comprises the extracted contract line item data and additional financial terms for billing of the business services to the entity to ensure that monthly invoices corresponding to the business services are reconciled to the contracts and billing errors and off-contract business service spend line items are identified. The invoice analytics system ensures that the entity does not get overcharged and automatic cost controls of the entity for the business services spend are in place. A generic computer using a generic program cannot extract contract line item data from the received contracts and create a contract line item database for storing the extracted contract line item data in accordance with the method steps disclosed above.

The invoice analytics system transforms 103 the extracted contract line item data into a quick view format and generates and renders a contract quick view interface on a graphical user interface (GUI) of an entity device, for example, one or more of a personal computer, a tablet computing device, a mobile computer, a mobile phone, a smartphone, etc. As used herein "quick view format" refers to a format of rendering the extracted contract line item data as a pop-up window. The contract quick view interface displays the extracted contract line item data of the received contracts in the quick view format on the GUI of the entity device for optimal review, interpretation, comparison, and statistical analysis. In an embodiment of the quick view format, the contract quick view interface does not have a header, a footer, or navigation areas. The invoice analytics system renders the contract quick view interface for viewing in a dashboard on the GUI of the entity device as an additional tab where the extracted contract line item data from the contracts is made available. The invoice analytics system creates the quick view format from an abstraction of a contract and generates the contract quick view interface that is connected to the dashboard on the GUI of the entity device. The contract quick view interface allows the contracts to be easily located and viewed, thereby precluding a manual process of reviewing the contracts. A generic computer using a generic program cannot transform the extracted contract line item data into a quick view format and generate and render the contract quick view interface on the GUI of the entity device for optimal review, interpretation, comparison, statistical analysis, and reconciliation of the monthly invoices with line item detail in accordance with the method steps disclosed above.

The invoice analytics system receives 104 multiple invoices comprising the business service transactional invoice data corresponding to the business service transactions between the entity and one or more vendors from one or more data sources. The data sources can be any storage area or medium used for storing data and files. The data sources comprise, for example, local databases of the entity, vendor databases, etc. The entity may send the invoices to the invoice analytics system via electronic mail (email) on a monthly basis or upload the invoices into the invoice analytics system via a secure file platform. The invoice analytics system aggregates 104 the business service transactional invoice data by vendor and by a predefined time duration, for example, by a month, in an invoice aggregation database. In an embodiment, the invoice analytics system receives multiple invoices of the entity in the form of physical documents and/or electronic documents, for example, as portable document format (pdf) files, Microsoft® Word document files of Microsoft Corporation, etc., from one or more data sources. The physical documents, for example, paper based documents are scanned using a scanner and stored as scanned documents in the data sources. Vendors typically submit invoices for approval and payment to the entity each month. In an embodiment, an administrator of the invoice analytics system uploads the invoices and the contracts into the invoice analytics system. In an embodiment, the invoice analytics system receives the invoices on a timely basis, for example, a monthly basis.

The invoice analytics system scans the received invoices and extracts and segments 105 invoice line item data from the aggregated business service transactional invoice data. As used herein, "invoice line item data" refers to units of business service transaction information, for example, pricing information, payment structure, etc., separately identified and present in lines of the received invoices. The invoice line item data comprises, for example, pricing, operational information, quality information, and payment information such a payment structure of the business service transactions between the entity and the vendors. The invoice analytics system extracts the invoice line item data from the received invoices to ensure invoice accuracy with the terms and conditions of the corresponding contracts. The invoice analytics system analyzes the received invoices comprising the business service transactional invoice data individually and extracts the relevant invoice line item data from each of the received invoices in a predefined pattern using one or more data extraction processes. The data extraction processes comprise, for example, a full extraction process or an incremental extraction process.

Figure 2:
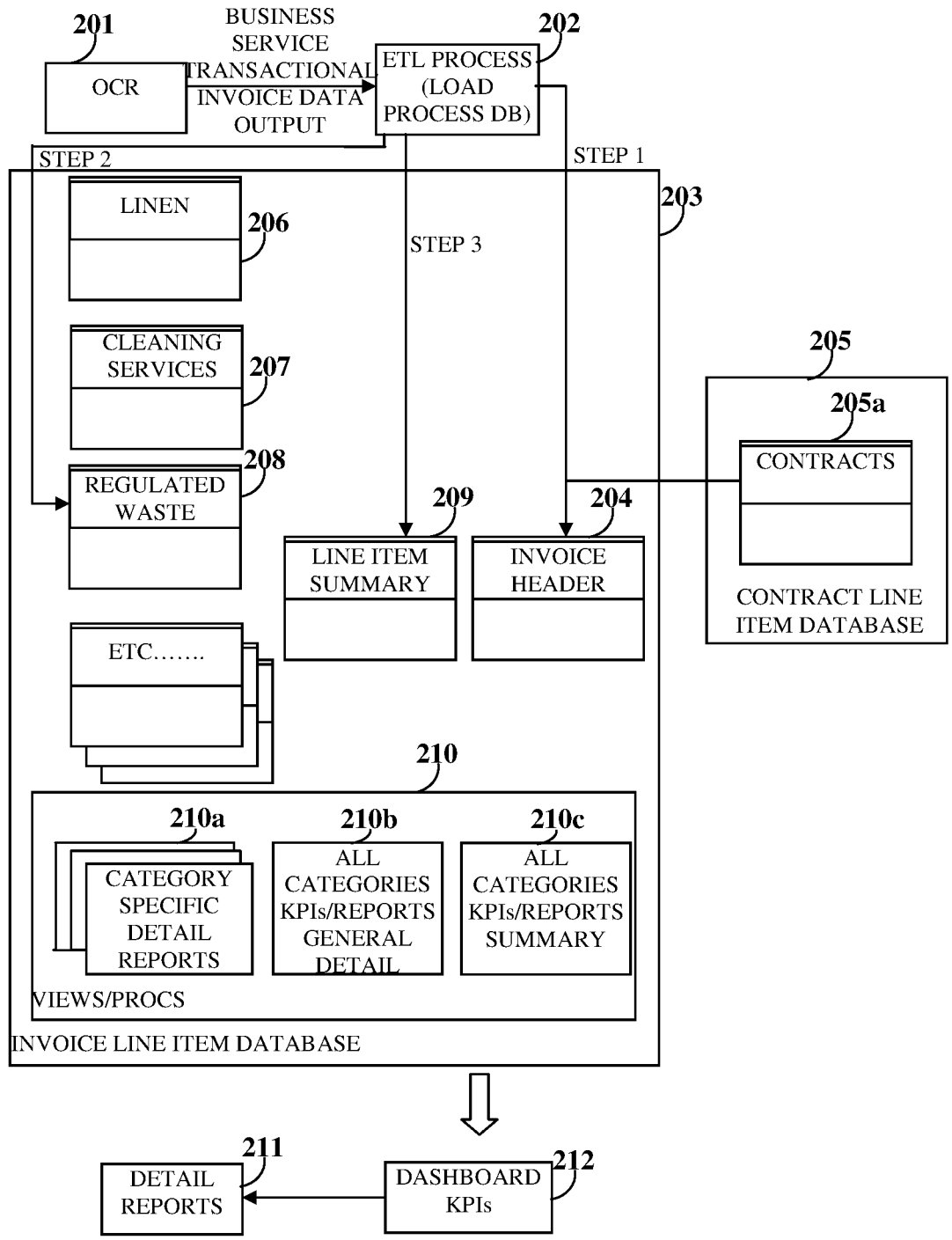
FIG. 2 exemplarily illustrates a flow diagram showing extraction of contract line item data and invoice line item data performed by an invoice analytics system for analyzing business service transactional invoice data of an entity and performing invoice analytics for the entity in real time.

The invoice analytics system performs optical character recognition to extract and segment the invoice line item data from the received invoices using a customized optical character recognition tool as disclosed in the detailed description of FIG. 2. In an embodiment, the optical character recognition tool is specially programmed by the vendor to extract the invoice line item data in a template format within the optical character recognition tool in such a way that the invoice line item data can be reconciled to the contract line item database and/or the contract terms database in real time. A generic computer using a generic program does not have the functionality to use an optical character recognition tool that is specially programmed by the vendor to extract the invoice line item data in a template format within the optical character recognition tool in such a way that the invoice line item data can be reconciled to the contract line item database and/or the contract terms database in real time. The invoice analytics system creates 105 an invoice line item database for storing the extracted and segmented invoice line item data. The invoice analytics system transforms the invoices for the business services in the invoice aggregation database into the invoice line item database that comprises the extracted invoice line item data and additional billing of the business services to the entity to ensure that monthly invoices corresponding to the business services are reconciled to the contracts and billing errors and off-contract business service spend line items are identified. The invoice analytics system aggregates the invoice line item data by month to allow the invoice analytics system to perform category specific analytics on the invoice line item data to analyze utilization and performance measurements and key performance indicators (KPIs). The invoice analytics system therefore transforms invoices from flat one dimensional data to robust analyzable data. In an embodiment, the invoice analytics system extracts the invoice line item data into the same financial analysis format as the contract line item data.

Consider an example where an entity receives an invoice comprising business service transactional invoice data from a vendor, for example, a legal service provider such as a law firm for business services, for example, legal processing services provided to the entity for a predefined duration of time, for example, a month as disclosed below:

5 hours senior partner time at $250 an hour for the Smith Case—$1,250
3 hours of junior partner time at $150 an hour for the Smith Case—$450
10 hours of paralegal time at $75 an hour for the Smith Case—$750
Postage for the Smith Case $2.70—$2.70
Copies for the Smith Case $92—$92
Deposition Transcription for the Smith Case $1,410—$1,410
15 hours senior partner time at $250 an hour for the Travis Case—$3,750
8 hours of junior partner time at $150 an hour for the Travis Case—$1,200
19 hours of paralegal time at $75 an hour for the Travis Case—$1,425
Postage for the Travis Case $165—$165
Copies for the Travis Case $297—$297
Invoice Total for December 2016—$10,791.70

The invoice analytics system extracts and segments the following invoice line item data, for example, number of man hours spent by each of the partners and paralegals in the law firm on a certain legal case of the entity, postage charges for the legal documents generated, charges for copies of the legal documents, etc., from the business service transactional invoice data of the above invoice. A generic computer using a generic program cannot extract and segment invoice line item data from the aggregated business service transactional invoice data and create an invoice line item database for storing the extracted and segmented invoice line item data in accordance with the method steps disclosed above.

With one click automation, the invoice analytics system identifies, details, and outlines 106 billing pricing errors, contract compliance errors, and off-contract business service items from the extracted and segmented invoice line item data with reference to the extracted contract line item data for predefined time intervals automatically in real time using the created invoice line item database and the created contract line item database. As used herein, "billing pricing errors" refers to errors in pricing details of a line item in an invoice. Also, as used herein, "contract compliance errors" refer to misalignment of the invoice line item data from the received invoices with the contract line item data from the received contracts. The contract compliance errors comprise errors in the invoice line item data of the invoices that do not comply with the terms in the contracts. Also, as used herein, "off-contract business service items" refer to invoice line item data for business services that do not have a reference in the contract. The spend of the entity for the off-contract business service items is referred as "an off-contract spend". The invoice analytics system keeps a tab on the off-contract spend of the entity by identifying the off-contract business service items.

The invoice analytics system identifies and highlights computation errors in the invoice and errors resulting from contract non-compliance in the invoice and generates a reconciliation report. The invoice analytics system flags the off-contract business service items in the reconciliation report. The invoice analytics system renders the reconciliation report on the graphical user interface (GUI) of the entity device. The reconciliation report allows the entity to adjust any advance payments made to the vendor in previous invoices. For example, on a monthly basis, the invoice analytics system validates invoice pricing in accordance with a contract made with a specific vendor. The invoice analytics system performs a retrospective review of the line items of the business services. That is, the invoice analytics system reviews invoice line item data of invoices of the last 18 to 24 months. The retrospective review provides an in-depth analysis of the received invoices for uncovering contract pricing errors, off-contract business service line items that need to be under the contract, unique trends and patterns, and utilization of business services that need to be provided, for example, to a department director for cost improvement. A generic computer using a generic program cannot identify, detail, and outline billing pricing errors, contract compliance errors, and off-contract business service items from the extracted and segmented invoice line item data with reference to the extracted contract line item data for predefined time intervals automatically in real time using the created invoice line item database and the created contract line item database.

The invoice analytics system rectifies 107 the identified, detailed, and outlined billing pricing errors and contract compliance errors, and resolves the off-contract business service items in real time to reconcile the received invoices in accordance with the received contracts for the predefined time intervals. Reconciling the received invoices comprises comparing the received invoices with the received contracts, recording any discrepancies or exceptions between the received invoices and the received contracts, and rectifying errors. The invoice analytics system identifies the received contracts that correlate to the received invoices. The invoice analytics system identifies the contract line item data in the contract line item database that corresponds to the extracted and segmented invoice line item data in the invoice line item database. The invoice analytics system compares or matches the extracted and segmented invoice line item data in the received invoices with the contract line item data in the received contracts to determine invoice accuracy for performing real time corrective actions prior to approving the received invoices for payment. For example, the invoice analytics system reconciles the invoices with the pricing and fees charged on each invoice that identifies errors in billing. The invoice analytics system reconciles individual invoice line item data with individual contract line item data in real time and benchmarks the individual invoice line item data through a benchmarking database that identifies cost reduction opportunities.

In an embodiment, the invoice analytics system extracts the invoice line item data into a summary view to allow the invoice analytics system to reconcile each invoice accurately and in real time with the corresponding contract. The invoice analytics system identifies pricing errors, price reduction opportunities, and utilization improvement opportunities. As each invoice is reconciled, the invoice analytics system either approves the invoice for payment, or if an error is identified, the invoice analytics system sends the invoice back to the vendor with the reconciliation report that outlines the error and the contract line item data included in the reconciliation report to ensure a rapid resolution and a corrected invoice. The invoice analytics system reconciles the received invoices in accordance with the received contracts at predefined time intervals, for example, monthly. In an embodiment, the invoice analytics system performs automated reconciliation where the identified contract line item data is matched with the invoice line item data monthly within tolerances defined in the invoice analytics system, and refers any exceptions raised to a manual reconciliation process involving an administrator of the invoice analytics system. A generic computer using a generic program cannot rectify the identified, detailed, and outlined billing pricing errors and contract compliance errors, and resolve the off-contract business service items in real time to reconcile the received invoices in accordance with the received contracts for the predefined time intervals in accordance with the method steps disclosed above.

On reconciliation of the received invoices, the invoice analytics system, in communication with an operational system of the entity, performs 108 invoice analytics on the extracted and segmented invoice line item data with supplementary data for price and utilization optimization of the business services and benchmarking in real time for cost savings. As used herein, "operational system" refers to a system of the entity that conducts day-to-day transactions. The operational system is, for example, an accounts payable system, an electronic medical record system of an entity, for example, a health center, etc. Also, as used herein, "utilization" refers to an extent to which the entity uses a business service over a predefined duration of time, for example, in a month. The invoice analytics system measures the utilization of the business services as a frequency of the business service transactions between the entity and the vendors over a predefined duration of time. As used herein, "price and utilization optimization" refers to optimization of prices agreed upon by the entity in the contracts with the vendors for the business services and optimization of utilization of the business services for cost savings and optimal functioning of the entity. The supplementary data comprises, for example, tentative quotes, pricing details, annual reports of other entities that are competitors of the entity, etc.

The invoice analytics system receives supplementary data comprising pricing data and utilization data from users of the invoice analytics system along with demographics of the entity. The invoice analytics system compares the extracted and segmented invoice line item data with the supplementary data to determine and explore avenues for price and utilization optimization. The invoice analytics system uses the extracted and segmented invoice line item data from the received invoices to perform an extensive analysis on the business service utilization by month and in real time. Also, as used herein, "benchmarking" refers to comparing business processes and performance metrics of the entity to industry standards. Also, as used herein, "cost savings" refers to savings in the business service transactions that the entity can incur based on the invoice analytics. Through a vendor specific or business service professional specific analysis, the invoice analytics system identifies line item opportunities for better pricing.

As a part of the invoice analytics, the invoice analytics system, in communication with an external database, computes 108a cost savings for the entity based on analytics criteria. The analytics criteria comprise, for example, the identified billing pricing errors, the contract compliance errors, the off-contract business service items, and in an embodiment, cost reduction opportunities and utilization optimization opportunities per extracted and segmented invoice line item data. The invoice analytics system uses the external database to analyze the monthly invoice line item data with similar contract pricing to identify price reduction opportunities. The basis for calculating the cost savings of the entity is annual utilization of a business service by the entity multiplied by savings on identified line item pricing errors and savings on identified off-contract business service items or new pricing from benchmarking savings and credits obtained from overcharges. If the invoice analytics system identifies billing pricing errors, the contract compliance errors, and off-contract business service items, the invoice analytics system generates the reconciliation report that highlights the errors in the reconciliation and computes an erroneous amount charged by the vendor for the business services. If the invoice analytics system identifies cost reduction opportunities and utilization optimization opportunities in the business service transactions on performing the invoice analytics, the invoice analytics system computes the cost savings that can be achieved by utilizing the cost reduction opportunities and the utilization optimization opportunities. Consider an example where a vendor provides a business service such as a copier repair service to an entity. The invoice analytics system identifies that the repair charge hourly rate is contracted at $100 per hour, while the vendor is invoicing $125 per hour. The identification of the billing pricing error is a cost reduction opportunity. The invoice analytics system, accordingly, computes the reduction in the charges for the line item hourly rate of the business service and examines the effect of the cost savings in the invoice while reconciling the invoice. The invoice analytics system generates and renders a cost savings opportunity report illustrating the cost savings on the graphical user interface of the entity device.

The invoice analytics system performs invoice analytics on the extracted and segmented invoice line item data combined with data inputs from external databases that identify trends, variations, quality, and utilization opportunities, etc., for proactive monthly management of business service transactions. The data inputs comprise, for example, the historic trends of the entity for a predefined duration of time for the business services, the industry standards for the predefined duration of time for the business services, etc. In an embodiment, the invoice analytics system extracts the invoice line item data and the contract line item data for the business services into multiple data fields for enhanced review, interpretation, comparison, and statistical analysis of the pricing and utilization of the specific business services. In this embodiment, the invoice analytics system analyzes the extracted invoice line item data and the extracted contract line item data via the data fields using analytical tools and expert inputs received via a graphical user interface, identifies contract compliance errors and real time price reduction opportunities, estimates one or more factors, for example, the increase in utilization of a specific business service in real time, and determines the impact of the current pricing on rebates, credits, and other financial incentives agreed, based on the analysis. The invoice analytics system performs invoice analytics on the invoices of a vendor corresponding to a previous month and a current month to ensure that no invoice line item is charged more than once by the vendor in the invoices. The invoice analytics system analyzes invoice line item data of the current month to that of the previous month to ensure that there is no duplicate invoicing for the same business services in both months.

As a part of performing the invoice analytics, in an embodiment, the invoice analytics system further benchmarks the contract line item data and the invoice line item data using the benchmarking database in real time for determining avenues for cost savings in the business service transactions. The invoice analytics system uses the contract line item data and the invoice line item data to establish a pricing benchmark in real time and stores the established pricing benchmark, for example, in the benchmarking database. The invoice analytics system uses the pricing benchmark to analyze the received invoices with the pricing and fees charged on each of the received invoices to identify opportunities to reduce costs through better pricing and utilization. The invoice analytics system extracts the invoice line item data from the received invoices for performing ongoing benchmarking. The invoice analytics system utilizes the invoice line item data and performance data that is automatically captured from the received invoices and then compares the pricing and performance against industry benchmarks in real time. In an embodiment, the invoice analytics system performs best practices benchmarking where the entity compares itself with other entities that the entity aspires to be and identifies best practices that help to improve the entity. In another embodiment, the invoice analytics system performs peer benchmarking where the entity compares performance metrics of itself with performance metrics of competitors to ensure that the entity is competitive with the competitors.

The invoice analytics system measures progress of the business services over a period of time, easily identifies changes to the business service performance, and takes necessary corrective actions to get the service and pricing performance back on track. The invoice analytics system also identifies cost and utilization improvements based upon benchmarking results and provides specific actions that yield financial improvement results. As a part of performing the invoice analytics, in an embodiment, the invoice analytics system performs a comparative analysis of the extracted and segmented invoice line item data from the received invoices of each of two or more vendors in a similar category of the business services at the predefined time intervals for determining pricing gaps between the vendors and cost reduction and utilization optimization opportunities per the extracted and segmented invoice line item data. The invoice analytics system compares each invoice line item of the invoices of the vendors to determine which vendor is more expensive and which vendor is less expensive per invoice line item data. A generic computer using a generic program cannot perform invoice analytics on the extracted and segmented invoice line item data with supplementary data for price and utilization optimization of business services and benchmarking in real time for cost savings in accordance with the method steps disclosed above.

In an embodiment, the invoice analytics system generates a utilization validation interface that links to the operational system of the entity for validating utilization of the business services on the reconciliation of the received invoices. Consider an example where a vendor such as a healthcare service provider whose utilization by an entity, for example, a person is measured as the number of visits by the person to the health care service provider, the number of prescription drugs taken, the number of days the person was hospitalized, etc. The invoice analytics system validates the utilization of the business services, for example, healthcare services using the utilization validation interface that links to the operational system, for example, a registration system of the entity. In an embodiment, the invoice analytics system renders the utilization validation interface on the graphical user interface (GUI) of the entity device when the entity invoices another entity for the business services performed.

The invoice analytics system validates the utilization of the business services by the entity by comparing the number of times the business service transactions with a vendor has taken place according to the received invoices over a predefined duration of time, for example, a month, with records in the operational system of the entity. Consider an example where a hospital outsources lithotripsy services to a vendor, for example, an outsourced service provider. The outsourced service provider invoices the hospital for the lithotripsy services on a monthly basis by the number of patients who have utilized the lithotripsy services. The invoice analytics system generates a utilization validation interface that allows the invoice analytics system to validate the invoiced lithotripsy services with the actual number of lithotripsy services performed on specific patients named in the invoice. The actual number of patients registered for lithotripsy services is available in the operational system, for example, the registration system of the entity. The invoice analytics system performs utilization validation of the business services to analyze the necessity of the entity to procure the business services, and to measure appropriateness and efficiency of the vendors in providing the business services on concurrent and retrospective bases. A generic computer using a generic program cannot generate the utilization validation interface that links to an operational system of the entity for validating utilization of the business services on the reconciliation of the received invoices in accordance with the method steps disclosed above.

The invoice analytics system generates 109 an interactive, dynamic, and searchable invoice analytics report comprising graphical data representations of purchase patterns, outliers, variations, and predictive analytics for the entity over the predefined time duration at the predefined time intervals based on the invoice analytics of the extracted and segmented invoice line item data. As used herein, "graphical data representation" refers to a representation of data in the form of visual analytics comprising, for example, charts, graphs, etc. The invoice analytics system provides data visualization of various business intelligence spend patterns on a monthly basis directly from the invoices of the vendors. The generated invoice analytics report provides insight into the pricing or purchased service spend and utilization of the business services with invoice line item data in real time to allow the entity to monitor and measure the vendors' current business service and pricing performance and take necessary corrective actions to get the business service and the pricing performance back on track. For example, the invoice analytics system analyzes the purchase patterns on a monthly basis from the received invoices to create charts, graphs, and "what-if" scenario modeling comprising, for example, month to month comparisons, high spend items, and new item spend. The invoice analytics system provides continuous improvement insights into multiple business services comprising, for example, information technology services, human resources, facilities, clinical revenue cycles, marketing, etc. The interactive, dynamic, and searchable invoice analytics report allows a user of the invoice analytics system to track monthly business service spend trends by line item. A generic computer using a generic program cannot generate an interactive, dynamic, and searchable invoice analytics report comprising graphical data representations of purchase patterns, outliers, variations, and predictive analytics for the entity over the predefined time duration at the predefined time intervals based on the invoice analytics of the extracted and segmented invoice line item data in accordance with the method steps disclosed above. In an embodiment, the invoice analytics system transmits the interactive, dynamic, and searchable invoice analytics report to the entity, for example, via electronic mail (email). In an embodiment, the invoice analytics system reconstructs the invoice line item data into cost analytics to capture variations, utilization patterns, and other trends that provide insights to an entity for operational performance improvements.

In an embodiment, the invoice analytics system generates a feed report comprising the extracted and segmented invoice line item data by category of the business services, by the vendor, and by the predefined time duration, for example, a month. The invoice analytics system aggregates business service transactional invoice data of each of the received invoices corresponding to a vendor during a specific month and extracts the invoice line item data during that specific month from the aggregated business service transactional invoice data. In an embodiment, the invoice analytics system extracts the invoice line item data during the specific month and aggregates the extracted invoice line item data by invoice as well as in total for the month. The invoice analytics system generates a feed report and performs invoice analytics on the invoice line item data aggregated by month and by the received invoice. The feed report helps the entity to build a business service item master data table for the business services similar to an item master data table for products. The invoice analytics system computes a total spend for each of the business services over the predefined time duration, for example, a month, using the extracted and segmented invoice line item data and renders the computed total spend in the generated interactive, dynamic, and searchable invoice analytics report. The invoice analytics system, therefore, provides complete visibility into the invoices, the invoice line item data, and spend of the entity in real time and by month, and provides a decision making platform that manages and optimizes the spend of the entity. Since business services spend is, for example, about 40% to about 50% of an entity's overall spend, the invoice analytics system provides complete line item visibility into the business services spend.

On implementing the method disclosed herein, the end result is a tangible analysis of business service transactions between an entity and one or more vendors and performance of invoice analytics for the entity in real time. The method disclosed is an automated process of managing the business service transactions between the entity and one or more vendors. The invoice analytics system, implementing the method disclosed herein, validates the invoice line item data and the contract line item data in real time. The invoice analytics system extracts the invoice line item data from the received invoices using optical character recognition and an extract, transform, and load (ETL) operation by invoice, by month, by vendor, etc. The invoice analytics system aggregates the extracted and segmented invoice line item data for a predefined duration of time, for example, a month, and generates a comprehensive monthly view of specific invoice line item data to analyze specific spend of the entity. The invoice analytics system generates a feed report that is an interface for an operational or financial system of the entity to provide accuracy on the invoice line item data by month, by vendor, and by category of the business services, and to allow the entity to develop the line item data for the business services. The invoice analytics system provides visibility of the invoice line item data on a monthly basis through a dynamic visual display of key performance indicators or indices in the form of the interactive, dynamic, and searchable invoice analytics report. The invoice analytics system aggregates and segments the monthly invoice line item data by line item to provide visibility into effective utilization of the business services to avoid oversight and ensure effective management of the business services. The interactive, dynamic, and searchable invoice analytics report provides line item visibility and utilization trend reports of the business services. The invoice analytics system computes the total spend of each of the business services over a month and renders the computed total spend in the interactive, dynamic, and searchable invoice analytics report. The invoice analytics system also benchmarks the contract line item data and the invoice line item data for cost savings opportunities of the entity in real time using a benchmarking database.

The data inputted to the invoice analytics system, for example, the invoices received from the vendors, the contracts established between the entity and the vendors, etc., is transformed, processed, and executed by an algorithm in the invoice analytics system. The invoice analytics system transforms the contract line item data extracted from the contracts into a quick view format and generates the contract quick view interface as disclosed above. The invoice analytics system processes the business service transactional invoice data in the invoices for the business services by vendor and aggregates the business service transactional invoice data of multiple invoices by month, for example, using optical character recognition. The invoice analytics system extracts and segments invoice line item data from the aggregated business service transactional invoice data using optical character recognition and extract, transform, and load (ETL) operations as disclosed in the detailed description of FIG. 2. The invoice analytics system aggregates the extracted and segmented invoice line item data by month and by vendor and generates aggregated monthly invoice line item data.

The invoice analytics system transforms the extracted and segmented invoice line item data into customized templates by vendor into a feed report. The invoice analytics system also creates a category specific detail report and renders vendor specific details as a part of the feed report. The invoice analytics system identifies and measures key performance indicators, for example, availability of the vendor, downtime of the vendor, time for completion of the business services, etc., generates summary reports by category and by vendor, and renders the key performance indicators (KPIs) and the summary reports on the graphical user interface of the entity device. The invoice analytics system performs a comparative analysis of two or more vendors in the same category based on the extracted and segmented invoice line item data. In an embodiment, the invoice analytics system transforms the extracted and segmented invoice line item data into customized templates by vendor into a database, for example, a structured query language (SQL) database. Using the SQL database, the invoice analytics system creates category and vendor specific detailed reports, KPIs, and summary reports by category and vendor. For multiple vendors in the same category, the invoice analytics system performs a comparative analysis by invoice line item data using the SQL database.

In an embodiment, the invoice analytics system uses the extracted and segmented invoice line item data by vendor to generate a quality metric score to gauge the performance of the vendor in performing the business services. The invoice analytics system generates the quality metric score of the performance of the business services over a predetermined duration of time based on the analysis of the extracted contract line item data and/or the extracted and segmented invoice line item data. In another embodiment, the invoice analytics system also dynamically generates a risk score by category of the business services, by vendors, and by the number and type of billing errors and contract compliance errors using the extracted and segmented invoice line item data. The risk score reflects the errors and opportunities. The invoice analytics system transforms the extracted and segmented invoice line item data into graphical data representations of purchase patterns, outliers, variations, and predictive analytics for the entity over a predefined time duration in the interactive, dynamic, and searchable invoice analytics report. The invoice analytics system transforms the extracted and segmented invoice line item data extracted from monthly invoices into customized data insights, visual analytics, utilization trends, and real time intelligence.

The method disclosed herein provides an improvement in computer related technology related to analyzing business service transactional invoice data of an entity and performing invoice analytics for the entity in real time as follows. On implementing the method disclosed herein by the invoice analytics system, the invoice analytics system automates the process of reconciliation of invoices of the entity in accordance with corresponding contracts and avoids significant manual efforts in running internal reports that do not have access to the business service transactional invoice data in the invoices. The invoice analytics system also creates the contract terms database for every vendor specific contract established by the entity with the vendors and aggregates the business service transactional invoice data of the received invoices in the invoice aggregation database by vendor and by a predefined time duration, for example, a month. Using the contract terms database and the invoice aggregation database, the invoice analytics system extracts the contact line item data and the invoice line item data respectively, and stores the extracted contract line item data in the contract line item database and the extracted and segmented invoice line item data in the invoice line item database. The invoice analytics system reconciles the invoice line item data in accordance with the contract line item data within minutes. During reconciliation, the invoice analytics system identifies whether the invoice line item data is in the contract using the contract quick view interface. If the invoice line item data is in the contract, the invoice analytics system verifies whether the pricing information of the business service in the invoice is coherent with the pricing information for the business service in the contract. If the pricing information in the invoice and the contract are incoherent, the invoice analytics system corrects the pricing information in the invoice. If the invoice line item data is not in the contract, the invoice analytics system indicates to the entity on the graphical user interface of the entity device to include the invoice line item data in the contract. The invoice analytics system, in the embodiment of the implementation as a software as a service (SaaS) platform and a report generation tool, manages the business services by computing a total spend of each of the business services over the predefined time duration and by measuring utilization of the business services over the predefined duration of time to reconcile, optimize, and provide real time intelligence on the cost savings opportunities for the entity.

The method disclosed herein improves the functionality of the computer and provides an improvement in reconciliation of invoices by analysis of business service transactions between an entity and one or more vendors and performance of invoice analytics for the entity in real time as follows, On implementing the method disclosed herein, the invoice analytics system is capable, in real time, of identifying billing pricing errors per line item in the invoices received from the vendors using the contract terms database, the contract line item database, and the contract quick view interface that is created from the received contracts of the entity with specific vendors or service providers. Moreover, the invoice analytics system identifies the business service line items in the invoice that are not in the contract line item database, that is, the outliers that should not be billed or the new line items in the invoice that need to be governed by the contract. The utilization validation interface generated by the invoice analytics system allows performance of utilization validation of the business services in a reduced amount time instead of validating the received invoices in the operational system separately each time. The invoice analytics system extracts the invoice line item data from the received invoices using optical character recognition and extract, transform, and load (ETL) tools and performs the utilization validation of the business services by invoice line item data. Furthermore, in an embodiment, when the invoice analytics system identifies billing pricing errors and contract compliance errors in the extracted and segmented invoice line item data, the invoice analytics system renders the contract quick view interface as a pop-up window for optimal review, interpretation, comparison, and statistical analysis of the extracted and segmented invoice line item data.

To receive contracts from one or more data sources, create the contract terms database by vendor, extract contract line item data from the received contracts in the contract terms database, create the contract line item database to store the extracted contract line item data, transform the extracted contract line item data to a quick view format and generate and render a contract quick view interface, receive multiple invoices corresponding to the business service transactions between the entity and the vendors from one or more data sources and aggregate business service transactional invoice data of the invoices received from one or more data sources by vendor and by a predefined time duration in the invoice aggregation database, extract and segment the invoice line item data from the aggregated business service transactional invoice data, create the invoice line item database to store the extracted and segmented invoice line item data, identify, detail, and outline billing pricing errors, contract compliance errors, and off-contract business service items from the extracted and segmented invoice line item data with reference to the extracted contract line item data automatically in real time, rectify the identified, detailed, and outlined billing pricing errors and contract compliance errors, resolve the off-contract business service items, perform the invoice analytics, and generate the interactive, dynamic, and searchable invoice analytics report requires ten or more separate computer programs and subprograms, the execution of which cannot be performed by a person using a generic computer with a generic program.

The invoice analytics system analyzes the reconciled invoices by vendor to identify opportunities for price and utilization optimization, benchmarking, and cost reduction in real time and, in an embodiment, on a timely basis, for example, a monthly basis. As errors are identified, the invoice analytics system calculates the annual cost savings to the entity for identifying and correcting the invoices, which includes the pricing savings and the resource time to fix the errors. The invoice analytics system analyzes the contracts and optimizes the terms of each contract to maximize rebates, credits, and incentives based on purchase or spend and utilization. For example, if a contract calls for rebates after a specific threshold is met by a product or a service line, the invoice analytics system identifies the product or service threshold criteria specified in the contract and requests for rebates after the specific threshold is met by the product or the service line. In another example, if there is a new spend outside of the contract or a higher spend than expected in real time, the invoice analytics system identifies these spend patterns in real time and indicates that a new pricing can be implemented for cost savings and/or that amendments to the existing contract can be made to reflect an approved new purchase or spend. The invoice analytics system reduces the cost of invoice reconciliation for the entity.

In the method disclosed herein, the design and the flow of interactions between the data sources, the invoice analytics system, the operational system of the entity, and the entity device are deliberate, designed, and directed. Every invoice, every contract, etc., the invoice analytics system receives is configured by the invoice analytics system to steer the entity towards a finite set of predictable outcomes. The invoice analytics system implements one or more specific computer programs to direct the entity towards a set of end results. The interactions designed by the invoice analytics system allow the invoice analytics system to extract the contract line item data from the contracts and the invoice line item data from the invoices, and from this line item data, through the use of other, separate and autonomous computer programs, reconcile the invoices in accordance with the contracts. This invoice reconciliation is used as a trigger to perform invoice analytics and determine purchase patterns, outliers, variations, and predictive analytics for the entity over a predefined time duration.

The focus of the method and the invoice analytics system disclosed herein is on an improvement to the computer functionality itself, and not on economic or other tasks for which a generic computer is used in its ordinary capacity. Accordingly, the method and the invoice analytics system disclosed herein are not directed to an abstract idea. Rather, the method and the invoice analytics system disclosed herein are directed to a specific improvement to the way the invoice analytics system operates, embodied in, for example, extraction of contract line item data from the contracts, transformation of the extracted contract line item data into a quick view format and generation of the contract quick view interface, extraction and segmentation of the invoice line item data from the aggregated business service transactional invoice data, reconciliation of the received invoices in accordance with the received contracts for predefined time intervals in real time, performance of the invoice analytics on the extracted and segmented invoice line item data, generation of the interactive, dynamic, and searchable invoice analytics report, etc.

FIG. 2 exemplarily illustrates a flow diagram showing extraction of contract line item data and invoice line item data performed by the invoice analytics system for analyzing business service transactional invoice data of an entity and performing invoice analytics for the entity in real time. The invoice analytics system receives multiple invoices from multiple vendors for multiple business services, for example, linen services, linen cleaning services, regulated waste cleaning services, food services, etc. The invoice analytics system performs optical character recognition (OCR) 201 on the received invoices and aggregates the business service transactional invoice data in the received invoices by vendor, for example, a linen service provider, a linen cleaning service provider, a regulated waste cleaning service provider, a food service provider, etc., in an invoice aggregation database. The optical character recognition 201 performed by the invoice analytics system converts the received invoices of different formats into editable and searchable data. The invoice analytics system extracts and segments invoice line item data from the aggregated business service transactional invoice data using optical character recognition 201. To extract and segment the invoice line item data, the invoice analytics system performs an extraction, transform, and load (ETL) operation 202 on the aggregated business service transactional invoice data. The invoice analytics system converts the extracted and segmented invoice line item data into an intermediate format that is ready for transformation processing. The invoice analytics system then transforms the extracted and segmented invoice line item data by applying business rules, cleaning the extracted and segmented invoice line item data, filtering the extracted and segmented invoice line item data based on business rules, splitting the extracted and segmented invoice line item data, validating the extracted and segmented invoice line item data, etc. The invoice analytics system loads the transformed invoice line item data into a process database, that is, the invoice line item database 203. For example, the invoice analytics system extracts and transforms invoice header information of the aggregated business service transactional invoice data and loads the invoice header information into an InvoiceHeader table 204 in the invoice line item database 203.

The invoice analytics system receives multiple contracts from vendors and/or the entity and creates the contract terms database. The invoice analytics system extracts contract line item data from the received contracts using optical character recognition 201 and an extraction, transform, and load (ETL) operation 202 and creates the contract line item database 205 for storing the extracted contract line item data. The invoice analytics system stores the extracted contract line item data in a contracts table 205a of the contract line item database 205. The invoice analytics system, using the extracted invoice header information of the received invoices, finds the corresponding contract line item data from the contract line item database 205. In the invoice aggregation database, the invoice analytics system aggregates the business service transactional invoice data of the invoices by vendor and allows the extraction and storage of the invoice line item data by vendor in the invoice line item database 203. The invoice line item database 203 comprises different tables 206, 207, and 208 for storing invoice line item data of the different vendors. The invoice analytics system loads the extracted and segmented invoice line item data to the corresponding tables 206, 207, and 208 of the vendors. For example, if the invoice line item data is extracted and segmented from the invoices of the linen service provider and the linen cleaning service provider, the invoice analytics system loads the extracted and segmented invoice line item data into the tables 206 and 207 respectively, corresponding to the linen service provider and the linen cleaning service provider respectively, in the invoice line item database 203. Similarly, if the invoice line item data is extracted and segmented from the invoices of the regulated waste cleaning service provider, the invoice analytics system loads the extracted and segmented invoice line item data into the table 208 corresponding to the regulated waste cleaning service provider in the invoice line item database 203.

The invoice analytics system generates and renders a summary view of the extracted and segmented invoice line item data on a graphical user interface (GUI) of an entity device. For generating the summary view, the invoice analytics system loads key performance indicators and other extracted and segmented invoice line item data into a table, for example, a LineItemSummary table 209, in the invoice line item database 203. The invoice analytics system transforms the extracted contract line item data to a quick view format and generates and renders a contract quick view interface on the GUI of the entity device. The invoice analytics system reconciles the received invoices of the vendors, for example, the linen cleaning service provider in accordance with the received contracts corresponding to the vendor, for example, the linen cleaning service provider at predefined time intervals, for example, monthly.

Based on inputs received from a user, for example, an administrator of the invoice analytics system via the entity device, the invoice analytics system creates different views and procedures 210 and renders reports corresponding to the different views and procedures 210 on the graphical user interface (GUI) of the entity device. The invoice analytics system generates a feed report comprising the extracted and segmented invoice line item data by category of the business services, by vendor, and by a predefined time duration, for example, a month, a quarter, etc. The invoice analytics system creates views for category specific detail reports 210a, all categories key performance indicators (KPIs) and general detail reports 210b, and all categories KPIs and summary reports 210c stored in the invoice line item database 203. The invoice analytics system generates and renders the detail reports 211 by category on a reporting portal of the GUI of the entity device. The invoice analytics system generates the detail reports 211 from a general template. In an embodiment, the invoice analytics system generates the detail reports 211 from custom templates, for example, based on the category of the business services. The data from the detail reports 211 can be extracted into a spreadsheet, for example, a Microsoft® Excel document of Microsoft Corporation, etc. The invoice analytics system performs invoice analytics on the extracted and segmented invoice line item data, generates an interactive, dynamic, and searchable invoice analytics report, and renders the interactive, dynamic, and searchable invoice analytics report across all the categories of the business services on the GUI of the entity device, which can be filtered across the categories. The interactive, dynamic, and searchable invoice analytics report is searchable by service number and business services performed. On performing the invoice analytics, the invoice analytics system renders high level KPIs, for example, efficiency of the vendor, utilization of the vendor for the business services, etc., across all the categories of the business services on a dashboard 212 on the GUI of the entity device, which can be filtered across the categories. The invoice analytics system also renders the feed report across all the categories of the business services on the GUI of the entity device, which can be filtered across categories. In an embodiment, the invoice analytics system renders links on the GUI to access the category specific detail reports 210a.

Figure 3A:
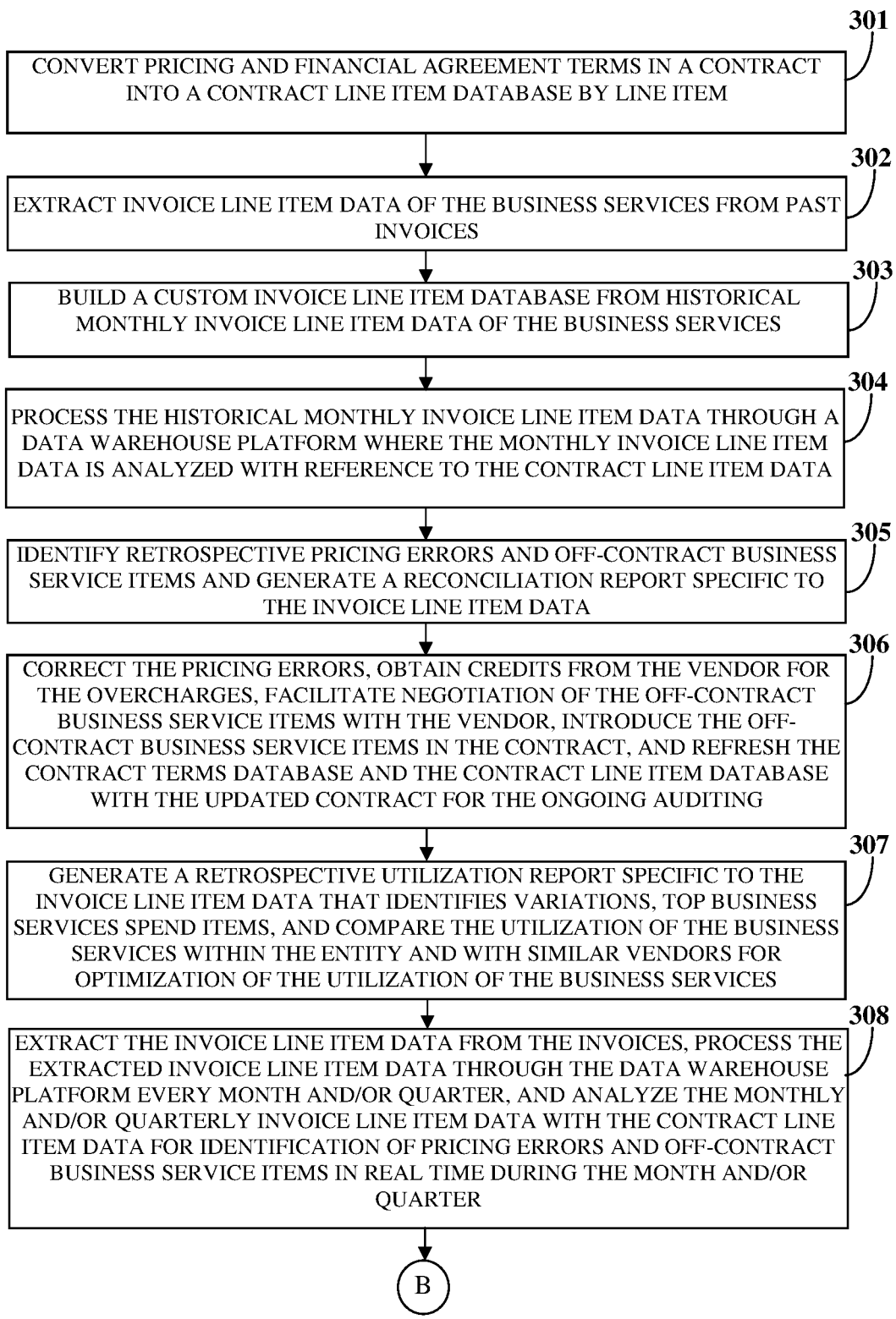
FIGS. 3A-3B exemplarily illustrate a flowchart comprising the steps performed by the invoice analytics system for analyzing business service transactional invoice data of an entity and performing invoice analytics for the entity in real time.
Figure 3B:
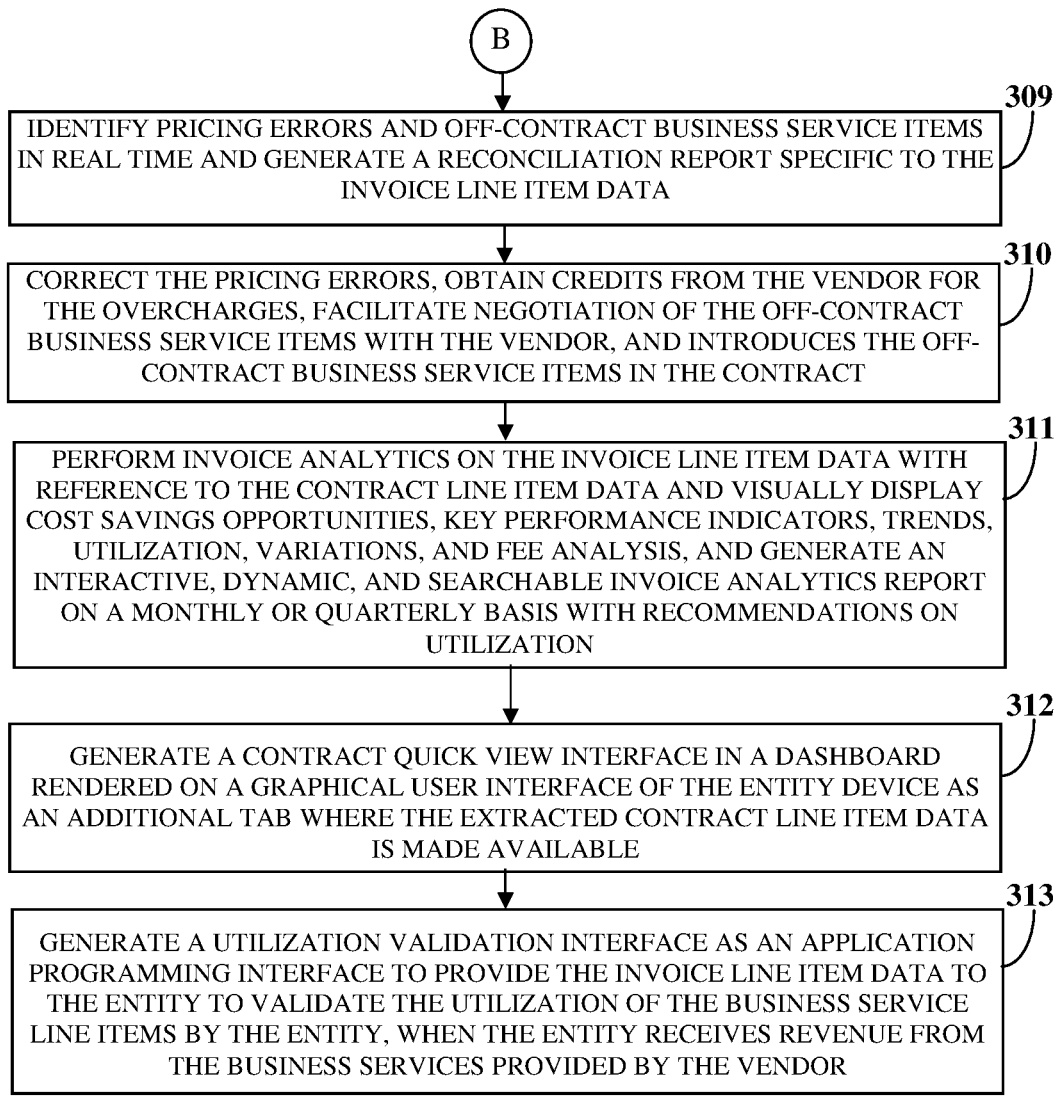

FIGS. 3A-3B exemplarily illustrate a flowchart comprising the steps performed by the invoice analytics system for analyzing business service transactional invoice data of an entity and performing invoice analytics for the entity in real time. The invoice analytics system receives a contract, that is, a business service agreement, from a data source corresponding to a vendor, for example, an outsourced purchased service provider, and reviews the contract for all pricing and financial agreement terms to be extracted using optical character recognition, or manually, or through a custom algorithm executed by the invoice analytics system. The pricing and financial agreement terms comprise, for example, increase in consumer price index, other agreement terms that impact line item pricing of a business service, for example, a professional or purchased service. The invoice analytics system converts 301 the pricing and financial agreement terms in the contract into the contract line item database 205 exemplarily illustrated in FIG. 2, by line item. The invoice analytics system builds the contract line item database 205 to store the business service contracting terms per line item to remove manual intervention in reviewing the contract. The invoice analytics system receives multiple invoices from the vendor and aggregates the business service transactional invoice data of the invoices for a predetermined duration of time. The invoice analytics system extracts 302 invoice line item data of the business services from past invoices, that is, invoices from past months, for example, about 18 to 24 months using optical character recognition. The invoice analytics system builds 303 a custom invoice line item database 203 exemplarily illustrated in FIG. 2, from historical monthly invoice line item data of the business services. The invoice analytics system converts historical line item service pricing and cost details into the invoice line item database 203. The invoice analytics system builds the invoice line item database 203 to store the invoice line item data per line item to remove manual intervention in reconciling the received invoices with the received contract.

The invoice analytics system processes 304 the historical monthly invoice line item data stored in the invoice line item database 203 through a data warehouse platform where the monthly invoice line item data is analyzed with reference to the contract line item data. The invoice analytics system audits the invoice line item data against the contract line item data for the corresponding business service provided by the vendor. In an embodiment, the invoice analytics system initiates the audit on receiving a one click action, for example, a push of a button, from a user, for example, an administrator of the invoice analytics system. The invoice analytics system identifies 305 retrospective pricing errors and off-contract business service items and generates a reconciliation report specific to the invoice line item data. The invoice analytics system also generates a cost savings opportunity report on identifying the retrospective pricing errors and the off-contract business service items. The invoice analytics system corrects 306 the pricing errors, obtains credits from the vendor for the overcharges, and facilitates negotiation of the off-contract business service items with the vendor. Based on the negotiation, the invoice analytics system introduces 306 the off-contract business service items in the contract and facilitates drafting of an updated contract for the ongoing audit of the invoice line item data with the updated contract. The invoice analytics system refreshes the contract terms database and the contract line item database 205 with the updated contract for the ongoing audit.

The invoice analytics system generates 307 a retrospective utilization report specific to the invoice line item data that identifies variations, top business services spend items, and compares the utilization of the business services within the entity and with similar vendors for optimization of the utilization of the business services. The invoice analytics system performs invoice analytics on the invoice line item data with reference to the contract line item data and visually displays insights of utilization of the different business service line items by specific business service. The invoice analytics system performs spend monitoring for the business service line items over time and cost control for corrective action, contract negotiation, and business service line item utilization improvement. Every month and/or quarter, the invoice analytics system extracts 308 the invoice line item data from the invoices and processes the extracted invoice line item data through the data warehouse platform. The invoice analytics system also analyzes 308 the monthly and/or quarterly invoice line item data with the contract line item data in the contract line item database 205 for identification of pricing errors and off-contract business service items in real time during the month and/or quarter.

The invoice analytics system identifies 309 pricing errors and off-contract business service items in real time during the month and/or the quarter and generates a reconciliation report specific to the invoice line item data. The invoice analytics system corrects 310 the pricing errors, obtains credits from the vendor for the overcharges, facilitates negotiation of the off-contract business service items with the vendor, and introduces the off-contract business service items in the contract. The invoice analytics system performs 311 invoice analytics on the invoice line item data with reference to the contract line item data and visually displays cost savings opportunities, key performance indicators, trends, utilization, variations, and fee analysis, and generates an interactive, dynamic, and searchable invoice analytics report on a monthly or quarterly basis with recommendations on utilization and improvement. The invoice analytics system also generates 312 a contracts quick view interface in a dashboard rendered on a graphical user interface of the entity device as an additional tab where the extracted contract line item data is made available. The invoice analytics system also generates 313 a utilization validation interface as an application programming interface to provide the invoice line item data to the entity to validate the utilization of the business service line items by the entity, when the entity receives revenue from the business services provided by the vendor.

For smooth functioning, an entity, for example, a health center outsources and purchases multiple services, for example, a housekeeping service, a linen cleaning service, a laboratory testing service, a document management service, a medical gas delivery service, an organ procurement service, a food service, a waste management service, a storage management service, a blood testing service, a legal processing service, a scope repair service, etc., from multiple vendors. Consider an example where the health center employs the invoice analytics system for analyzing business service transactional invoice data of the health center and performing invoice analytics for the health center in real time. The health center establishes contracts with multiple vendors before the start of the business services by the vendors. The contracts comprise agreement information on the business service transactions between the vendors and the health center. The invoice analytics system creates a contract terms database by vendor comprising the received contracts and extracts contract line item data from the received contracts in the contract terms database. The invoice analytics system creates a contract line item database 205 for storing the extracted contract line item data. The invoice analytics system also receives invoices from each of the vendors corresponding to the business transactions between the health center and the vendors and aggregates the business service transactional invoice data of the received invoices by vendor and by a predefined duration of time, for example, by month, by quarter, etc., in an invoice aggregation database. The invoice analytics system extracts and segments invoice line item data from the aggregated business service transactional invoice data and creates an invoice line item database 203 for storing the extracted and segmented invoice line item data. The invoice analytics system performs reconciliation of the received invoices in accordance with the received contracts, performs invoice analytics on the extracted and segmented invoice line item data, and generates an interactive, dynamic, and searchable invoice analytics report based on the invoice analytics as disclosed in the detailed description of FIGS. 1A-1B.

FIG. 4 exemplarily illustrates an invoice 401 comprising business service transactional invoice line item data received by the invoice analytics system for extracting and segmenting invoice line item data. The invoice 401 is provided to an entity, for example, a health center by a vendor, for example, a professional service provider. The invoice 401 comprises labor expense 402 and reimbursable expenses 403 of personnel performing professional services for the health center. All the professional service items under the labor expense 402 and the reimbursable expenses 403 in the invoice 401 constitute the business service transactional invoice data. Under the labor expense 402, the professional service items comprising, for example, a description of the personnel performing the professional services for the health center such as name of the personnel, designation of the personnel, the number of hours each of the personnel has spent on different aspects of the professional services and per hour charges of each of the personnel, labor expense per personnel, total labor expense for the professional services, etc., constitute the business service transactional invoice data. Under the reimbursable expenses 403, the professional services items comprising, for example, all reimbursable expenses with corresponding descriptions such as an example subconsultant firm, data collection services, project reproduction, etc., constitute the business service transactional invoice data. The total of the current invoice 404 also constitutes the business service transactional invoice data.

Figure 5A:
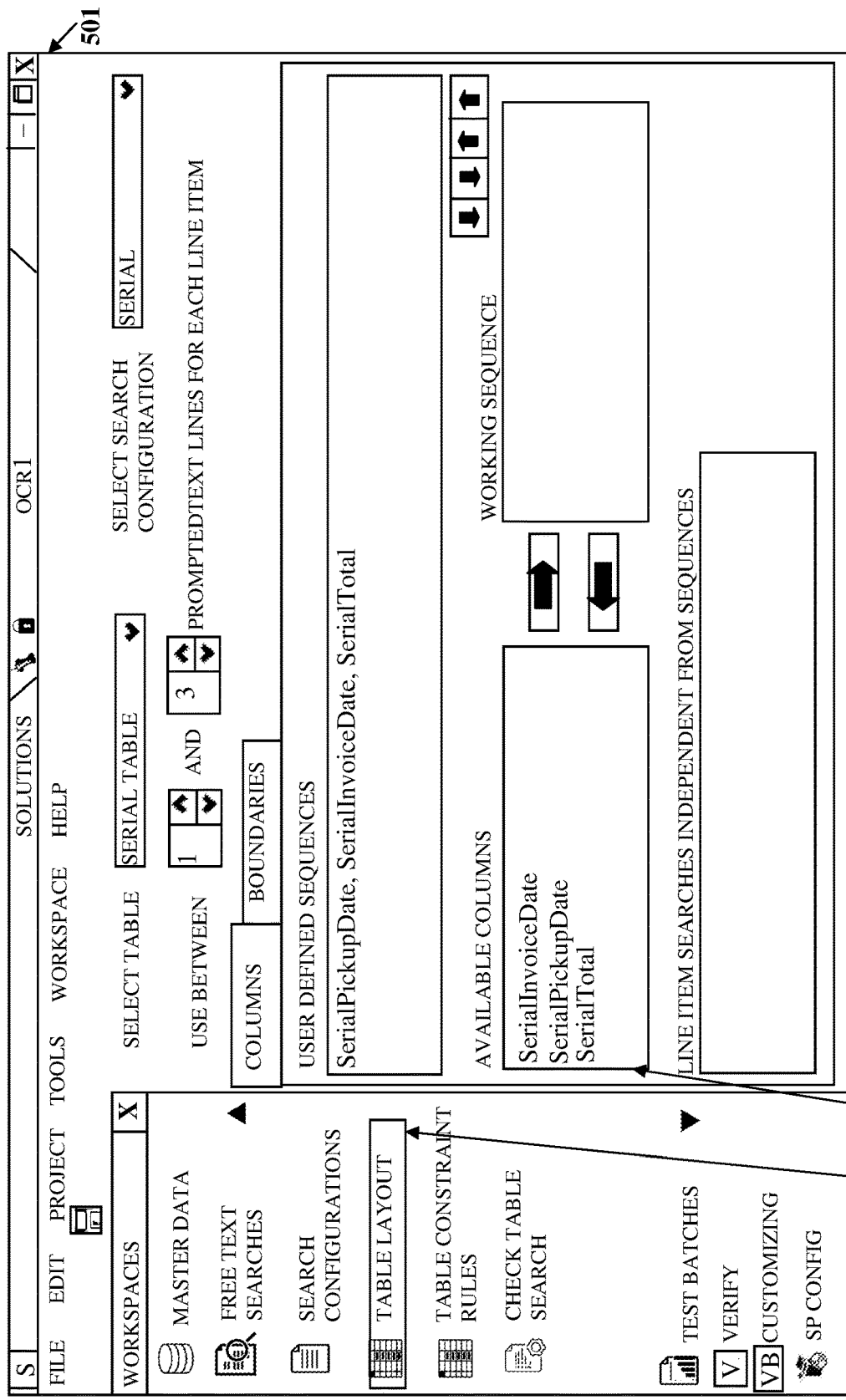
Figure 5B:
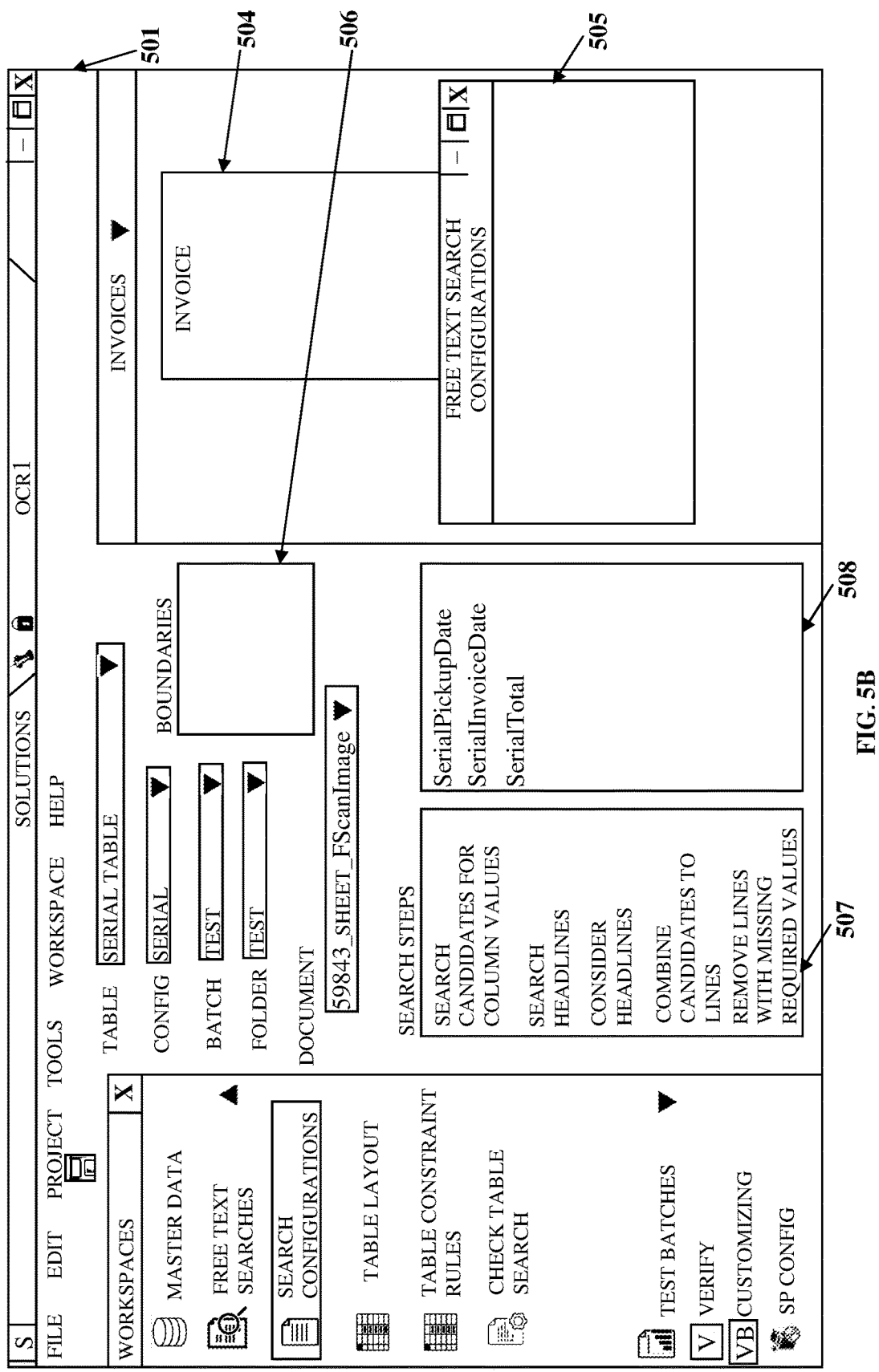
Figure 5D:
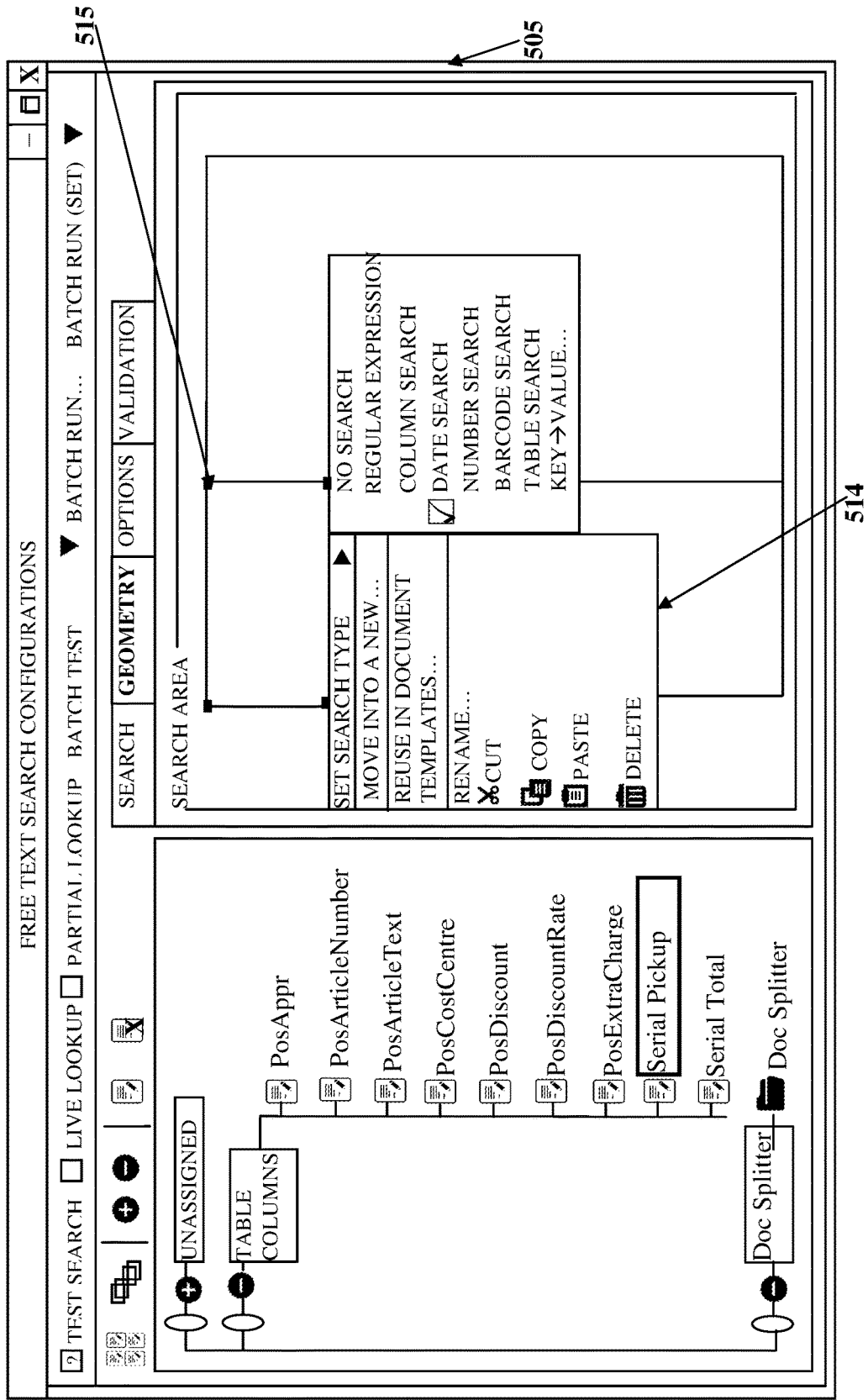
Figure 5E:
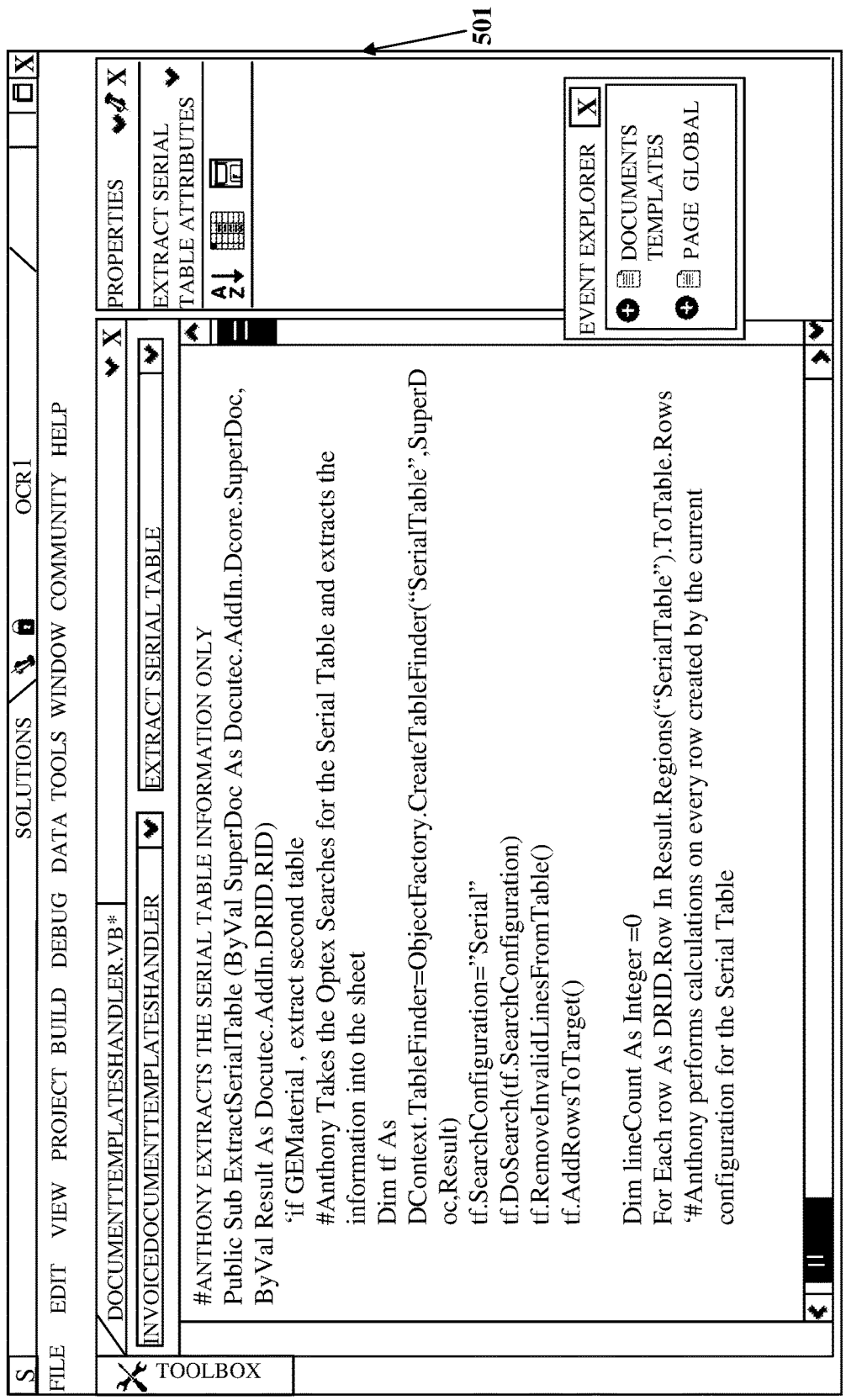

FIGS. 5A-5I exemplarily illustrate screenshots of an optical character recognition interface 501 provided by the invoice analytics system for performing optical character recognition on an invoice 504 exemplarily illustrated in FIGS. 5B-5C, received from a vendor, for example, a scope repair service provider to extract and segment invoice line item data from business service transactional invoice data of the invoice 504. As exemplarily illustrated in FIG. 5A, the optical character recognition interface 501 allows an administrator of the invoice analytics system to configure the optical character recognition being performed on the received invoice 504. The different features that can be configured comprise, for example, layout of the tables that constitute the invoice line item database 203 exemplarily illustrated in FIG. 2, settings for the invoice line item data that is to be extracted from the invoice 504, etc. Under a table layout option 502 exemplarily illustrated in FIG. 5A, the administrator of the invoice analytics system configures different columns in the tables of the invoice line item database 203, headers of the columns in each table, a sequence of the columns in each table, etc. As exemplarily illustrated in FIG. 5A, the administrator of the invoice analytics system defines the columns 503 of the table named, for example, SerialTable as, for example, SerialPickupDate, SerialInvoiceDate, and SerialTotal in that sequence.

As exemplarily illustrated in FIG. 5B, the administrator of the invoice analytics system configures different invoice line item data to be extracted from the received invoice 504 in the optical character recognition interface 501. For example, the administrator configures the invoice line item data under the column headers 508 SerialPickupDate, SerialInvoiceDate, SerialTotal, etc., to be extracted from the received invoice 504. The received invoice 504 is a scanned copy of a physical document. The administrator configures boundaries 506 of a region in the invoice 504 that has to be searched by the invoice analytics system for extracting the invoice line item data using optical character recognition. The optical character recognition interface 501 also enumerates different steps 507 to be carried out by the invoice analytics system for performing optical character recognition on the received invoice 504. The administrator selects the headers 508 of the columns under which the invoice line item data has to be extracted from the business service transactional invoice data of the received invoice 504 using a free text search configuration interface 505 exemplarily illustrated in FIG. 5D.

As exemplarily illustrated in FIG. 5C, the received invoice 504 comprises business service transactional invoice data. The business service transactional invoice data in the received invoice 504 comprises, for example, a pickup date 509, an invoice date 510, an invoice total 511, a repair item description 512, approval 513, etc. The invoice analytics system highlights regions in the received invoice 504 that contain the business service transactional invoice data as defined by the boundaries 506 configured by the administrator of the invoice analytics system. For a particular model of a scope repaired by the scope repair service provider, the invoice analytics system identifies invoice line item data that falls under the column headers SerialPickupDate, SerialInvoiceDate, and SerialTotal. As exemplarily illustrated in FIG. 5D, the free text search configuration interface 505 is used for configuring parameters corresponding to the search of the identified invoice line item data, that is, the pickup date 509, the invoice date 510, the invoice total 511, etc., by the invoice analytics system. The free text search configuration interface 505 allows the administrator of the invoice analytics system to configure a search type 514 to a date search as the invoice line item data being searched, for example, the pickup date 509 and the invoice date 510 are of a date data type. The free text search configuration interface 505 also allows the administrator of the invoice analytics system to adjust the boundaries of the region to be searched in the received invoice 504 dynamically using points on a geometrical search area 515. The invoice analytics system transforms input received in the free text search configuration interface 505 into computer program instructions rendered on the graphical user interface 501 as exemplarily illustrated in FIG. 5E.

Figure 5F:
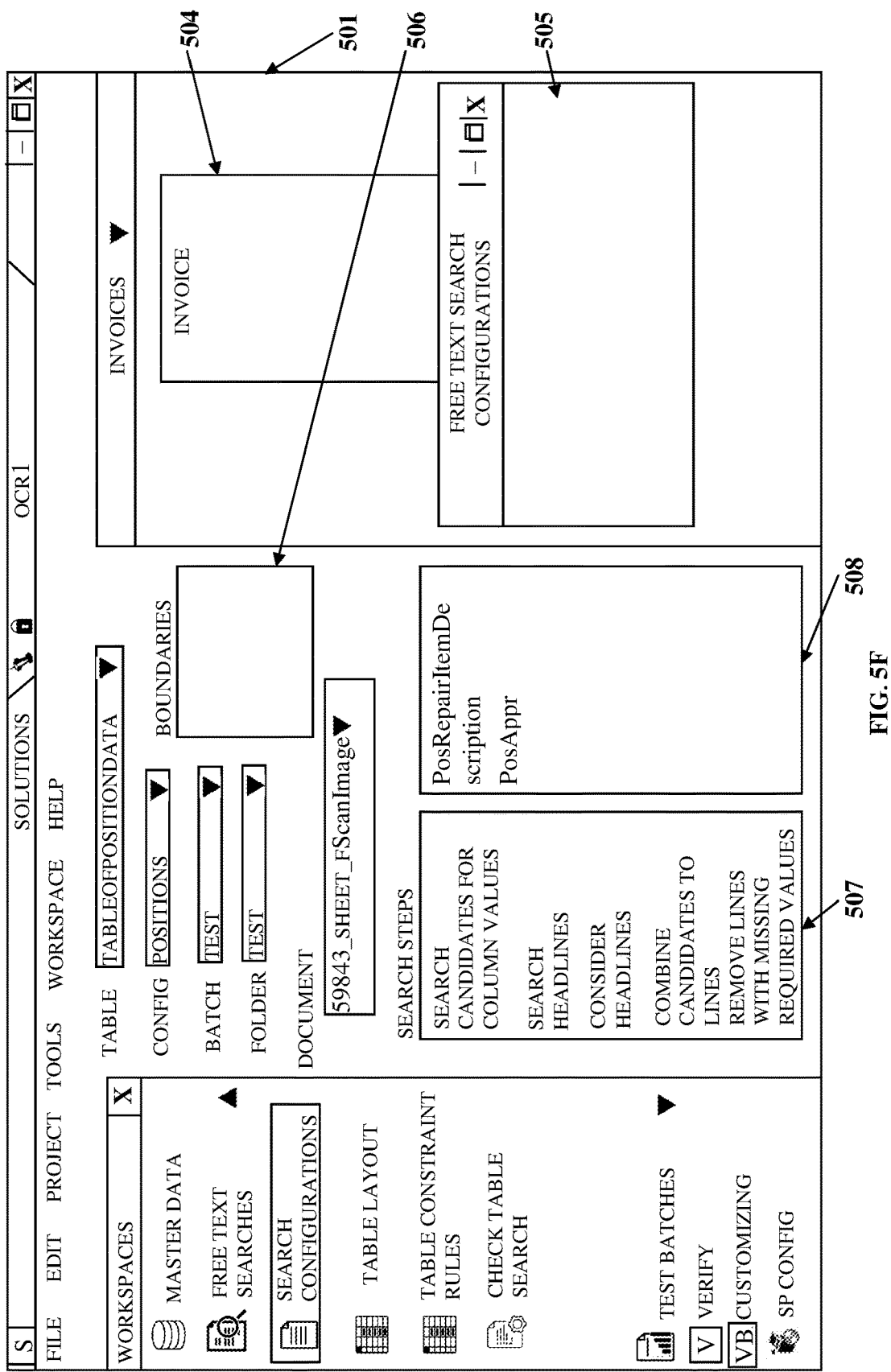
Figure 5H:
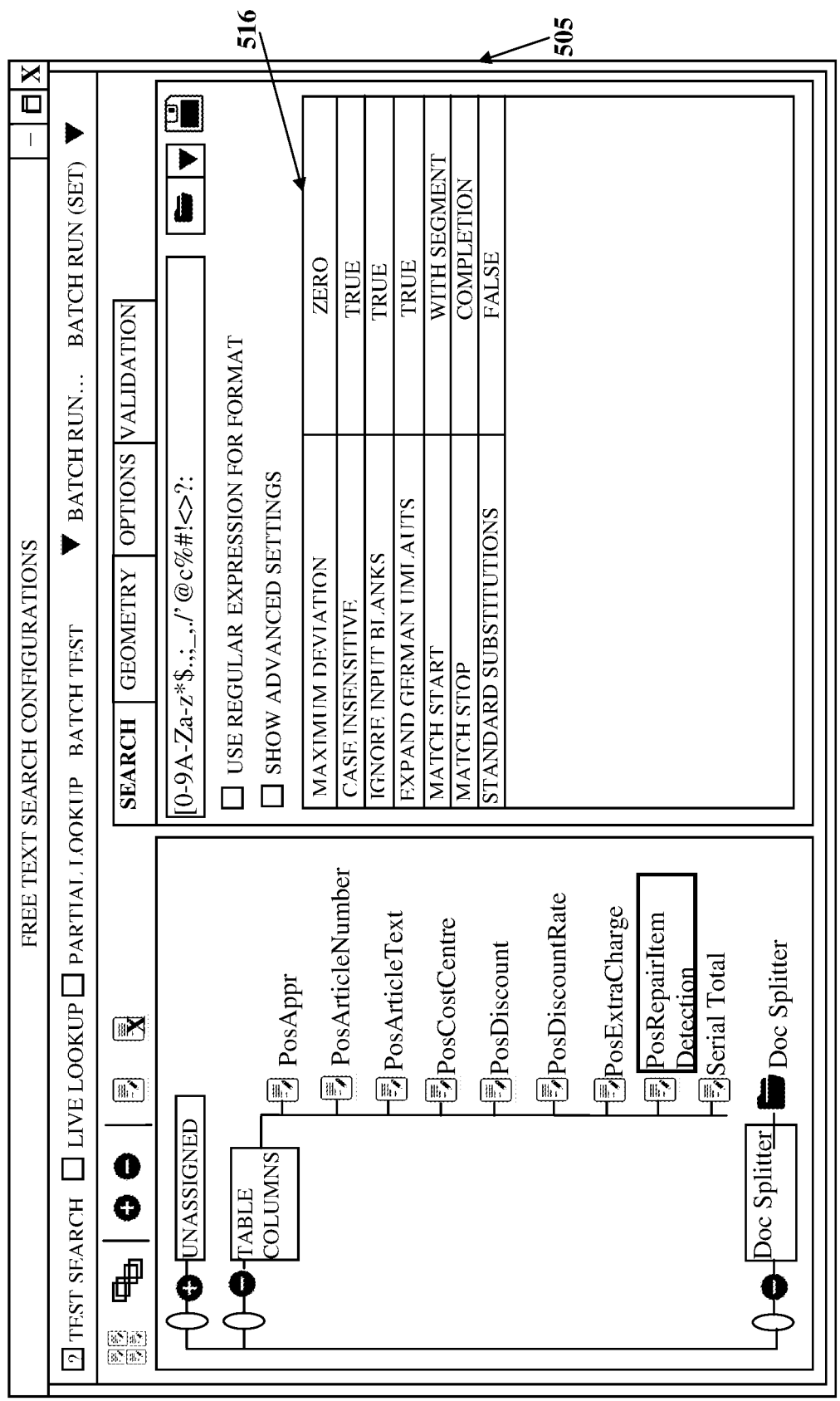
Figure 5I:
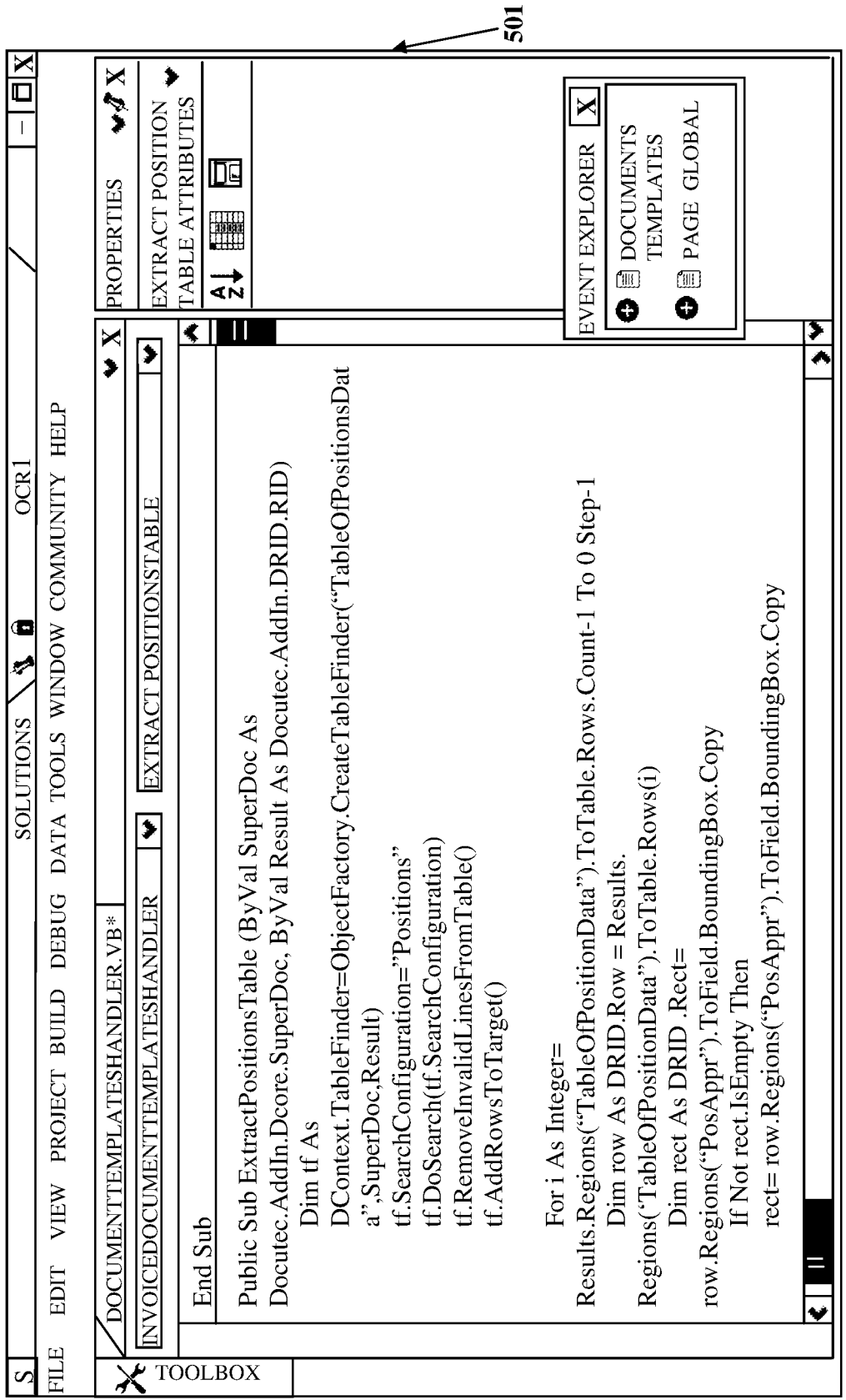

As exemplarily illustrated in FIG. 5F, the administrator of the invoice analytics system configures different invoice line item data to be extracted from the received invoice 504 in the optical character recognition interface 501. For example, the administrator configures the invoice line item data under the column headers 508 posRepairItemDescription and PosAppr to be extracted from the received invoice 504. The administrator configures the boundaries 506 of the region in the received invoice 504 that has to be searched by the invoice analytics system for extracting the invoice line item data using optical character recognition. The invoice analytics system highlights regions in the received invoice 504 with the business service transactional invoice data as per the boundaries 506 configured by the administrator. For a particular model of the scope repaired by the scope repair service provider, the invoice analytics system identifies invoice line item data 512 and 513 that falls under the column headers posRepairItemDescription and PosAppr respectively, as exemplarily illustrated in FIG. 5G. As exemplarily illustrated in FIG. 5H, the free text search configuration interface 505 is used for configuring parameters 516 corresponding to the search of the identified invoice line item data, for example, start of search, end of search, search for case insensitive, etc., in the received invoice 504 by the invoice analytics system. The invoice analytics system transforms input received in the free text search configuration interface 505 into computer program instructions rendered on the optical recognition interface 501 as exemplarily illustrated in FIG. 5I.

Figure 6A:
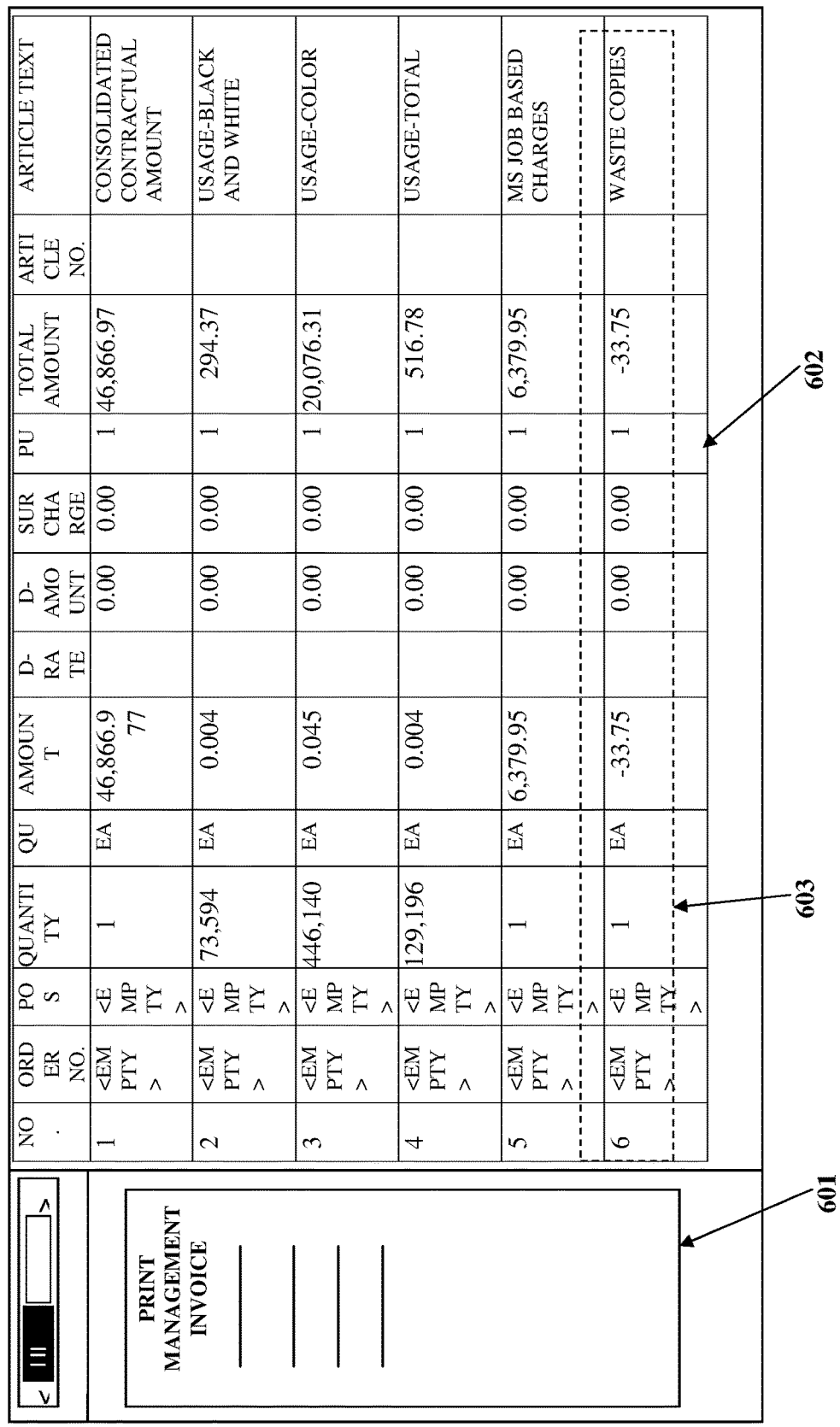

FIGS. 6A-6B exemplarily illustrate screenshots of a graphical user interface provided by the invoice analytics system, displaying an invoice 601 received from a vendor, for example, a document management service provider, and a table 602 comprising invoice line item data 603 extracted from business service transactional invoice data 604 of the invoice 601 and segmented by the invoice analytics system. As exemplarily illustrated in FIGS. 6A-6B, the invoice 601 comprises business service transactional invoice data 604 corresponding to each of the business services performed by the document management service provider. The invoice analytics system extracts and segments invoice line item data 603 from the business service transactional invoice data 604 of the invoice 601 into the table 602 using optical character recognition and an extract, transform, and load (ETL) operation as disclosed in the detailed description of FIG. 2. As exemplarily illustrated in FIG. 6B, the invoice analytics system identifies business service transactional invoice data 604 for waste copies as 1 unit in quantity at a price of −33.75. The invoice analytics system identifies the computed amount for total quantity of waste copies as −33.75. Using optical character recognition, the invoice analytics system populates the table 602 with each of the extracted and segmented invoice line item data 603, for example, quantity, amount, description of the business services, etc. The invoice analytics system also identifies and computes billing errors in the invoice 601 after populating the table 602 with the extracted and segmented invoice line item data 603. The table 602 is a part of the invoice line item database 203 exemplarily illustrated in FIG. 2, created by the invoice analytics system.

Figure 7A:
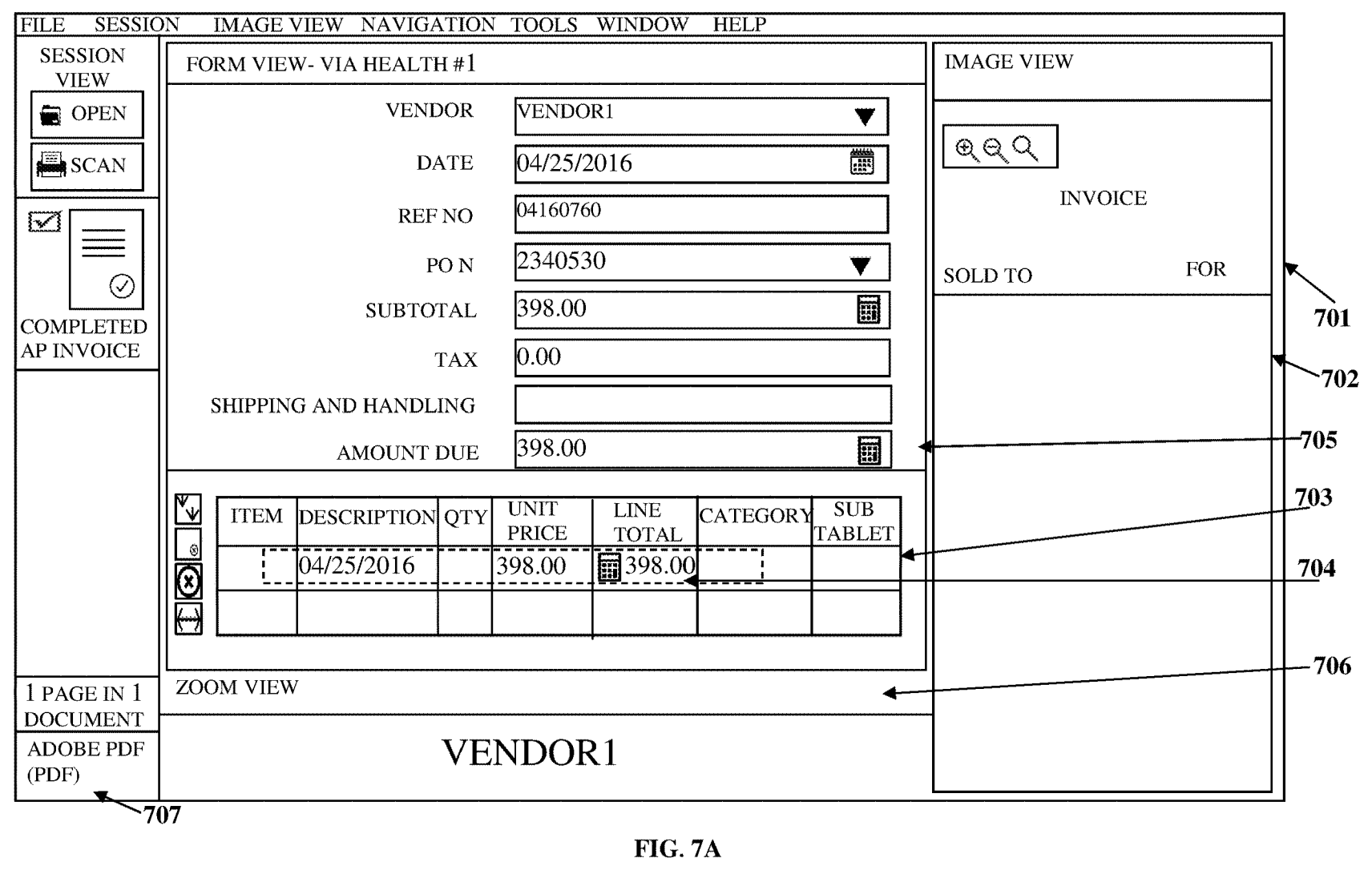

FIGS. 7A-7B exemplarily illustrate screenshots of an optical character recognition interface 701 provided by the invoice analytics system for performing optical character recognition on an invoice 702 received from a vendor, for example, a housekeeping service provider, to extract and segment invoice line item data 704 from the invoice 702 and populate a table 703 for reconciliation of the received invoice 702. The optical character recognition interface 701 exemplarily illustrated in FIG. 7A, lists electronic documents of the received invoices that are stored in the invoice aggregation database in a session view panel 707. The invoice analytics system extracts and segments invoice line item data 704 from the invoice 702 and stores the extracted and segmented invoice line item data 704 in the invoice line item database 203 exemplarily illustrated in FIG. 2. The optical character recognition interface 701 provides a form view 705 of the extracted and segmented invoice line item data 704 that is added to the table 703 in the invoice line item database 203. The form view 705 provides options to an administrator of the invoice analytics system to edit the extracted and segmented invoice line item data 704 before populating the table 703. The optical character recognition interface 701 also provides a zoom view 706 of the invoice 702 to view the business service transactional invoice data 708 on the electronic document of the invoice 702 clearly. As exemplarily illustrated in FIG. 7B, the administrator of the invoice analytics system draws a region around the business service transactional invoice data 708 in the invoice 702 that has to be extracted by the invoice analytics system as the invoice line item data 704.

Figure 8C:
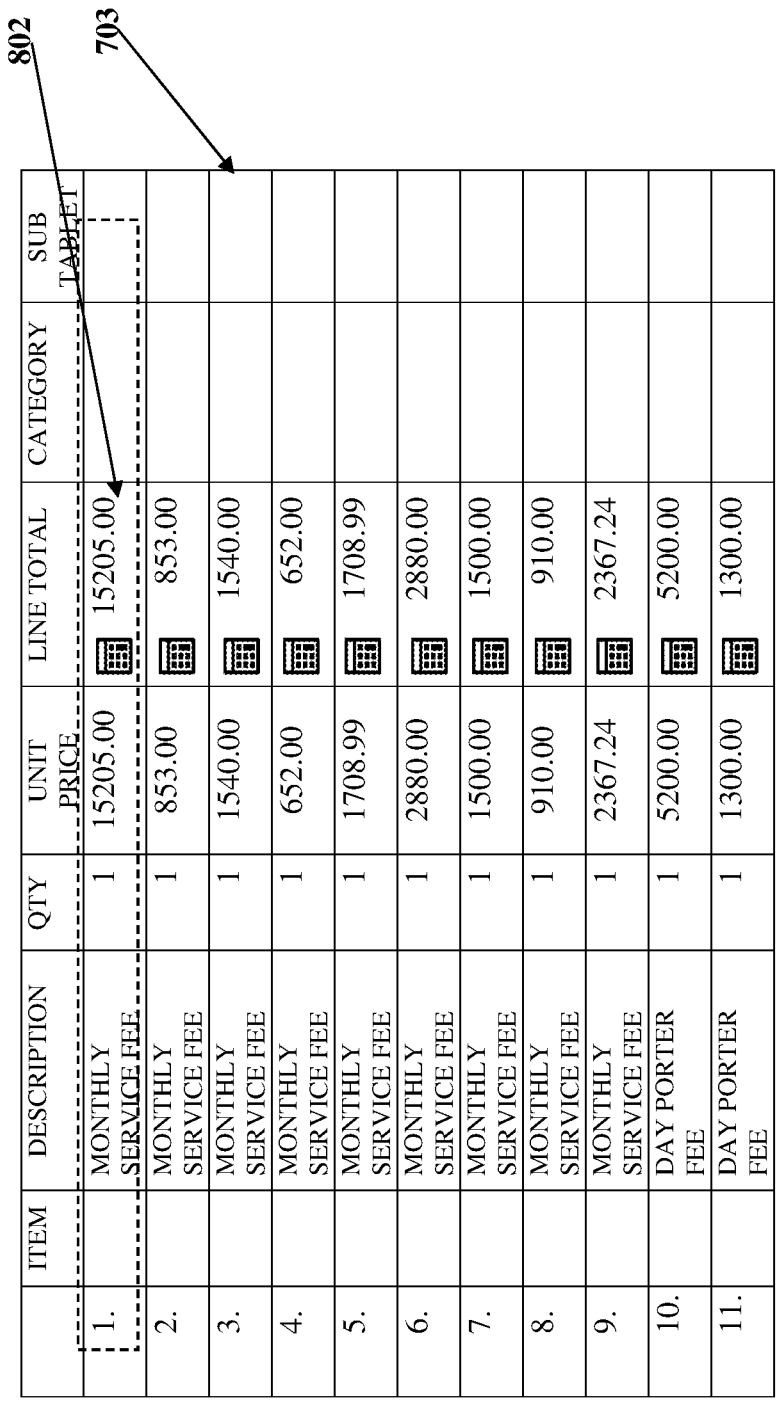

FIGS. 8A-8C exemplarily illustrate screenshots of an optical character recognition interface 701 provided by the invoice analytics system for performing optical character recognition on an invoice 801 received from a vendor, for example, a housekeeping service provider, to extract and segment invoice line item data 802 from the invoice 801 and populate a table 703 for reconciliation of the received invoice 801. The optical character recognition interface 701 exemplarily illustrated in FIG. 8A, comprises a session view panel 707 and provides a form view 705 and a zoom view 706 of the invoice 801 as disclosed in the detailed description of FIGS. 7A-7B. FIG. 8B exemplarily illustrates the business service transactional invoice data 803 in the invoice 801 from which the invoice analytics system extracts and segments the invoice line item data 802. The invoice analytics system adds the extracted and segmented invoice line item data 802 to the table 703 as exemplarily illustrated in FIG. 8C, in the invoice line item database 203 exemplarily illustrated in FIG. 2.

FIGS. 9A-9B exemplarily illustrate screenshots of an optical character recognition interface 701 provided by the invoice analytics system for performing optical character recognition on an invoice 901 received from a vendor, for example, a waste management service provider, to extract and segment invoice line item data 902 from the invoice 901 and populate a table 703 for reconciliation of the received invoice 901. The optical character recognition interface 701 exemplarily illustrated in FIG. 9A, comprises a session view panel 707 and provides a form view 705 of the invoice 901 as disclosed in the detailed description of FIGS. 7A-7B. FIG. 9B exemplarily illustrates the business service transactional invoice data 903 in the invoice 901 from which the invoice analytics system extracts and segments the invoice line item data 902. The invoice analytics system adds the extracted and segmented invoice line item data 902 to the table 703 exemplarily illustrated in FIG. 9A, in the invoice line item database 203 exemplarily illustrated in FIG. 2.

Figure 10A:
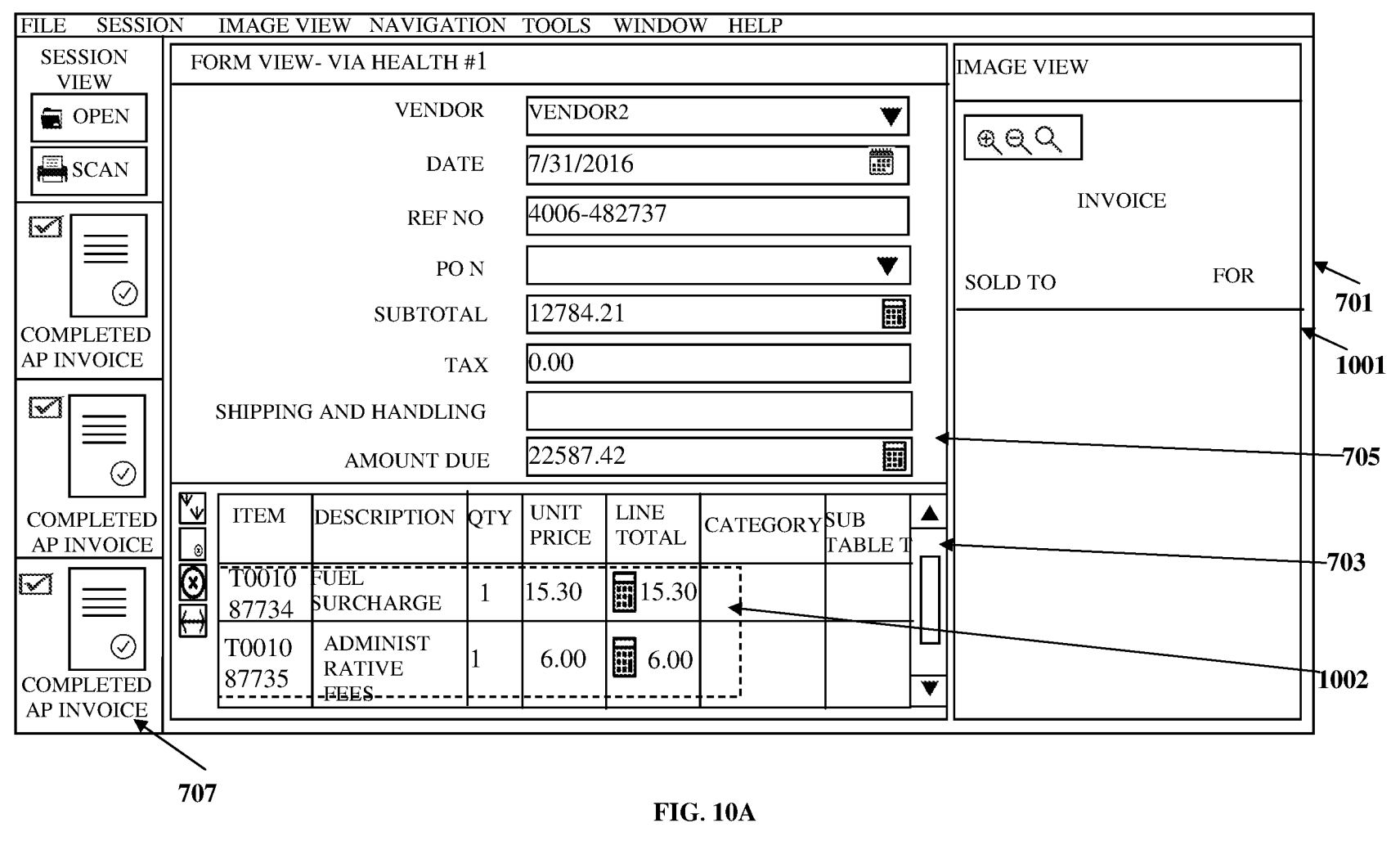

FIGS. 10A-10B exemplarily illustrate screenshots of an optical character recognition interface 701 provided by the invoice analytics system for performing optical character recognition on an invoice 1001 received from a vendor, for example, a waste management service provider, to extract and segment invoice line item data 1002 from the invoice 1001 and populate a table 703 for reconciliation of the received invoice 1001. The optical character recognition interface 701 exemplarily illustrated in FIG. 10A, comprises a session view panel 707 and provides a form view 705 as disclosed in the detailed description of FIGS. 7A-7B. FIG. 10B exemplarily illustrates the business service transactional invoice data 1003 in the invoice 1001 from which the invoice analytics system extracts and segments the invoice line item data 1002. The invoice analytics system adds the extracted and segmented invoice line item data 1002 to the table 703 exemplarily illustrated in FIG. 10A, in the invoice line item database 203 exemplarily illustrated in FIG. 2.

Figure 11B:
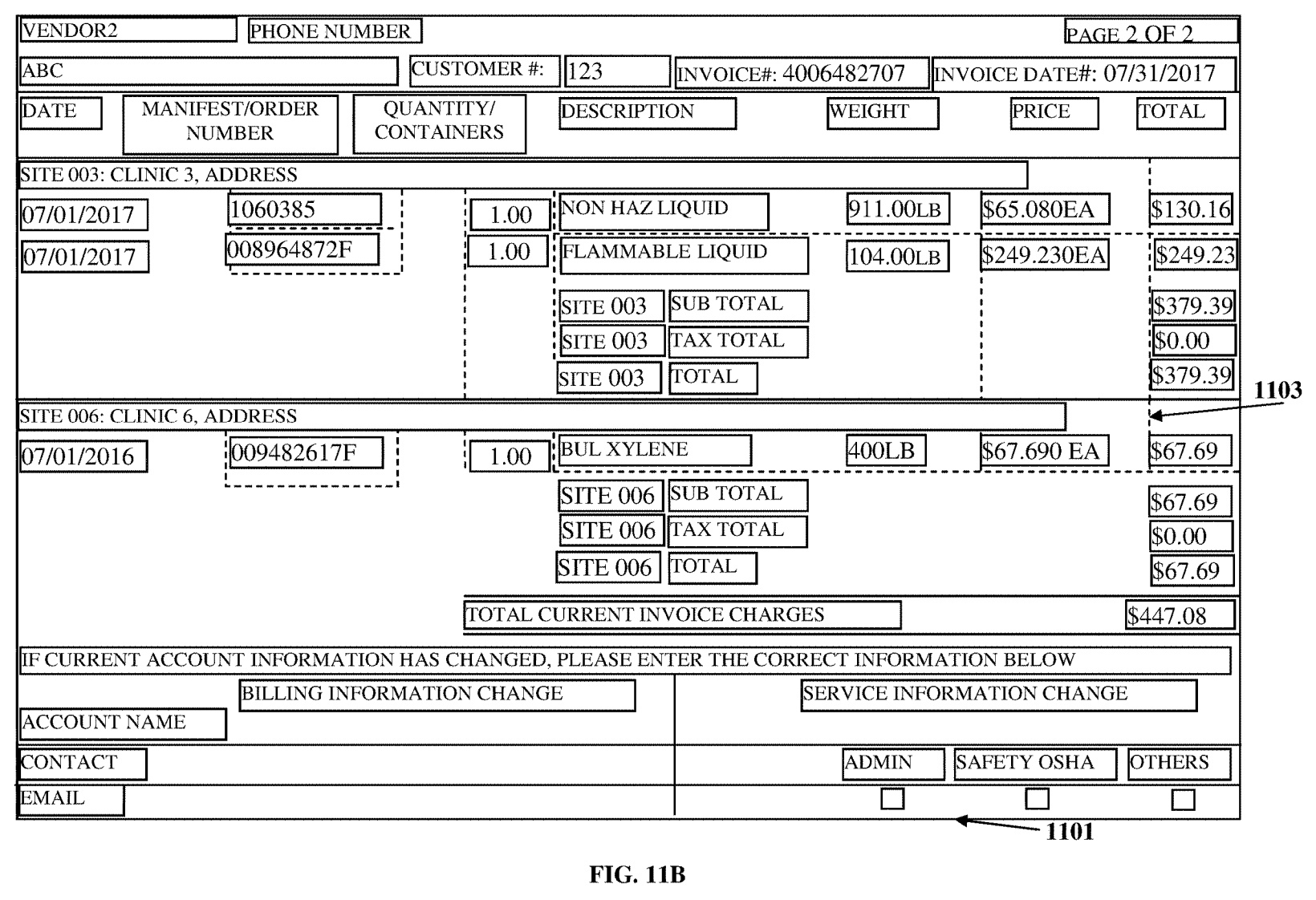

FIGS. 11A-11B exemplarily illustrate screenshots of an optical character recognition interface 701 provided by the invoice analytics system for performing optical character recognition on an invoice 1101 received from a vendor, for example, a waste management service provider, to extract and segment invoice line item data and populate a table 703 for reconciliation of the received invoice 1101. The optical character recognition interface 701 exemplarily illustrated in FIG. 11A, provides a form view 705 as disclosed in the detailed description of FIGS. 7A-7B. FIG. 11B exemplarily illustrates the business service transactional invoice data 1103 in the invoice 1101 from which the invoice analytics system extracts and segments the invoice line item data. The invoice analytics system computes previous balances of the waste management service provider by invoice using the previously extracted and segmented invoice line item data and computes the current adjustments in the business service transactions based on the computed previous balances. The invoice analytics system can perform these computations as the invoice analytics system is linked to an operational system of the entity. The invoice analytics system stores the previous balances and current adjustments as invoice line item data 1102 in the table 703 exemplarily illustrated in FIG. 11A, in the invoice line item database 203 exemplarily illustrated in FIG. 2.

Figure 12B:
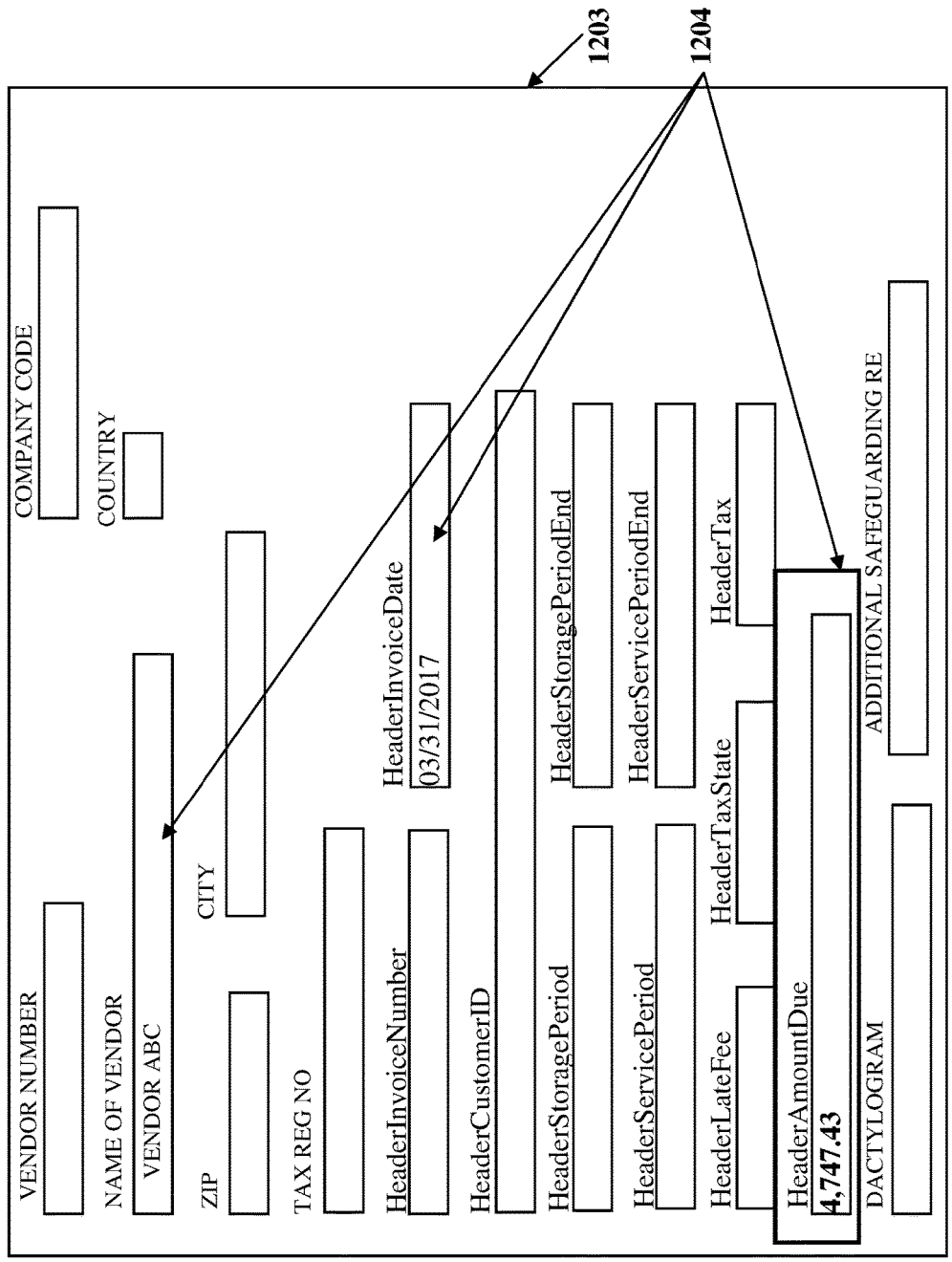

FIGS. 12A-12C exemplarily illustrate screenshots displaying an invoice 1201 of a vendor, for example, a storage management service provider, a form 1203 comprising invoice line item data 1204, and a table 1206 comprising the invoice line item data 1207 extracted from business service transactional invoice data 1202 of the invoice 1201 respectively. As exemplarily illustrated in FIG. 12A, the invoice 1201 comprises business service transactional invoice data 1202 of each of the business services performed by the storage management service provider. The invoice analytics system extracts and segments invoice line item data 1204 from the business service transactional invoice data 1202 of the received invoice 1201 into the form 1203 as exemplarily illustrated in FIG. 12B, using optical character recognition and an extract, transform, and load (ETL) operation as disclosed in the detailed description of FIG. 2. Using optical character recognition, the invoice analytics system fills the form 1203 with each of the extracted invoice line item data 1204. The fields in the form 1203 correspond to different business service transactional invoice data 1202 in the invoice 1201, for example, vendor number, vendor name, zip code of the vendor, invoice number, invoice date, etc. The invoice analytics system, using optical character recognition, automatically identifies the business service transactional invoice data 1202 in the invoice 1201, for example, vendor name as vendor ABC, invoice date as Mar. 31, 2017, and invoice amount due as 4747.43 and maps the identified business service transactional invoice data 1202 to different fields in the form 1203 as exemplarily illustrated in FIG. 12B, as the invoice line item data 1204. By entering the extracted and segmented invoice line item data 1204 to the different fields in the form 1203, the invoice analytics system populates the invoice line item database 203 exemplarily illustrated in FIG. 2.

FIG. 12C exemplarily illustrates a screenshot of a graphical user interface 1205 provided by the invoice analytics system, displaying an invoice 1201 of a vendor, for example, a storage management service provider, and the table 1206 comprising invoice line item data 1207 extracted from the business service transactional invoice data 1202 of the invoice 1201 by the invoice analytics system. The invoice analytics system identifies the business service transactional invoice data 1202, for example, quantity for trip charge, half day delivery as 2.00. The invoice analytics system extracts and segments the invoice line item data 1207 from the business service transactional invoice data 1202 of the received invoice 1201 into the table 1206 using optical character recognition and an extract, transform, and load (ETL) operation as disclosed in the detailed description of FIG. 2. Using optical character recognition, the invoice analytics system populates the table 1206 with each of the extracted invoice line item data 1207. On hovering a cursor on the extracted invoice line item data 1207 in the table 1206, the invoice analytics system zooms over the extracted invoice line item data 1207 to provide a magnified view to an administrator of the invoice analytics system.

Figure 13A:
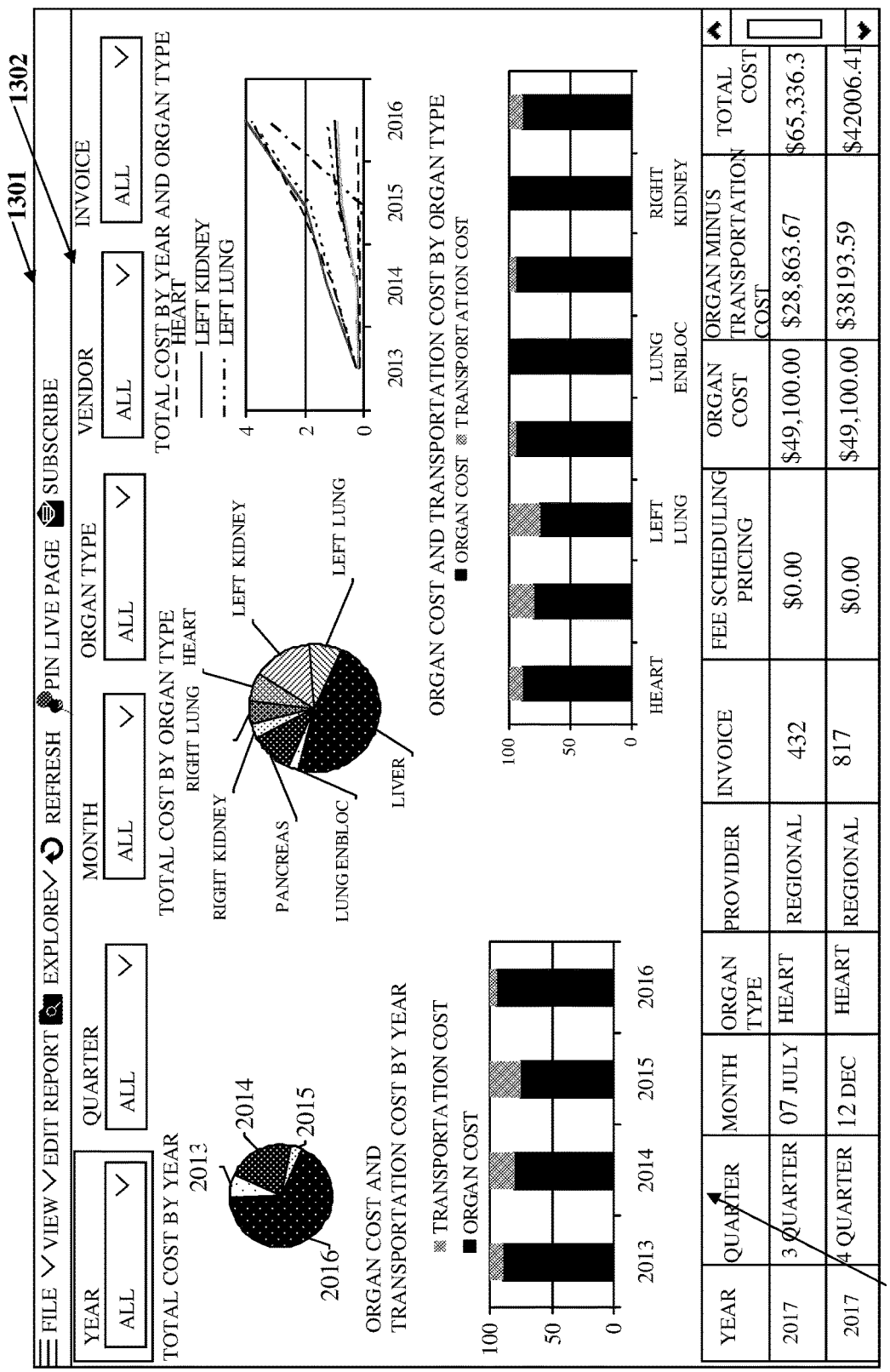
FIGS. 13A-13C exemplarily illustrate screenshots of a graphical user interface provided by the invoice analytics system, displaying an interactive, dynamic, and searchable invoice analytics report generated by the invoice analytics system.
Figure 13B:
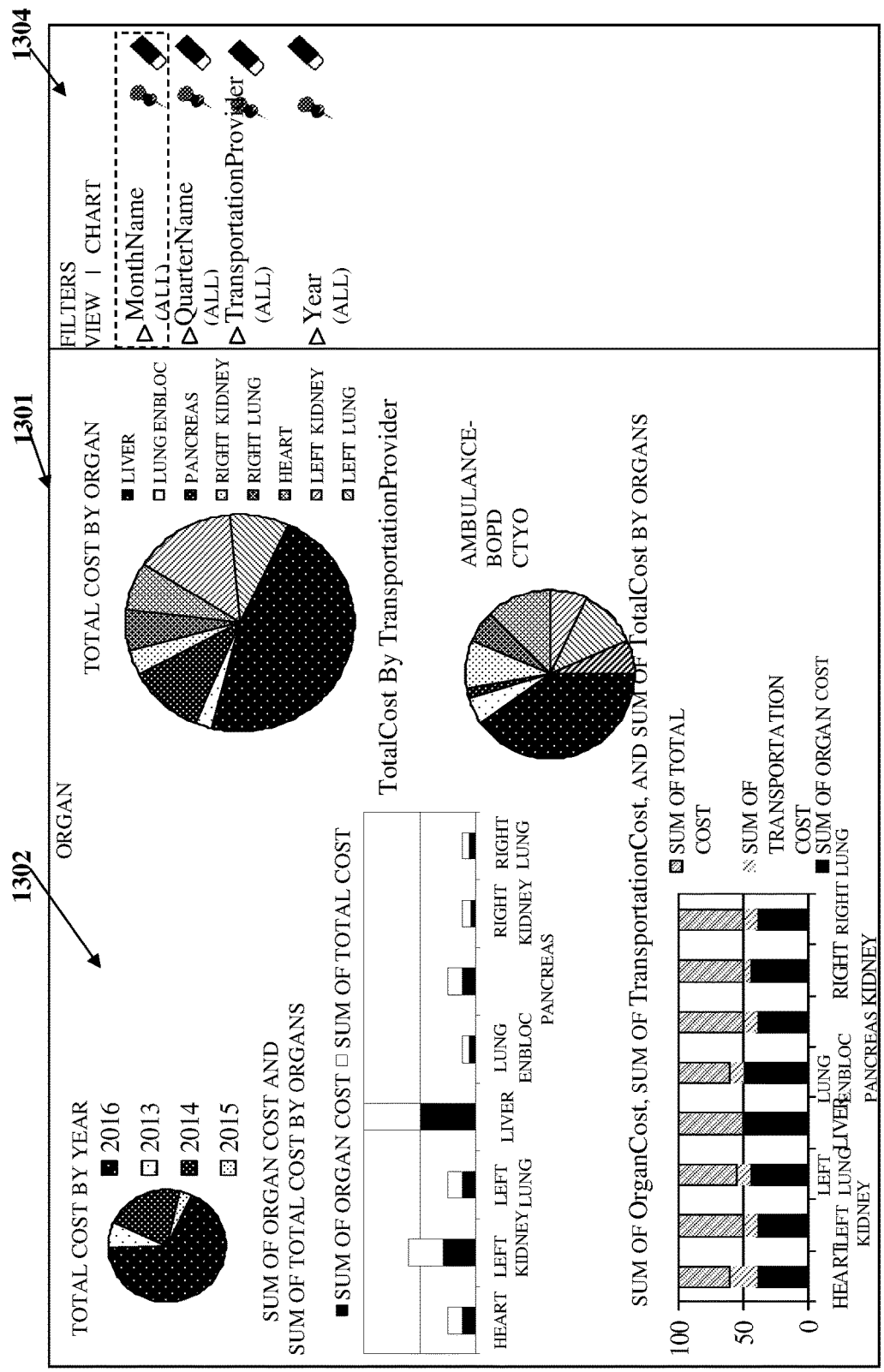
Figure 13C:
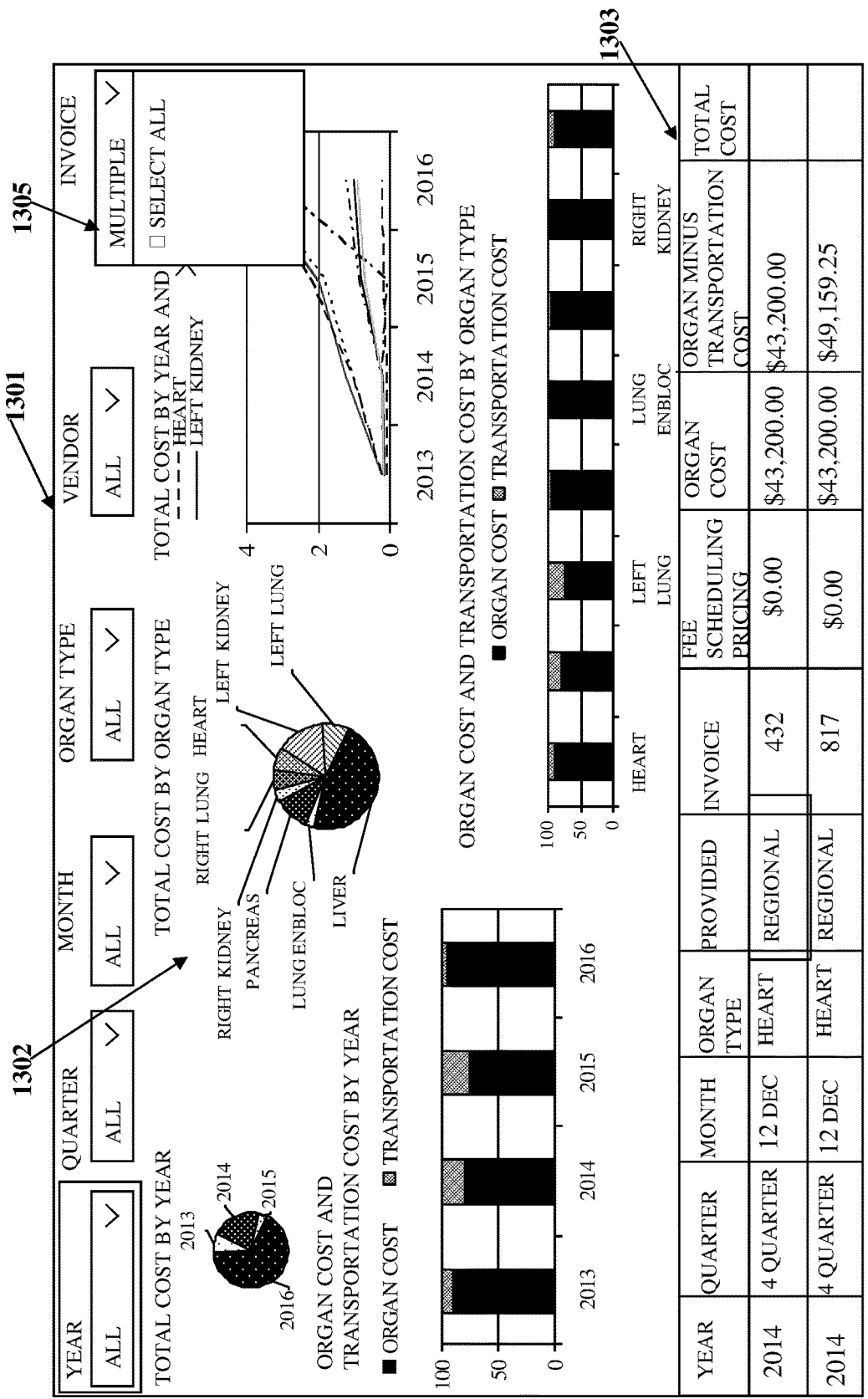

FIGS. 13A-13C exemplarily illustrate screenshots of a graphical user interface (GUI) 1301 provided by the invoice analytics system, displaying an interactive, dynamic, and searchable invoice analytics report 1302 generated by the invoice analytics system. The invoice analytics system generates the interactive, dynamic, and searchable invoice analytics report 1302 for multiple vendors of business services, for example, organ procurement services, over a predefined duration of time, for example, a year, a month, a quarter, etc. The invoice analytics system employed by an entity, for example, a health center analyzes business service transactions between the health center and organ procurement service providers and performs invoice analytics for the health center in real time. As exemplarily illustrated in FIGS. 13A-13C, the invoice analytics system generates and renders the interactive, dynamic, and searchable invoice analytics report 1302 on the GUI 1301 after performing invoice analytics on invoice line item data extracted and segmented from invoices of the organ procurement service providers and contract line item data extracted from contracts established between the health center and the organ procurement service providers. The graphical data representations in the interactive, dynamic, and searchable invoice analytics report 1302 are searchable and can be filtered by a predefined duration of time, by organ procurement service providers, by the aggregated business service transactional invoice data of the invoices of the organ procurement service providers, by the organ procured, etc. The filters are applied on the graphical data representations using drop down menus, radio buttons, an adjustment bar, etc., provided on the GUI 1301.

As exemplarily illustrated in FIGS. 13A-13C, the invoice analytics system renders different graphical data representations, for example, a pie chart, bar graphs, etc., of the computed total spend of the health center by a predefined duration of time, for example, a year, by the organ transported, etc. The trends in the total spend of the health center over the year indicate the purchase patterns of the health center over the year, the variations in the purchase patterns in procurement of a particular organ, for example, a heart, a left kidney, a right kidney, a left lung, a right lung, liver, pancreas, etc. Using the trends of the past years, for example, 2013, 2014, 2015, and 2016, the invoice analytics system performs predictive analytics on the purchase patterns and forecasts the purchase patterns per organ in the coming years for the health center and displays the forecasted purchase patterns as graphical data representations in the interactive, dynamic, and searchable invoice analytics report 1302. In an embodiment, the invoice analytics system generates and renders a feed report 1303 as a section in the interactive, dynamic, and searchable invoice analytics report 1302 with the extracted and segmented invoice line item data from the different invoices received from the organ procurement service providers by year, by organ procurement service provider, etc.

FIG. 13B exemplarily illustrates a screenshot of the graphical user interface (GUI) 1301 provided by the invoice analytics system, displaying filters that can be applied on the graphical data representations in the interactive, dynamic, and searchable invoice analytics report 1302. The invoice analytics system provides the filters to be applied on the graphical data representations in a side panel 1304. The invoice analytics system allows a user of the entity device to filter the graphical data representations based, for example, on a predefined duration of time such as a month, a quarter, a year, etc., on the different organ procurement providers, etc. Furthermore, the invoice analytics system allows the user to view graphical data representations of the same type, for example, a line graph, or a bar graph, or a pie chart, etc. The interactive, dynamic, and searchable invoice analytics report 1302 is dynamic such that the filters that are applied on the graphical data representations take effect immediately, that is, in real time.

FIG. 13C exemplarily illustrates a screenshot of the graphical user interface (GUI) 1301 provided by the invoice analytics system, displaying a selection of filters for filtering the graphical data representations in the interactive, dynamic, and searchable invoice analytics report 1302 and a transformation of the graphical data representations based on the selected filters. When the user of the entity device selects an invoice number 1305 as a filter, the invoice analytics system dynamically transforms the graphical data representations and the feed report 1303 in real time and renders the transformed graphical data representations and the feed report 1303 in the interactive, dynamic, and searchable invoice analytics report 1302 as exemplarily illustrated in FIG. 13C.

Figure 14A:
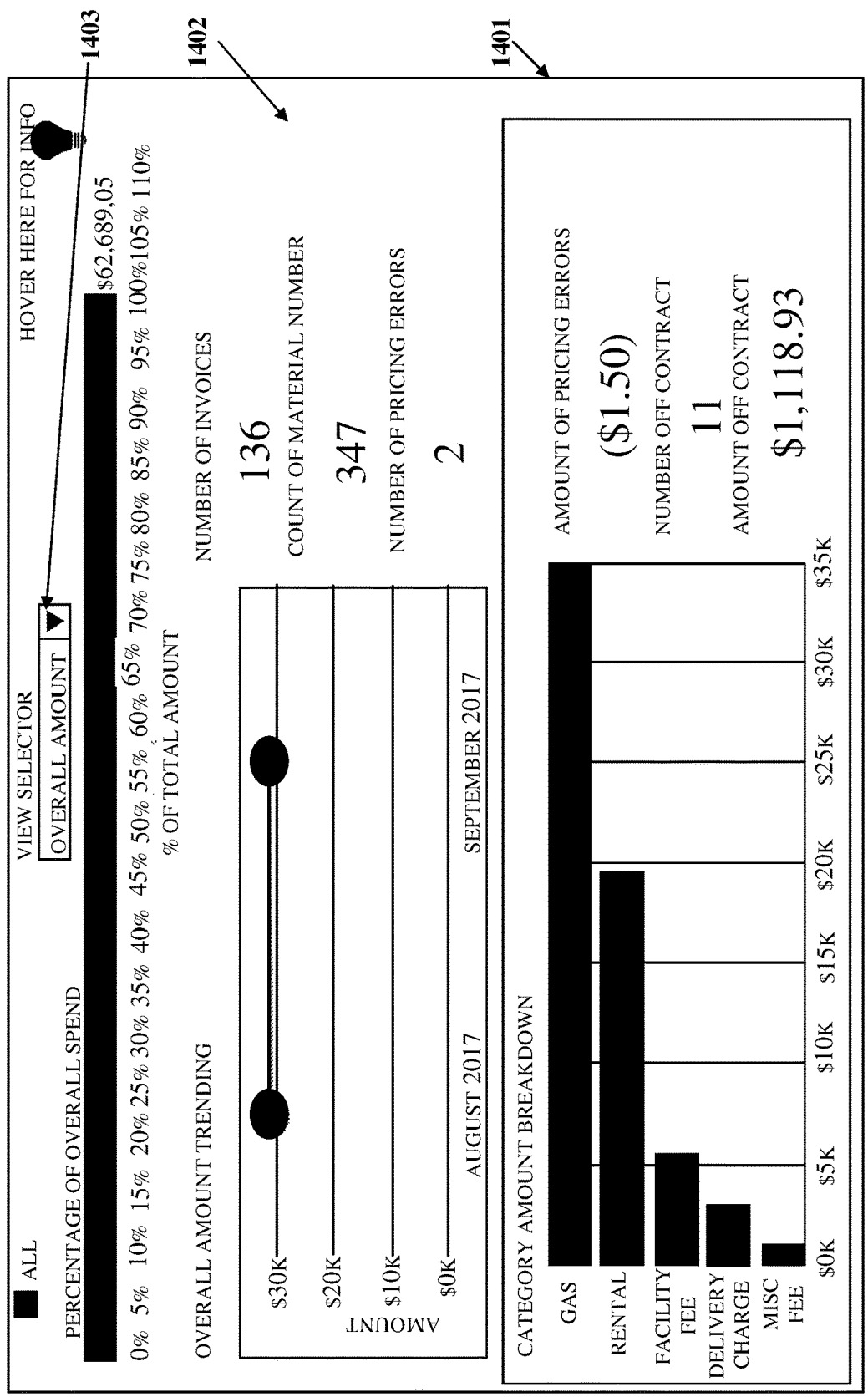
FIGS. 14A-14C exemplarily illustrate screenshots of a graphical user interface provided by the invoice analytics system, displaying an interactive, dynamic, and searchable invoice analytics report comprising different graphical data representations of invoice analytics performed on invoices of a vendor.
Figure 14B:
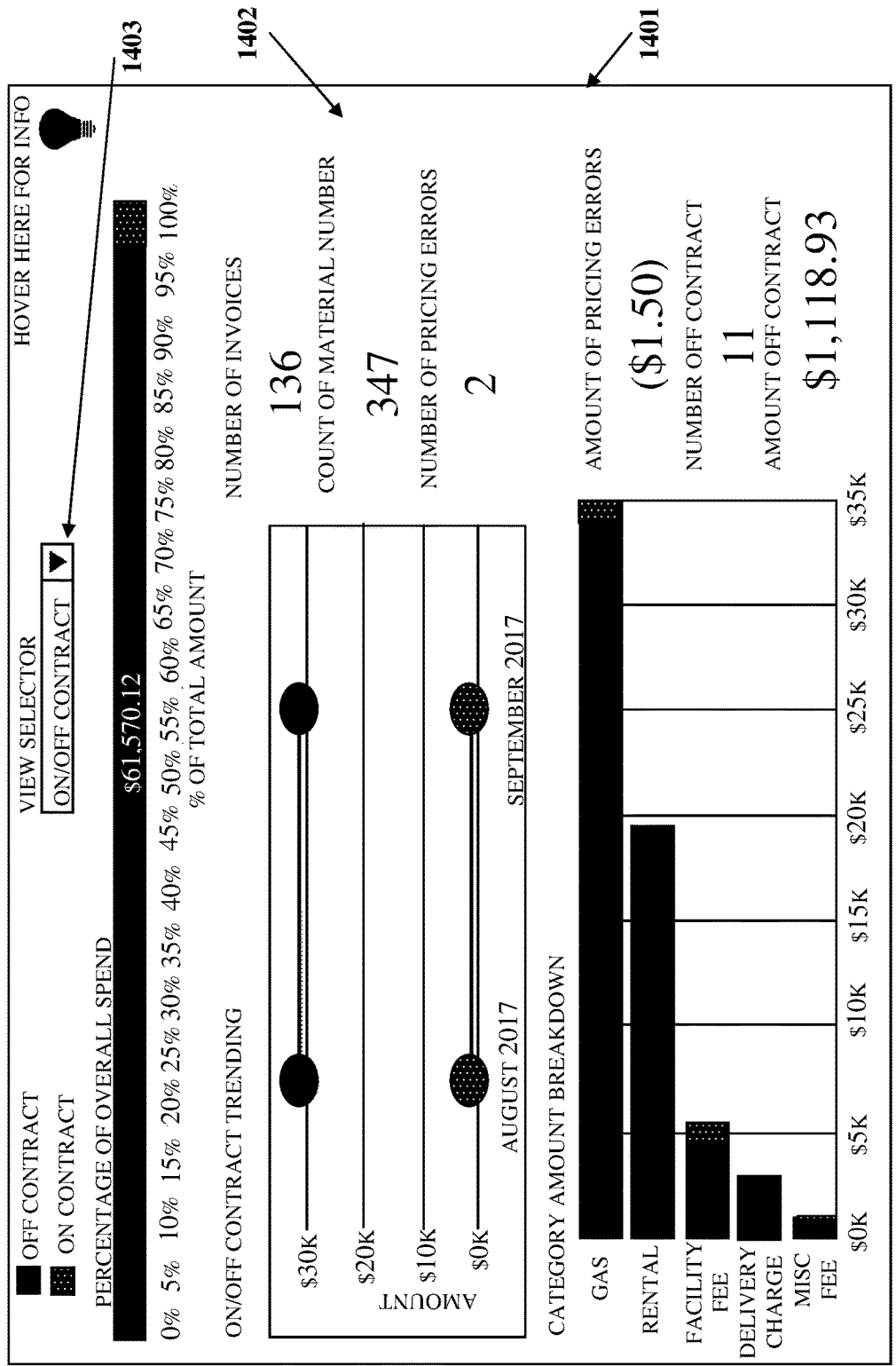
Figure 14C:
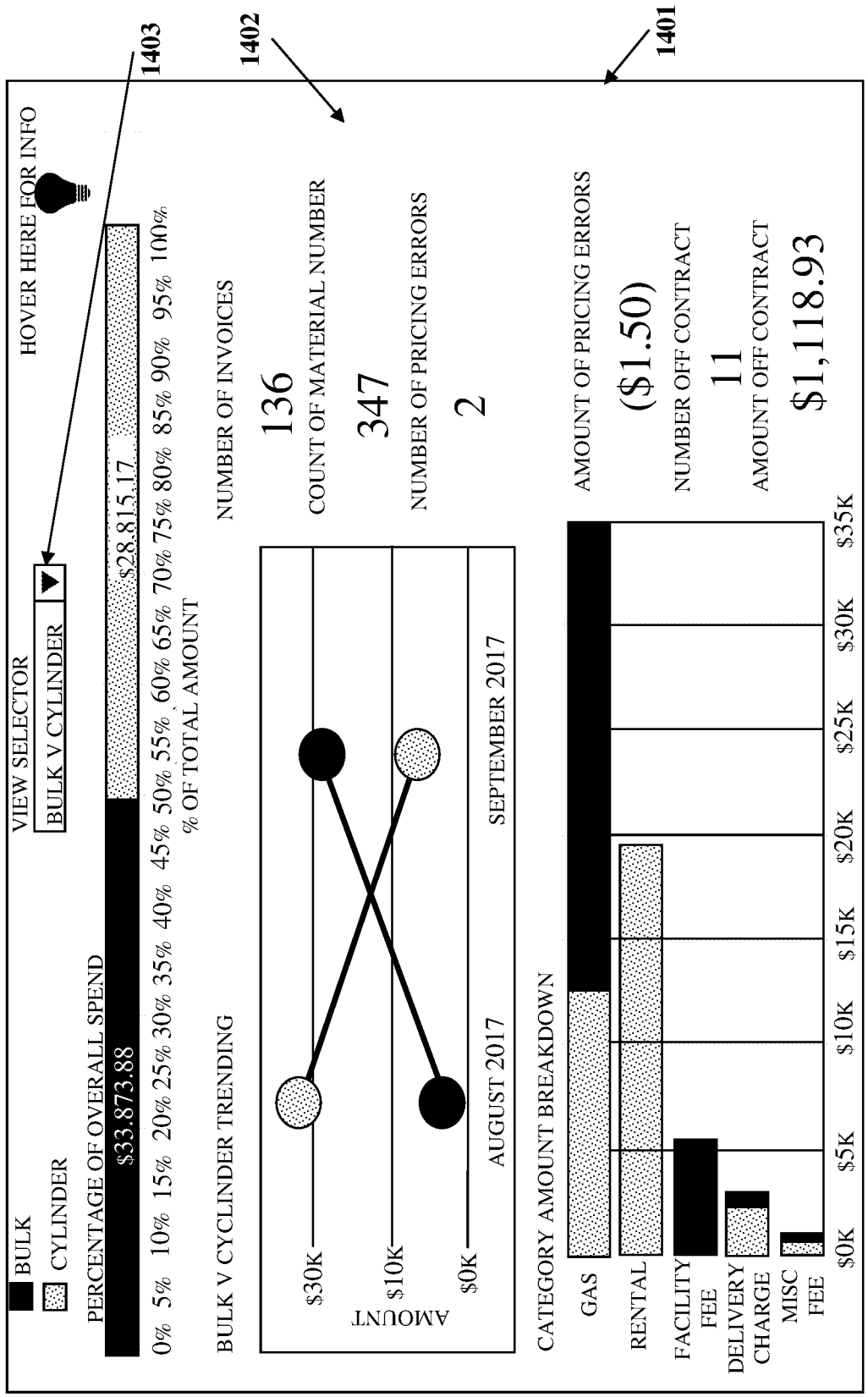

FIGS. 14A-14C exemplarily illustrate screenshots of a graphical user interface (GUI) 1401 provided by the invoice analytics system, displaying an interactive, dynamic, and searchable invoice analytics report 1402 comprising different graphical data representations of invoice analytics performed on invoices of a vendor, for example, a medical gas delivery service provider over a predefined duration of time, for example, a month. The medical gas delivery service provider provides medical gas delivery services to an entity, for example, a health center, and invoices the health center according to specific monthly usage of medical gases by the health center. The invoice analytics system provides a view selector 1403 as a drop down menu on the GUI 1401 to allow the user of the entity device to view purchase patterns, pricing errors, high spend items, off-contract business service items, etc., in the interactive, dynamic, and searchable invoice analytics report 1402 based on the selection in the view selector 1403. As exemplarily illustrated in FIG. 14A, when the user selects "overall amount" via the view selector 1403 on the GUI 1401, the invoice analytics system renders graphical data representations, for example, a line graph, bar graphs, etc., displaying the percentage of overall spend, business service line item spend, trends in the spend, category amount breakdown, etc., for the medical gas delivery service out of the other business services procured by the health center, in the interactive, dynamic, and searchable invoice analytics report 1402. The invoice analytics system also renders a total count of invoices, count of material number, and number of pricing errors corresponding to the medical gas delivery service provider. The invoice analytics system identifies the off-contract business service items from the invoices received from the medical gas delivery service provider and renders the amount of pricing errors, count of off-contract business service items, and amount of off-contract business service item spend in the interactive, dynamic, and searchable invoice analytics report 1402 on the GUI 1401.

As exemplarily illustrated in FIG. 14B, when the user selects "On/Off Contract" via the view selector 1403 on the graphical user interface (GUI) 1401, the invoice analytics system renders graphical data representations, for example, a line graph, bar graphs, etc., displaying the percentage of overall spend, business service line item spend, trends in the spend, etc., that are on-contract and off-contract for the medical gas delivery service procured by the health center, in the interactive, dynamic, and searchable invoice analytics report 1402. The bar graphs indicating the business service line item spend for the on-contract and off-contract allows the user to identify off-contract business service items and the corresponding off-contract spend, to pay more attention in future invoices, and to make adjustments for the already paid invoices.

As exemplarily illustrated in FIG. 14C, when the user selects "Bulk V Cylinder" view via the view selector 1403 on the graphical user interface (GUI) 1401, the invoice analytics system renders graphical data representations, for example, a line graph, bar graphs, etc., displaying the percentage of overall spend, business service line item spend, trends in the spend, etc., for bulk medical gas delivery and individual cylinder delivery by the medical gas delivery service provider to the health center, in the interactive, dynamic, and searchable invoice analytics report 1402. The interactive, dynamic, and searchable invoice analytics report 1402 allows the user to drill down the graphical data representations to depict trends in business service line items. The trends in the spend allow the user to identify probable outliers in the invoices received from the medical gas delivery service provider on viewing a sudden change in the total spend over a predefined duration of time, for example, two months.

FIG. 15 exemplarily illustrates a screenshot of a graphical user interface 1501 provided by the invoice analytics system, displaying a tabular representation of off-contract business service items identified in invoices received from a vendor, for example, a medical gas delivery service provider as a part of a reconciliation report. The invoice analytics system identifies the off-contract business service items from different invoices received from the medical gas delivery service provider and the corresponding off-contract business spends and generates the reconciliation report. If payments are made for the identified off-contract business service items by an entity, for example, a health center, the invoice analytics system creates the reconciliation report in such a way that adjustments in payments can be made to the medical gas delivery service provider in future, in communication with an accounts payable system of the health center.

Figure 16A:
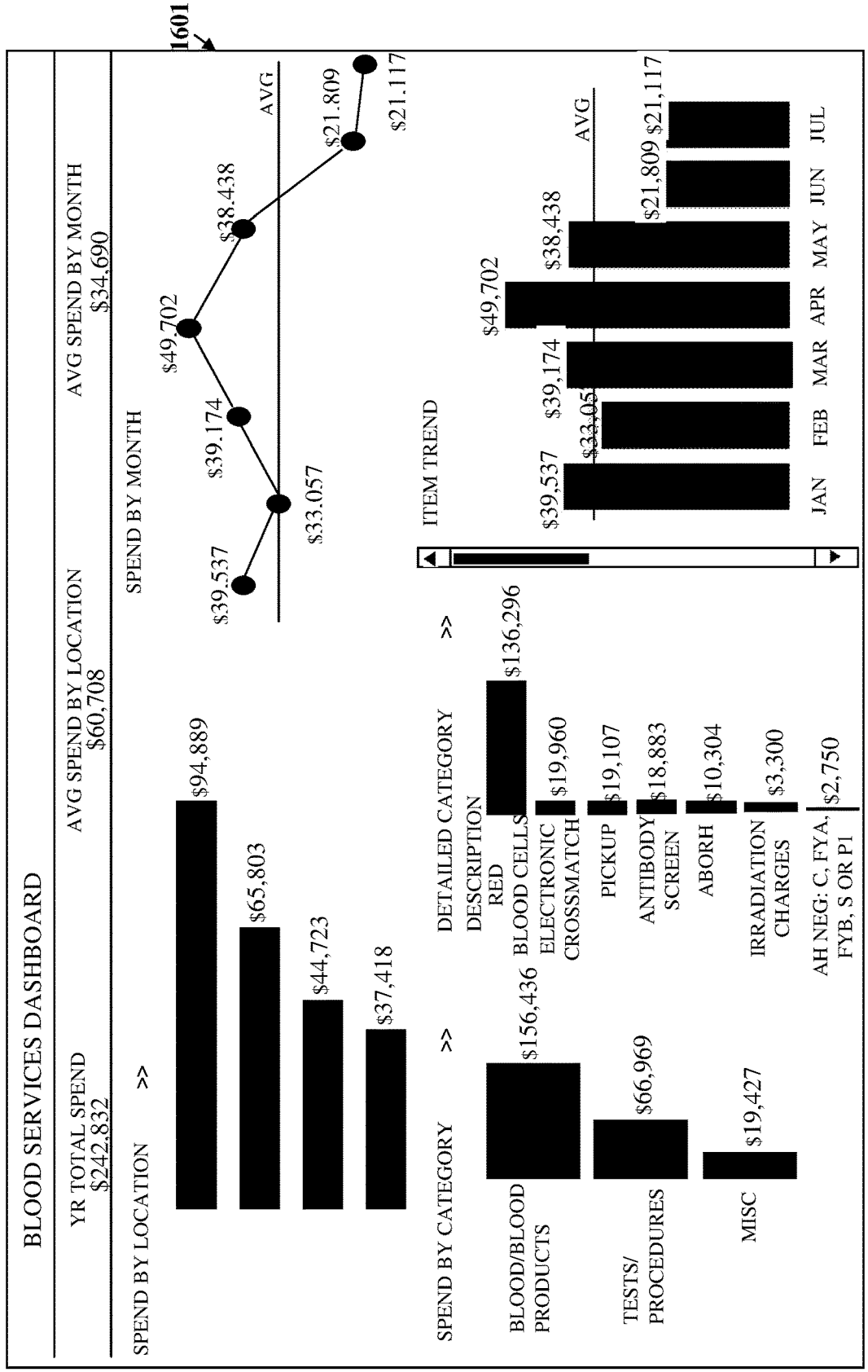
FIGS. 16A-16C exemplarily illustrate screenshots of a utilization validation interface generated by the invoice analytics system for validating utilization of business services by an entity.
Figure 16B:
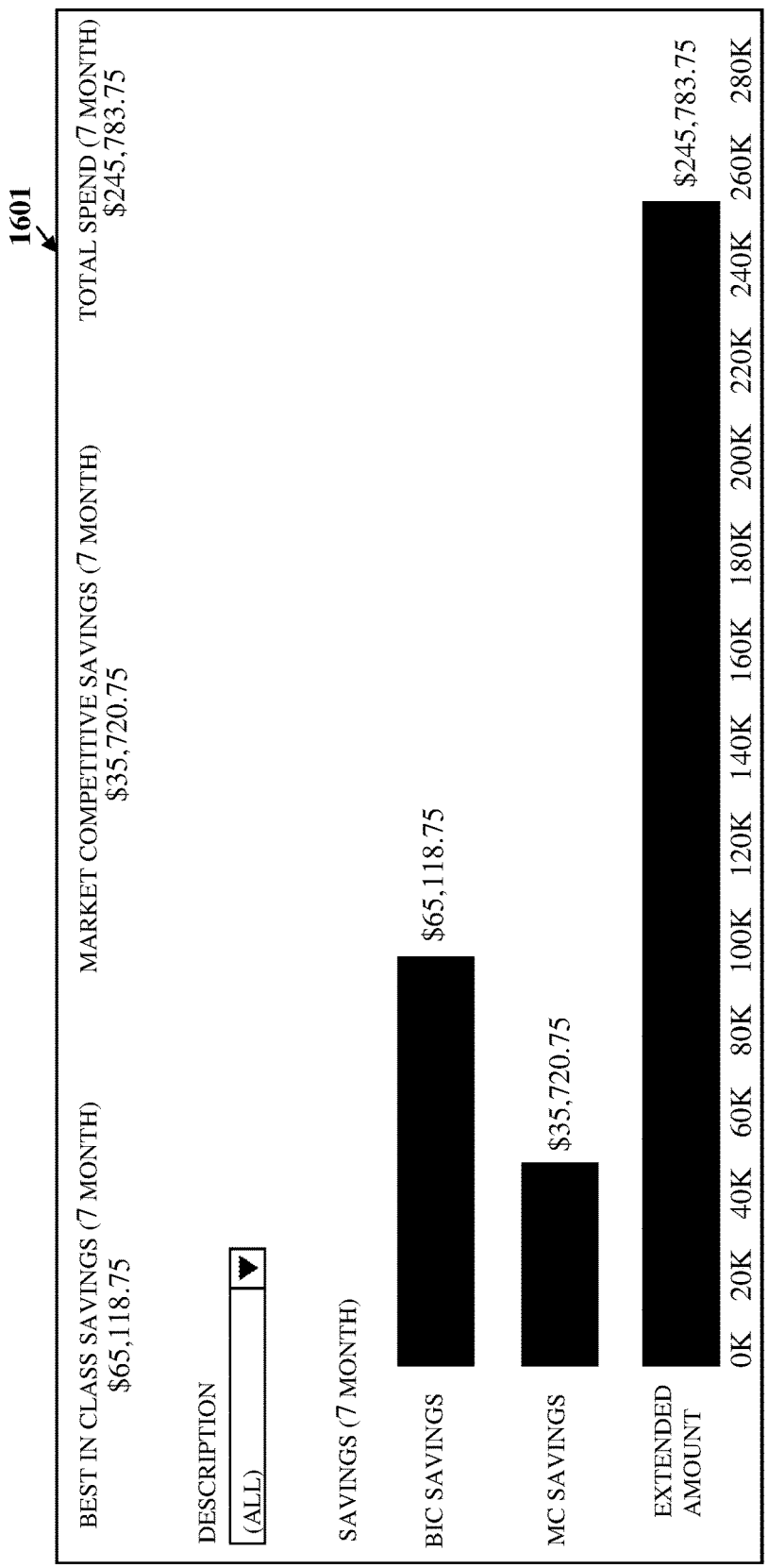
Figure 16C:
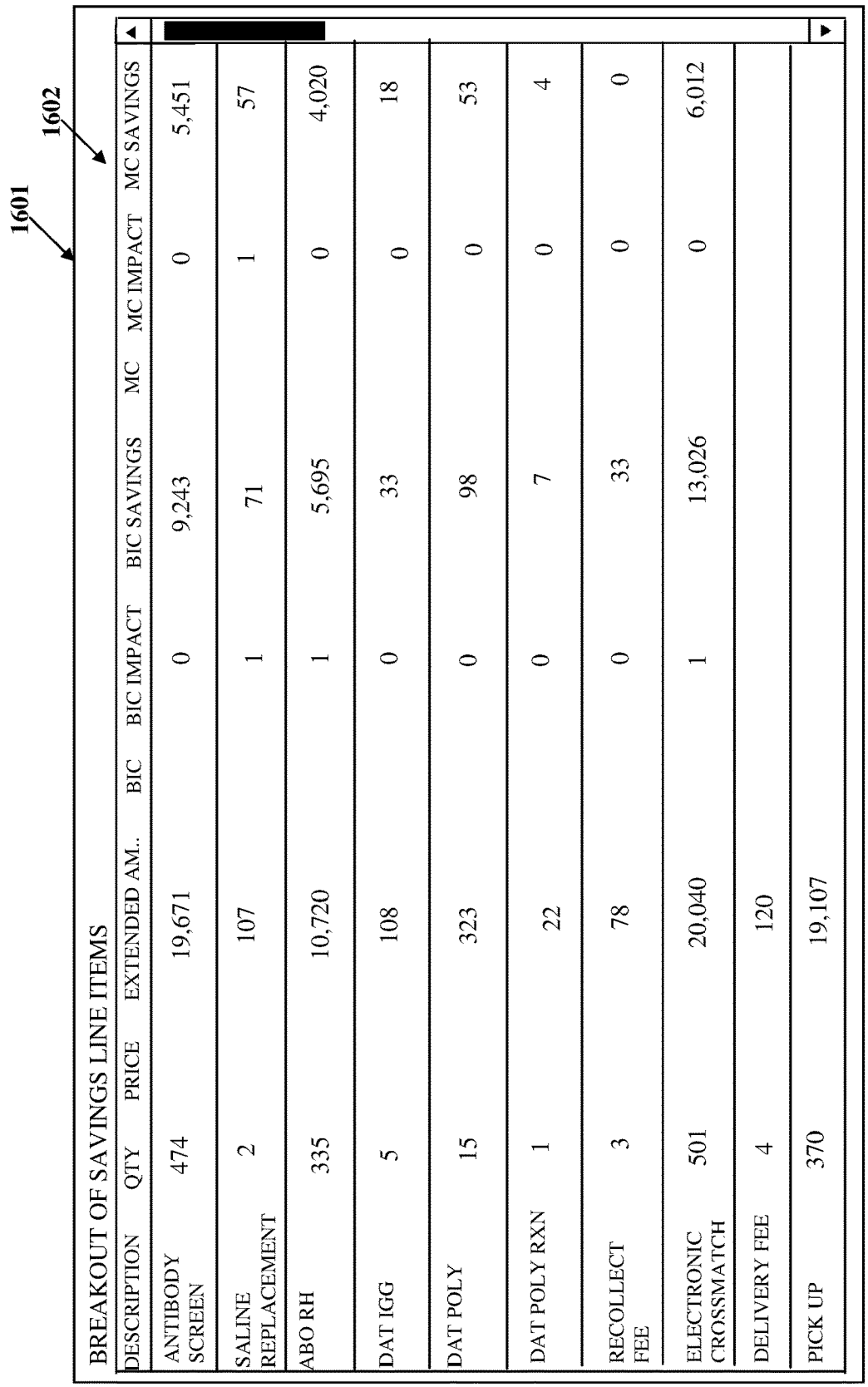

FIGS. 16A-16C exemplarily illustrate screenshots of a utilization validation interface 1601 generated by the invoice analytics system for validating utilization of business services, for example, a blood testing service, by an entity, for example, a health center. A vendor, for example, a blood testing service provider invoices the health center based on blood tests performed. The utilization validation interface 1601 comprises graphical data representations, for example, bar graphs, line graphs, etc., indicating business services spend by location, by month, by category, etc. The invoice analytics system renders the business service line items and trends in the business service line items over a predefined duration of time, for example, monthly, on the utilization validation interface 1601. The utilization validation interface 1601 displays total business services spend over a year, average business services spend by location, and average business services spend by month as exemplarily illustrated in FIG. 16A. Close monitoring and analysis of the utilization of the blood testing service by the invoice analytics system determine cost reduction opportunities for the health center.

As exemplarily illustrated in FIG. 16B, as part of the invoice analytics, the invoice analytics system computes cost savings over a predefined duration of time for the health center based on the analytics criteria and renders the best in class computed cost savings over the predefined duration of time on the utilization validation interface 1601. The invoice analytics system also performs benchmarking of the business service line items and determines and renders market competitive savings on the utilization validation interface 1601. The invoice analytics system displays a comparison of the cost savings and the market competitive savings over the predefined duration of time as a graphical data representation, for example, a bar graph, in the utilization validation interface 1601 to estimate pricing performance of the health center. FIG. 16C exemplarily illustrates the utilization validation interface 1601 displaying a table 1602 of computed cost savings per business service line item in the invoices received by the health center from the blood testing service provider. The invoice analytics system also displays the table 1602 as a part of a cost savings opportunity report, where the table 1602 illustrates a breakout of different business service line items that have contributed to the best in class computed cost savings, the market competitive savings, and corresponding spend. The cost savings opportunity report helps optimize the spend of the health center for the different business service items offered by the blood testing service provider.

FIGS. 17A-17D exemplarily illustrate screenshots of a graphical user interface (GUI) 1701 provided by the invoice analytics system, displaying a summary of calculations performed and reports generated by the invoice analytics system. As exemplarily illustrated in FIG. 17A, the invoice analytics system renders a computed total spend for the business services procured by an entity, for example, a health center, over a predefined duration of time on the GUI 1701. The invoice analytics system also renders the number of invoice line items and cost savings computed based on analytics criteria on the GUI 1701. The invoice analytics system also renders links to access other reports, for example, a monthly spend report, a quarterly business review, etc., on the GUI 1701. The invoice analytics system provides different interface elements, for example, buttons 1703, 1704, and 1705 on the GUI 1702 as exemplarily illustrated in FIG. 17B, for performing reconciliation, optimization, and real time intelligence respectively. When a user of the invoice analytics system clicks on a reconciliation button 1703 on the GUI 1702, the invoice analytics system renders a reconciliation report 1706 on the GUI 1702 as exemplarily illustrated in FIG. 17B. The invoice analytics system performs a comprehensive retrospective contract compliance analysis within minutes to identify billing pricing errors, contract compliance errors, and off-contract business service items. After the analysis, the invoice analytics system renders graphical data representations of outliers of the contracts, overpriced business services, underpriced business services, etc. as a part of the reconciliation report 1706 as exemplarily illustrated in FIG. 17B.

Figure 17A:
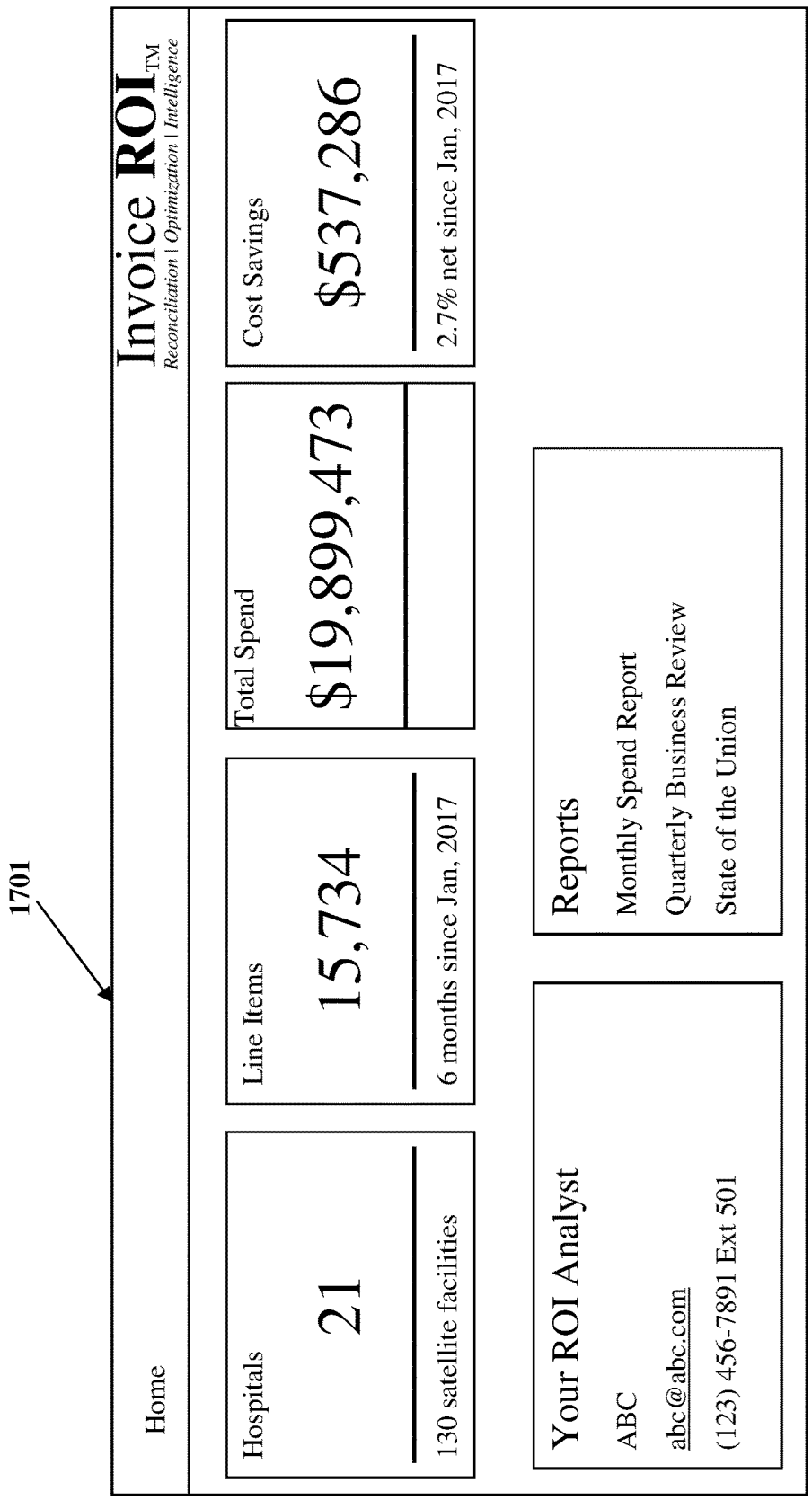
FIGS. 17A-17D exemplarily illustrate screenshots of a graphical user interface provided by the invoice analytics system, displaying a summary of calculations performed and reports generated by the invoice analytics system.
Figure 17B:
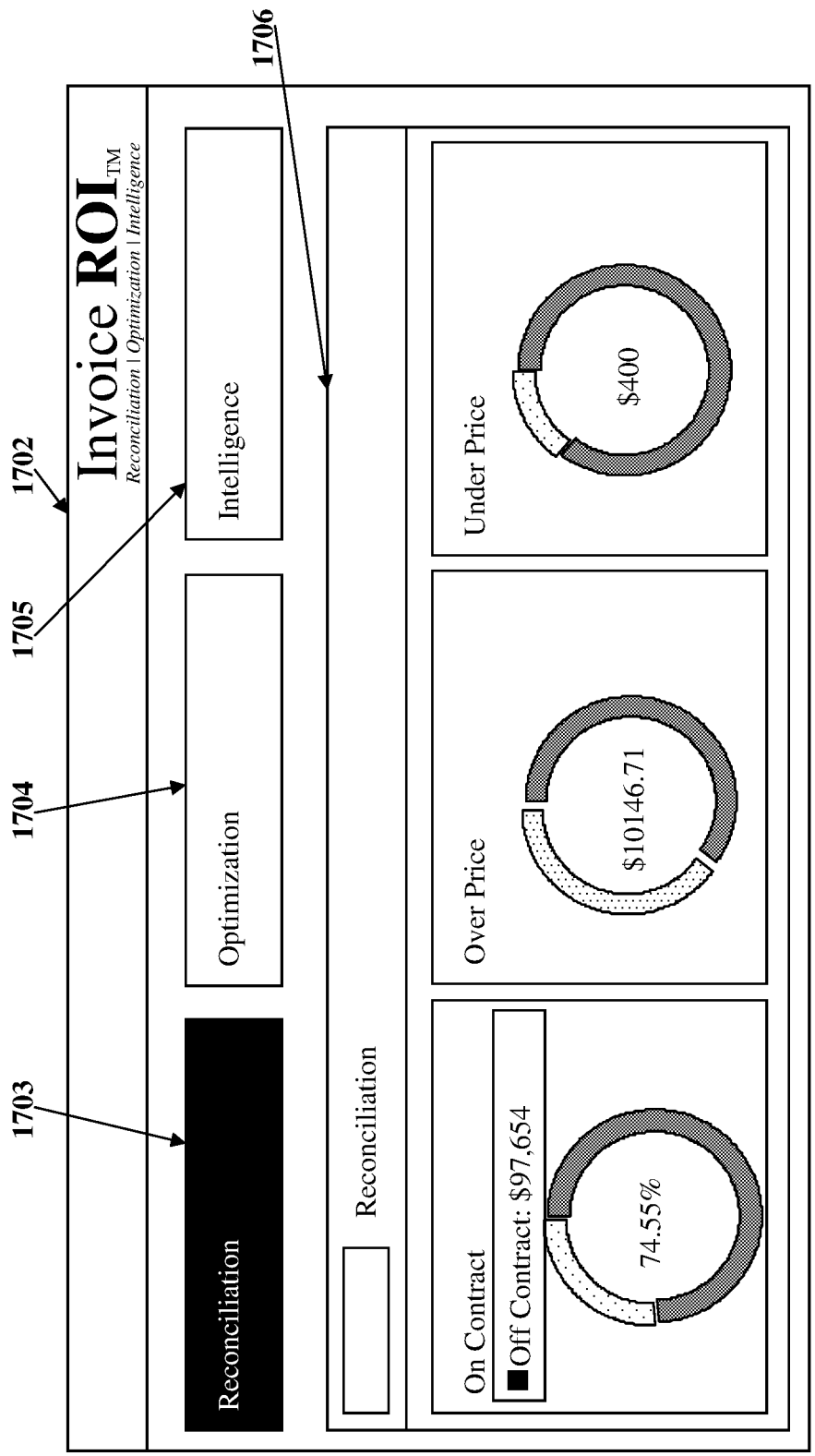
Figure 17C:
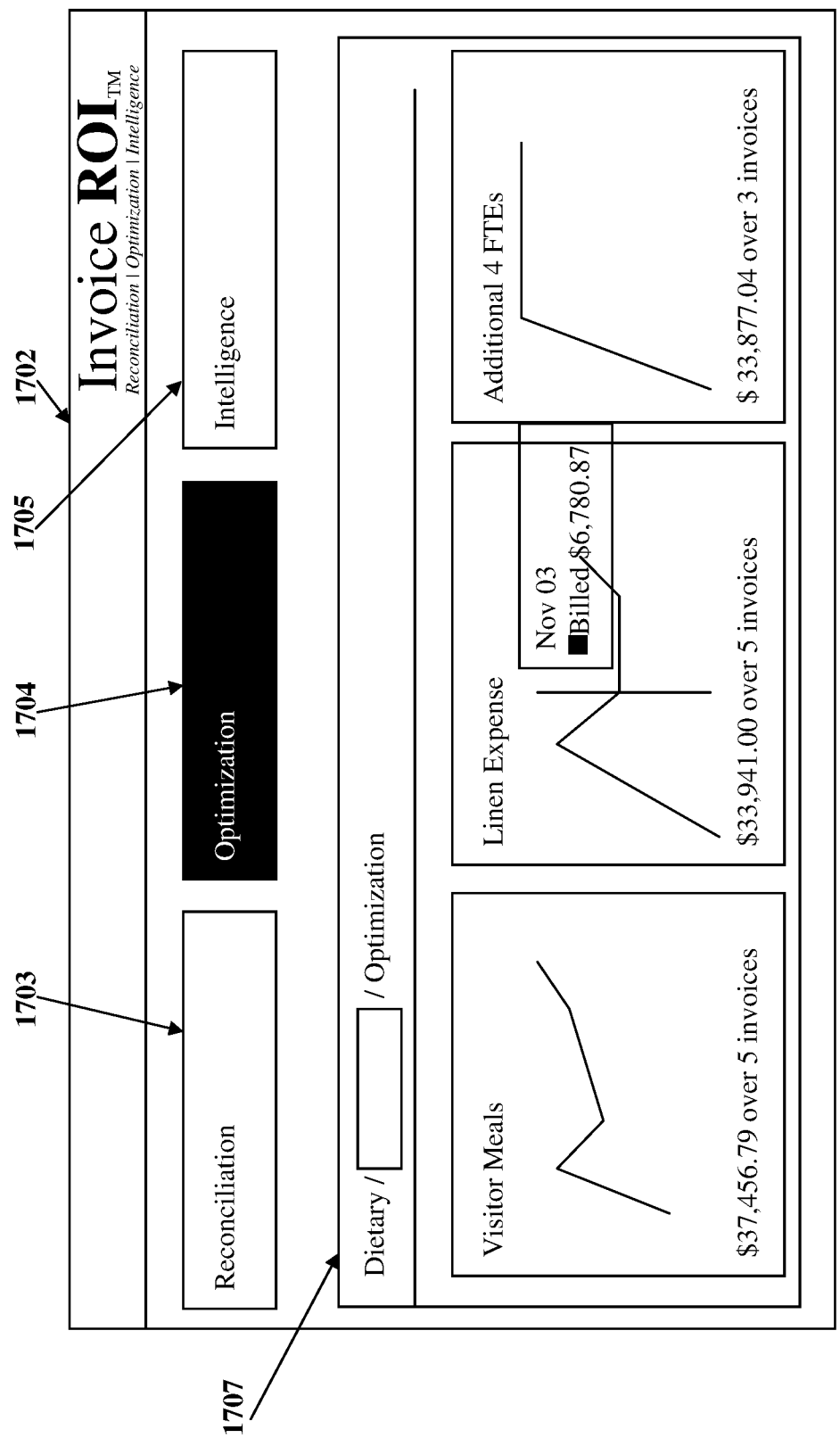
Figure 17D:
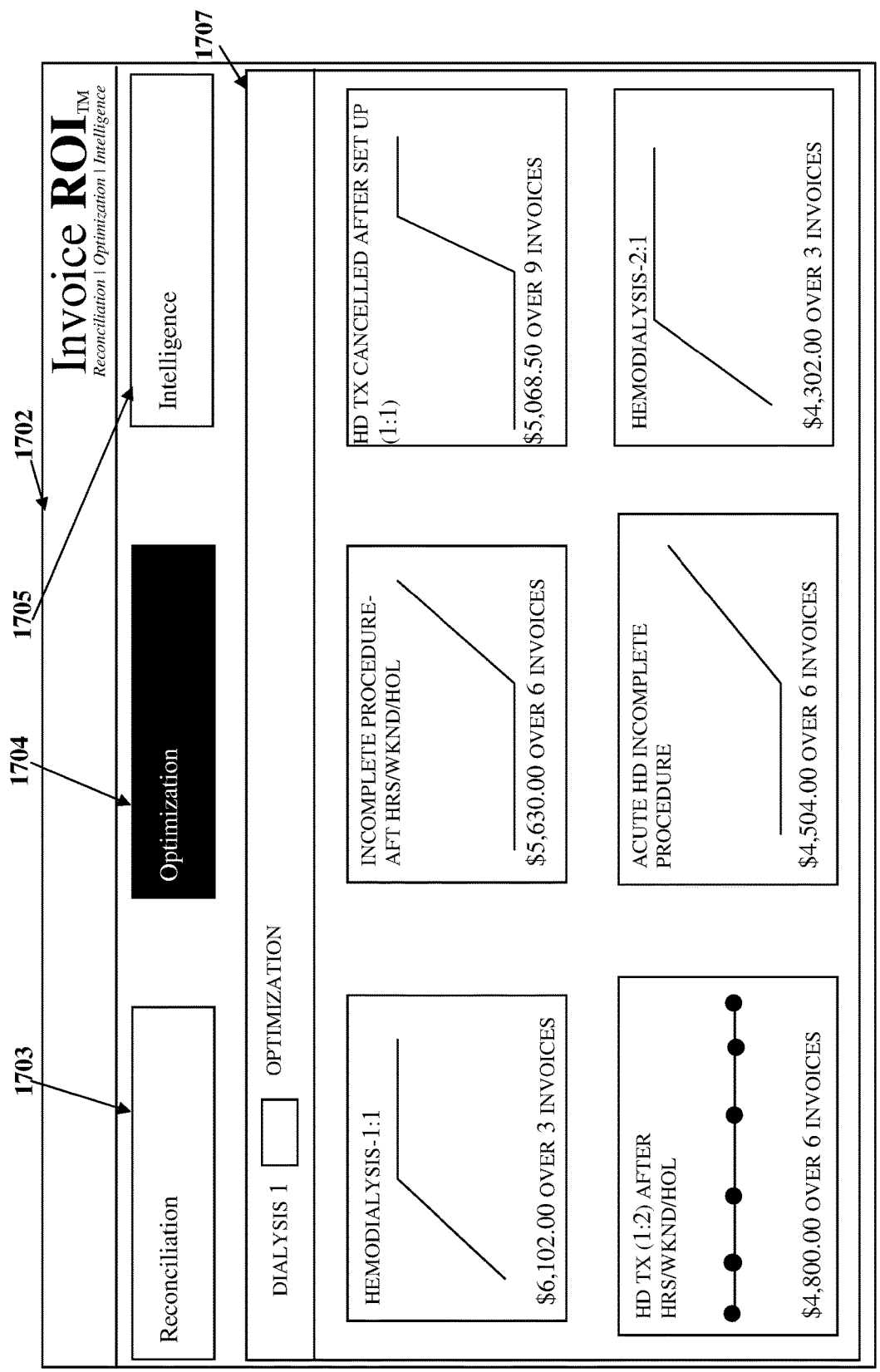

When a user of the invoice analytics system clicks on an optimization button 1704 on the graphical user interface (GUI) 1702 exemplarily illustrated in FIG. 17C, the invoice analytics system renders an optimization report 1707 for a business service, for example, a dietary service. The invoice analytics system provides a trend analysis of the business services that identifies issues with the business service transactions and spend increases, and renders the optimization report 1707 on the GUI 1702 as exemplarily illustrated in FIG. 17C. The invoice analytics system also identifies variations, new business service spend areas, and outliers that occur at predefined intervals, for example, monthly, and provides visibility into the business service spends of the health center that are hard to identify, for example, a dietary service spend, service and maintenance of equipment spend, legal service spend, consulting services spend, etc. When a user of the invoice analytics system clicks on the optimization button 1704 on the GUI 1702 exemplarily illustrated in FIG. 17D, the invoice analytics system renders an optimization report 1707 for a business service, for example, a dialysis service. A dialysis service provider invoices the health center based on dialysis services performed. The optimization report 1707 exemplarily illustrated in FIG. 17D, provides a visual display of trends in the dialysis services performed partially and completely by the dialysis service provider over a number of invoices. The optimization report 1707 enables the user of the invoice analytics system to determine utilization optimization opportunities by assessing the business services spend over the number of invoices. When a user of the invoice analytics system clicks on an intelligence button 1705 on the GUI 1702, the invoice analytics system performs real time benchmarking as disclosed in the detailed description of FIGS. 1A-1B. The invoice analytics system compares health centers using an opportunity score that measures cost and utilization opportunities of each health center. The invoice analytics system also implements utilization algorithms that are specific to each business service.

FIG. 18 exemplarily illustrates a screenshot of a graphical user interface (GUI) 1801 provided by the invoice analytics system, displaying an invoice 1802 received from a vendor, for example, a linen cleaning service provider, and a table 1804 comprising invoice line item data 1805 extracted from the invoice 1802 and segmented by the invoice analytics system. As exemplarily illustrated in FIG. 18, the invoice 1802 comprises business service transactional invoice data 1803 of each of the business services performed by the linen cleaning service provider. The invoice analytics system extracts and segments invoice line item data 1805 from the business service transactional invoice data 1803 of the invoice 1802 into the table 1804 using optical character recognition and an extract, transform, and load (ETL) operation as disclosed in the detailed description of FIG. 2. The invoice analytics system computes total quantity of linen cleaned per week and total spend for the linen cleaning service per week for, for example, Gown, Obese IV 5XL AZTEC, as 70 and 80.2 dollars respectively, while the invoice 1802 only lists the quantity of linen cleaned over a week along with the charges levied by the linen cleaning service provider per linen.

The invoice analytics system extracts contract line item data from contracts established between an entity, for example, a health center, and the linen cleaning service provider. The invoice analytics system compares the extracted and segmented invoice line item data 1805 from the invoice line item database 203 exemplarily illustrated in FIG. 2, with the extracted contract line item data in the contract line item database 205 exemplarily illustrated in FIG. 2, and identifies, details, and outlines billing pricing errors, contract compliance errors, and off-contract business service items for reconciling the invoice 1802 in accordance with the contracts for every week. The invoice analytics system calculates the total linen per week and charges to be paid to the linen cleaning service provider per week in accordance with the contracts. The invoice analytics system performs invoice analytics on the extracted and segmented invoice line item data 1805 as disclosed in the detailed description of FIGS. 1A-1B. For different business services, the invoice analytics system performs reconciliation of the invoices in accordance with the contracts and generates an interactive, dynamic, and searchable invoice analytics report 1901 as exemplarily illustrated in FIGS. 19A-19C.

Figure 19A:
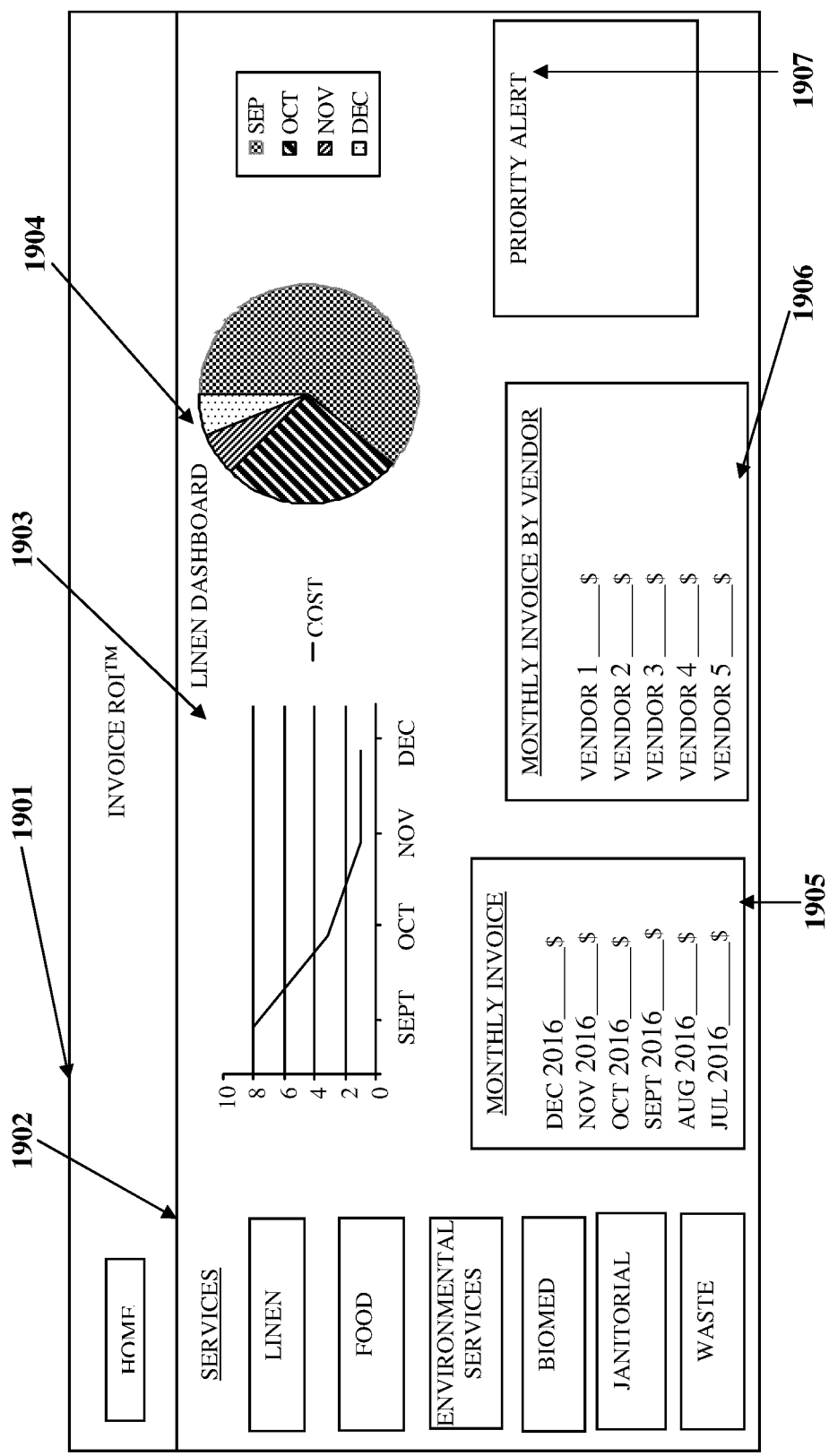
FIGS. 19A-19C exemplarily illustrate screenshots of a graphical user interface provided by the invoice analytics system, displaying an interactive, dynamic, and searchable invoice analytics report generated by the invoice analytics system.
Figure 19B:
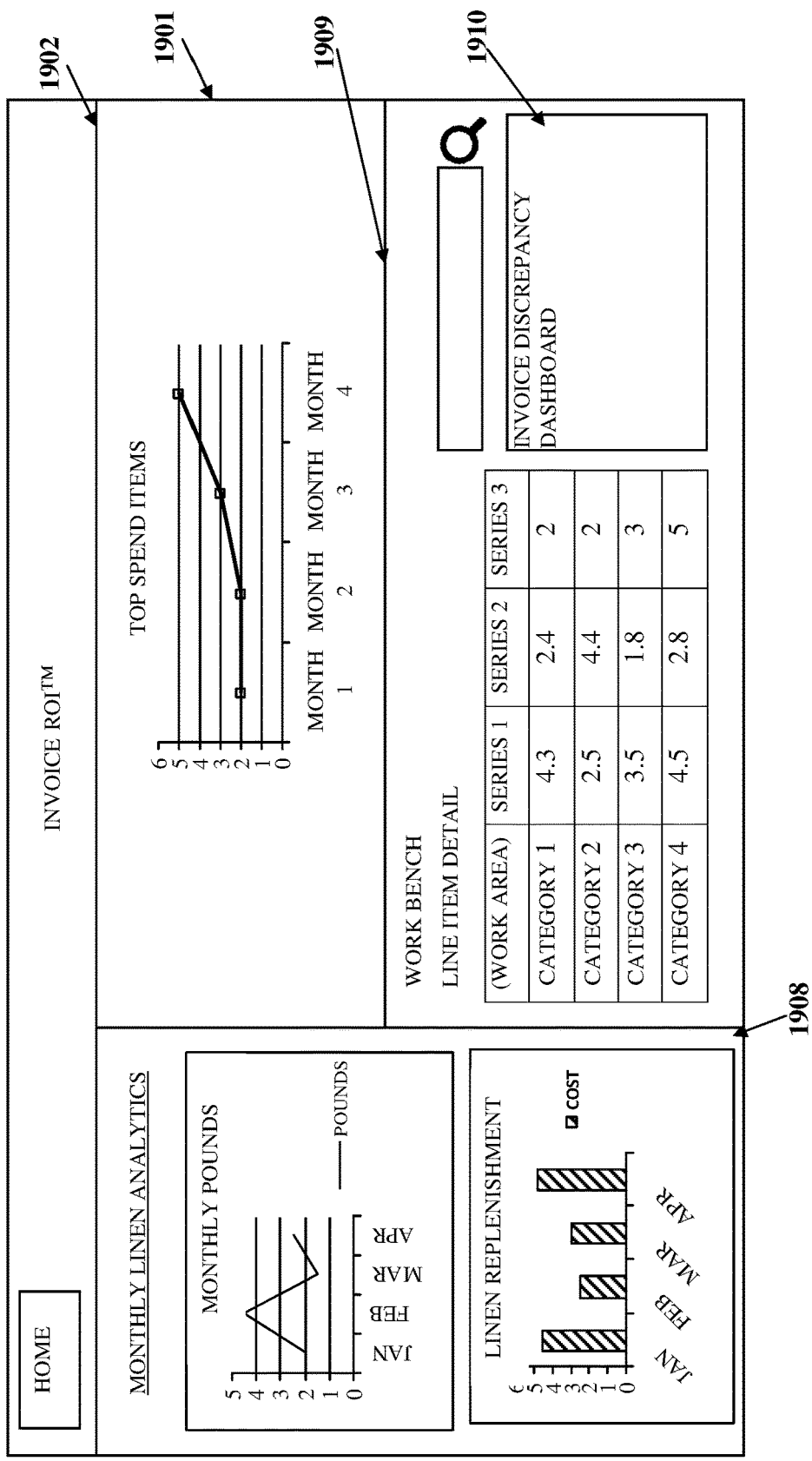
Figure 19C:
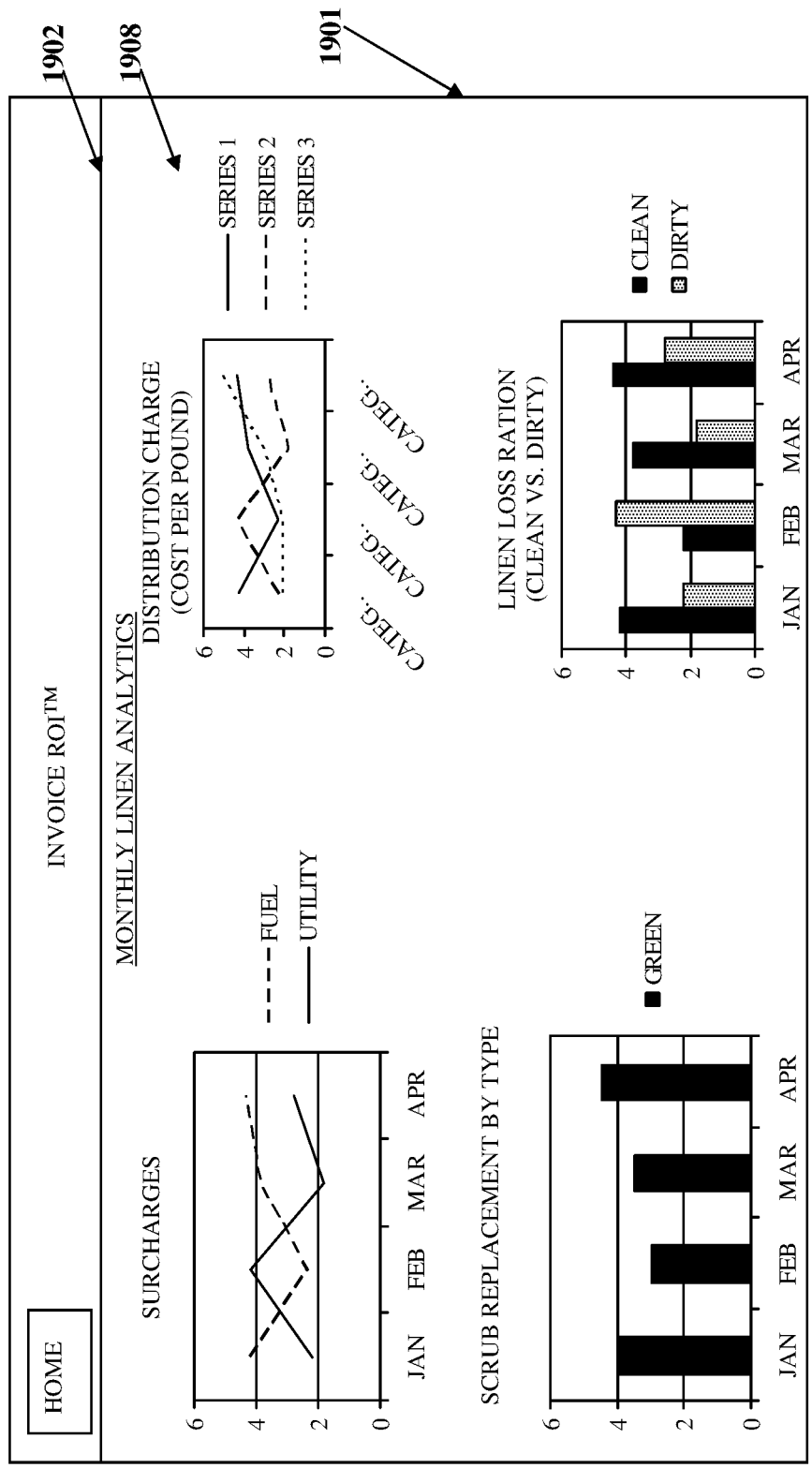

FIGS. 19A-19C exemplarily illustrate screenshots of a graphical user interface (GUI) 1901 provided by the invoice analytics system, displaying an interactive, dynamic, and searchable invoice analytics report 1902 generated by the invoice analytics system. As exemplarily illustrated in FIG. 19A, the generated interactive, dynamic, and searchable invoice analytics report 1902 comprises multiple tabs for different business services, for example, a linen cleaning service, a food service, an environmental service, a biomedical service, a janitorial service, a waste management service, etc., of an entity, for example, a health center. The interactive, dynamic, and searchable invoice analytics report 1902 comprises graphical data representations 1903 and 1904 of purchase patterns of the health center over a predefined duration of time, for example, a month or a quarter. The invoice analytics system computes total spend for each of the business services over a predefined duration of time, for example, a month, and renders the computed total spend in the generated interactive, dynamic, and searchable invoice analytics report 1902. The invoice analytics system generates a feed report comprising the extracted and segmented invoice line item data by category of the business services, by vendor, and by predefined duration of time, for example, a month. The interactive, dynamic, and searchable invoice analytics report 1902 displays monthly invoices 1905 and monthly invoices by vendor 1906 as exemplarily illustrated in FIG. 19A. In an embodiment, the invoice analytics system also computes and renders the total spend of the health center over a month by vendor as a part of the interactive, dynamic, and searchable invoice analytics report 1902. The invoice analytics system provides a priority alert button 1907 in the interactive, dynamic, and searchable invoice analytics report 1902 on the GUI 1901, which when clicked by a user, alerts the user about unusual variations in high priority spend of the health center and outliers in the total spend over a predefined duration of time.

On selection of a tab corresponding to linen cleaning services exemplarily illustrated in FIG. 19A, by an administrator of the invoice analytics system, the invoice analytics system renders monthly linen analytics 1908 as a part of the interactive, dynamic, and searchable invoice analytics report 1902 as exemplarily illustrated in FIGS. 19B-19C. The invoice analytics system also displays the top spend items in the interactive, dynamic, and searchable invoice analytics report 1902 as exemplarily illustrated in FIG. 19B. The interactive, dynamic, and searchable invoice analytics report 1902 further comprises a work bench 1909 exemplarily illustrated in FIG. 19B, for editing the graphical data representations rendered in the interactive, dynamic, and searchable invoice analytics report 1902. The interactive, dynamic, and searchable invoice analytics report 1902 further comprises an invoice discrepancy dashboard 1910 exemplarily illustrated in FIG. 19B, that indicates the billing pricing errors, contract compliance errors, and off-contract business service items identified by the invoice analytics system while reconciling the received invoices in accordance with the received contracts using the extracted and segmented invoice line item data and the extracted contract line item data.

In the interactive, dynamic, and searchable analytics report 1902, as a part of the monthly linen analytics 1908, the invoice analytics system renders different graphical data representations comprising bar graphs, line graphs, etc., that compare performances of different vendors over a predefined duration of time, for example, a quarter, as exemplarily illustrated in FIG. 19C. The invoice analytics system performs the monthly linen analytics 1908 by service category, for example, monthly pounds with respect to what was delivered to the hospital?, top and bottom scrub rentals by piece, customer owned goods (COG) linen cleaned in pounds or by piece, surcharges, linen loss, distribution charge, linen loss ratio clean to dirty, linen replacement, scrub replacement, personnel or management onsite fees, etc. In an embodiment, the invoice analytics system also computes a quality metric score for ranking different vendors based on the performance of the business service in the same category.

FIGS. 20A-20B exemplarily illustrate screenshots of a graphical user interface (GUI) 2001 provided by the invoice analytics system, displaying a contract of an entity, for example, a health center, for a business service, for example, a laboratory testing service, and a table 2002 comprising contract line item data 2003 extracted from the contract by the invoice analytics system respectively. A laboratory testing service provider invoices the health center based on laboratory tests performed. According to the contract, the health center and the laboratory testing service provider agreed upon billing for the laboratory testing services according to Medicare rates. As the Medicare rates change annually or half yearly, a physical document of the contract is created with the current Medicare rates. The invoice analytics system extracts contract line item data 2003 from the contract with the current Medicare rates using optical character recognition and an extract, transform, and load (ETL) operation as disclosed in the detailed description of FIG. 2. The invoice analytics system extracts the contract line item data 2003 from the contract, for example, into a comma-separated values (csv) file that stores tabular data in plain text. The invoice analytics system processes the csv file and transforms each record in the csv file into contract line item data 2003 in the table 2002. The contract line item database 205 exemplarily illustrated in FIG. 2, comprises a table similar to the table 2002 for each of the vendors, for example, a line cleaning service provider, a waste management service provider, an organ procurement service provider, etc., transacting with the health center.

FIG. 21 exemplarily illustrates a screenshot of a graphical user interface (GUI) 2101 provided by the invoice analytics system, displaying a tabular representation of invoice line item data 2102 by month extracted by the invoice analytics system from an invoice received from a vendor, for example, a laboratory testing service provider, by an entity, for example, a health center, for a business service, for example, a laboratory testing service. The invoice analytics system extracts and segments the invoice line item data 2102 from the received invoice using optical character recognition and an extract, transform, and load (ETL) operation as disclosed in the detailed description of FIG. 2, and creates an invoice line item database 203 exemplarily illustrated in FIG. 2, for storing the extracted and segmented invoice line item data 2102. The invoice analytics system extracts and segments the invoice line item data 2102 from the received invoice into a comma-separated values (csv) file that stores tabular data in plain text. The invoice analytics system processes the csv file and transforms each record in the csv file into invoice line item data 2102 in a table. The invoice line item database 203 comprises a similar table for each of the vendors, for example, a line cleaning service provider, a waste management service provider, an organ procurement service provider, etc., transacting with the health center. The invoice analytics system reconciles the received invoices in accordance with the received contracts by identifying and rectifying billing pricing errors and contract compliance errors, and by identifying and resolving off-contract business service line items.

Figure 22A:
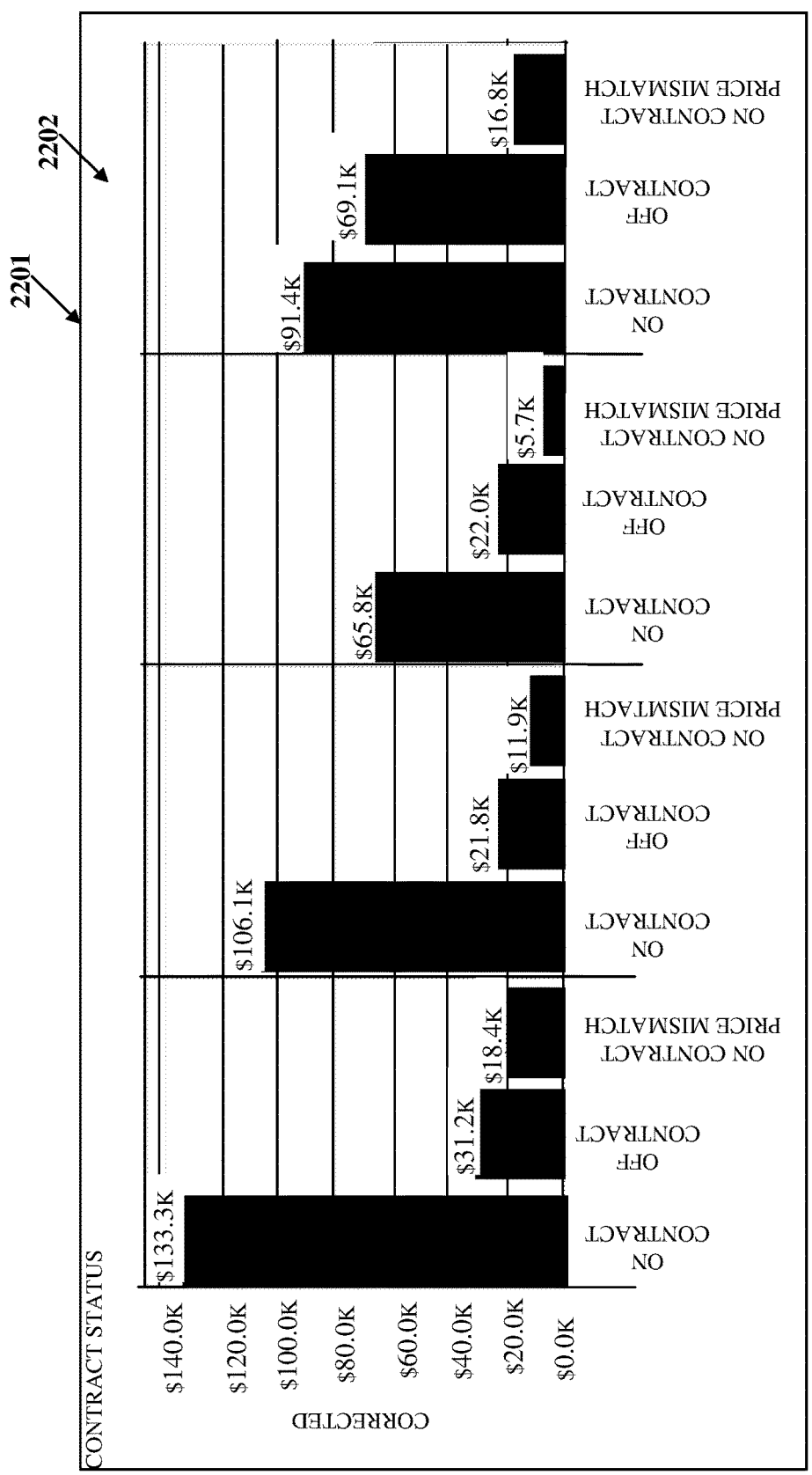
FIGS. 22A-22F exemplarily illustrate screenshots of a graphical user interface provided by the invoice analytics system, displaying an interactive, dynamic, and searchable invoice analytics report comprising different graphical data representations of the invoice analytics performed by the invoice analytics system for a business service.
Figure 22B:
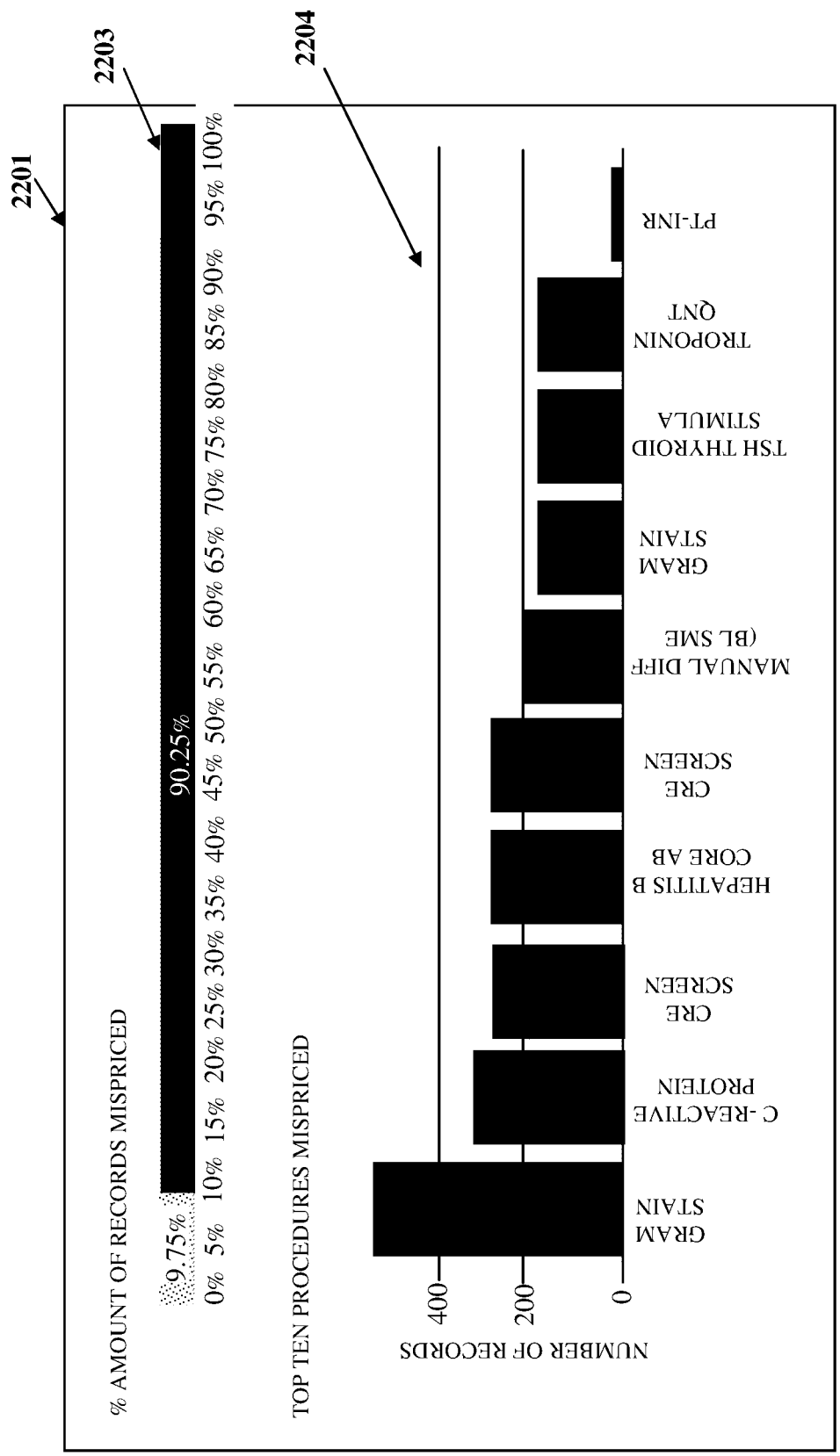
Figure 22C:
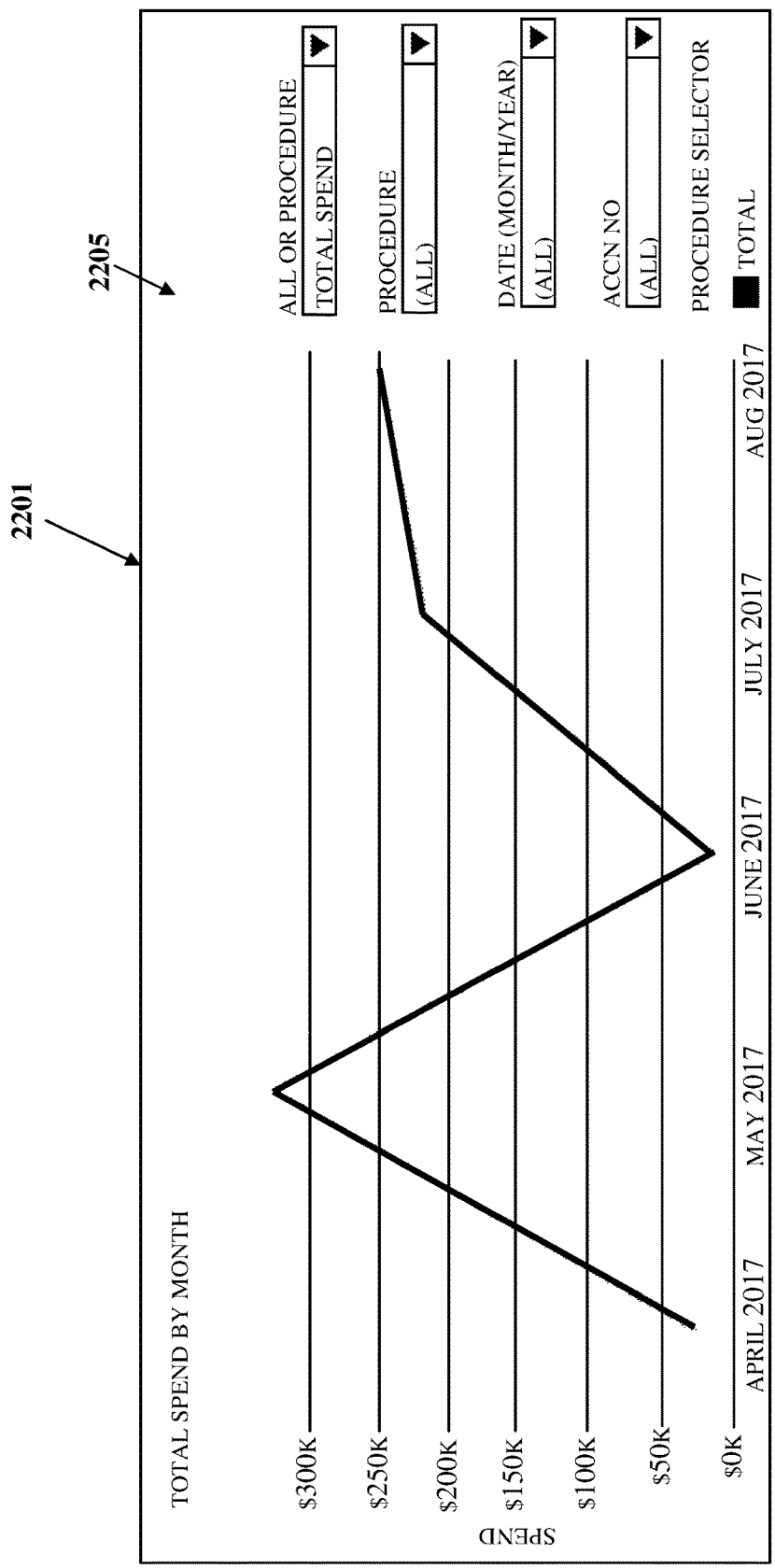
Figure 22D:
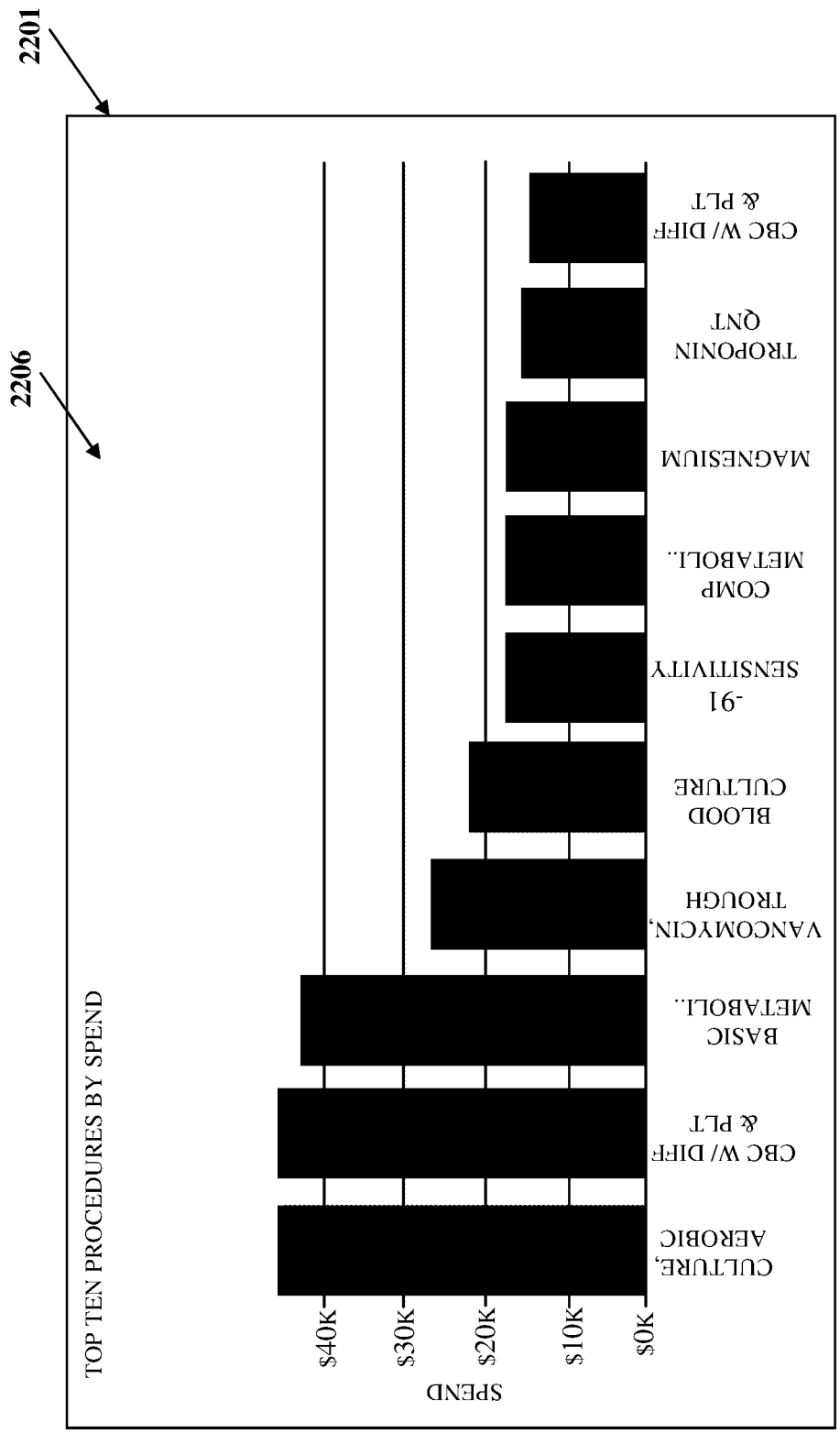
Figure 22E:
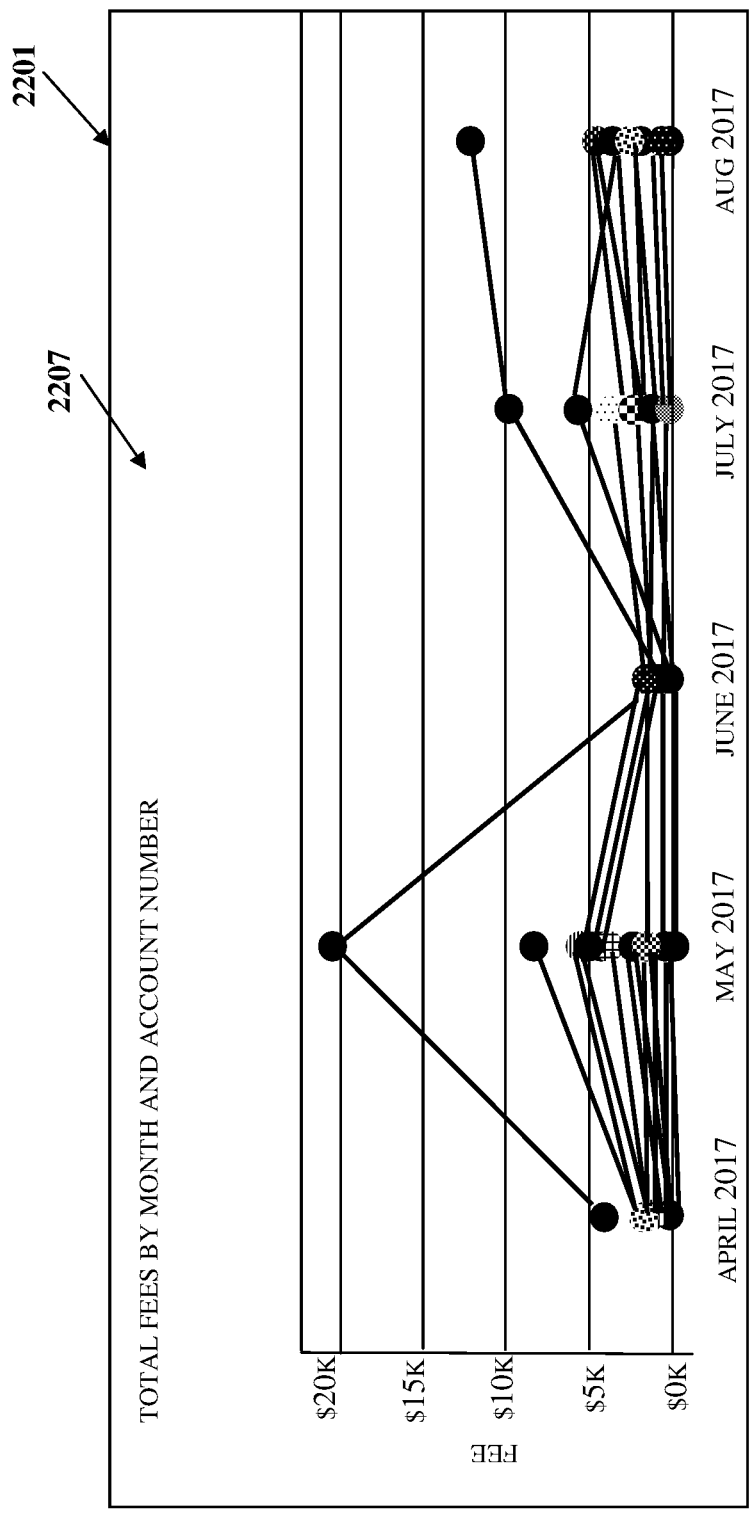
Figure 22F:
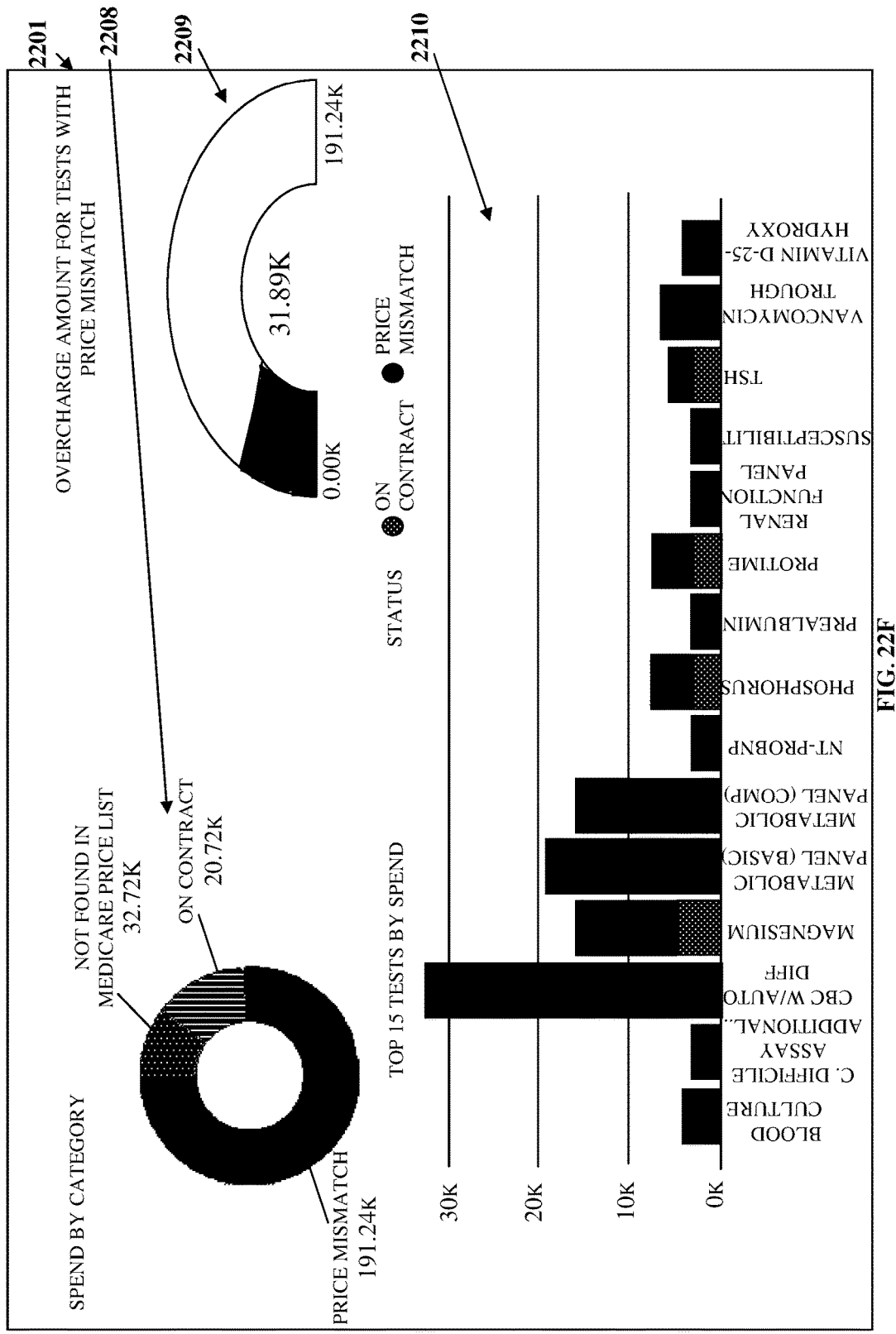

FIGS. 22A-22F exemplarily illustrate screenshots of a graphical user interface provided by the invoice analytics system, displaying an interactive, dynamic, and searchable invoice analytics report 2201 comprising different graphical data representations 2202, 2203, 2204, 2205, 2206, 2207, 2208, 2209, and 2210 of the invoice analytics performed by the invoice analytics system for a business service, for example, a laboratory testing service. The invoice analytics system generates graphical data representations, for example, bar graphs 2202, 2203, 2204, 2206, and 2210 exemplarily illustrated in FIGS. 22A-22B, FIG. 22D, and FIG. 22F, line graphs 2205 and 2207 exemplarily illustrated in FIG. 22C and FIG. 22E, donut charts 2208 and 2209 exemplarily illustrated in FIG. 22F, etc. The bar graph 2202 exemplarily illustrated in FIG. 22A, provides a visual display of the spend of business service line items in an invoice that are covered under a contract, the spend of the business service line items that are not covered under the contract, and the spend of the business service line items that are under the contract but with billing pricing errors. The bar graph 2203 exemplarily illustrated in FIG. 22B, displays the percentage of business service line items that have billing pricing errors. The invoice analytics system also identifies and renders top business service line items, for example, top procedures performed by the laboratory testing service provider that are mispriced in the bar graph 2204 as exemplarily illustrated in FIG. 22B. The invoice analytics system also identifies and renders top procedures performed by the laboratory testing service provider by spend and top tests by spend as bar graphs 2206 and 2210 exemplarily illustrated in FIG. 22D and FIG. 22F respectively. The line graph 2205 exemplarily illustrated in FIG. 22C, depicts the total spend of the health center for the laboratory testing services by month. As exemplarily illustrated in FIG. 22C, the data represented in the line graph 2205 can be filtered by a user of the invoice analytics system. Furthermore, the invoice analytics system presents a comparison of the total spend of the health center by month and by account number as a line graph 2207 exemplarily illustrated in FIG. 22E, to allow the user to assess the trends in the total spend by month and account number. As exemplarily in FIG. 22F, the invoice analytics system renders business service line item spend as donut charts 2208 and 2209.

FIG. 23 exemplarily illustrates a screenshot of a graphical user interface 2301 provided by the invoice analytics system, displaying a reconciliation report comprising a tabular representation of pricing errors of business service line items identified in invoices received from a vendor, for example, a laboratory testing service provider, by the invoice analytics system. The invoice analytics system identifies the pricing errors of the business service line items from different invoices of the laboratory testing service provider and the corresponding fees from a pricing sheet, that is, the contract and generates the reconciliation report. The invoice analytics system further generates a feed report comprising the invoice line item data extracted and segmented from the aggregated business service transactional invoice data of the invoices by category of the business services, by vendor, and by a predefined time duration, for example, a month. The feed report helps build a business service item master data table. The business service item master data table is a central repository of expenditures of an entity, for example, a health center, with respect to business services procured by the entity. The business service item master data table contains, for example, descriptions of all the business service line items listed in the business service item master data table, vendor name, vendor catalog number, service description number, etc.

FIG. 24 exemplarily illustrates a business service item master data table 2401 for business services. The invoice analytics system extracts invoice line item data from invoices for the business services received from an entity and then transforms the extracted line item data into a format that can be uploaded into an operational system, for example, a purchasing system of the entity. The invoice analytics system reconciles the received invoices and in an embodiment, renders the extracted line item data to the entity's accounting and/or procurement systems for uploading into the business service item master data table 2401. As exemplarily illustrated in FIG. 24, the business service item master data table 2401 comprises columns for delivery number description, service description number, unit price, and price unit of measure (UOM) as exemplarily illustrated in FIG. 24. The delivery number description in the business service item master data table 2401 is a system generated number that provides a record identifier to an entry in the business service item master data table 2401. Vendors may further outsource the business services to a subordinate agency. Entities, for example, health centers, have established protocols and standards for reviewing the vendors prior to adding the vendors to an operational system of each entity. For example, prior to adding vendor details to an accounts payable system of an entity, payment details associated with the vendor, for example, bank details, account details, etc., need to be verified by the entity. The service description number in the business service item master data table 2401 is an identifier for a vendor and the vendor's associated business service in a catalog. The service description number is similar to a manufacturer part number in item master data of a material management system of the entity. The other fields in the business service item master data table 2401 for business services comprise, for example, commodity code, ordering unit of measure, lowest unit of measure, quantity, chargeable flag, etc. Any operation performed on the entries in the business service item master data table 2401 affects the other operational systems of the entity.

Figure 25A:
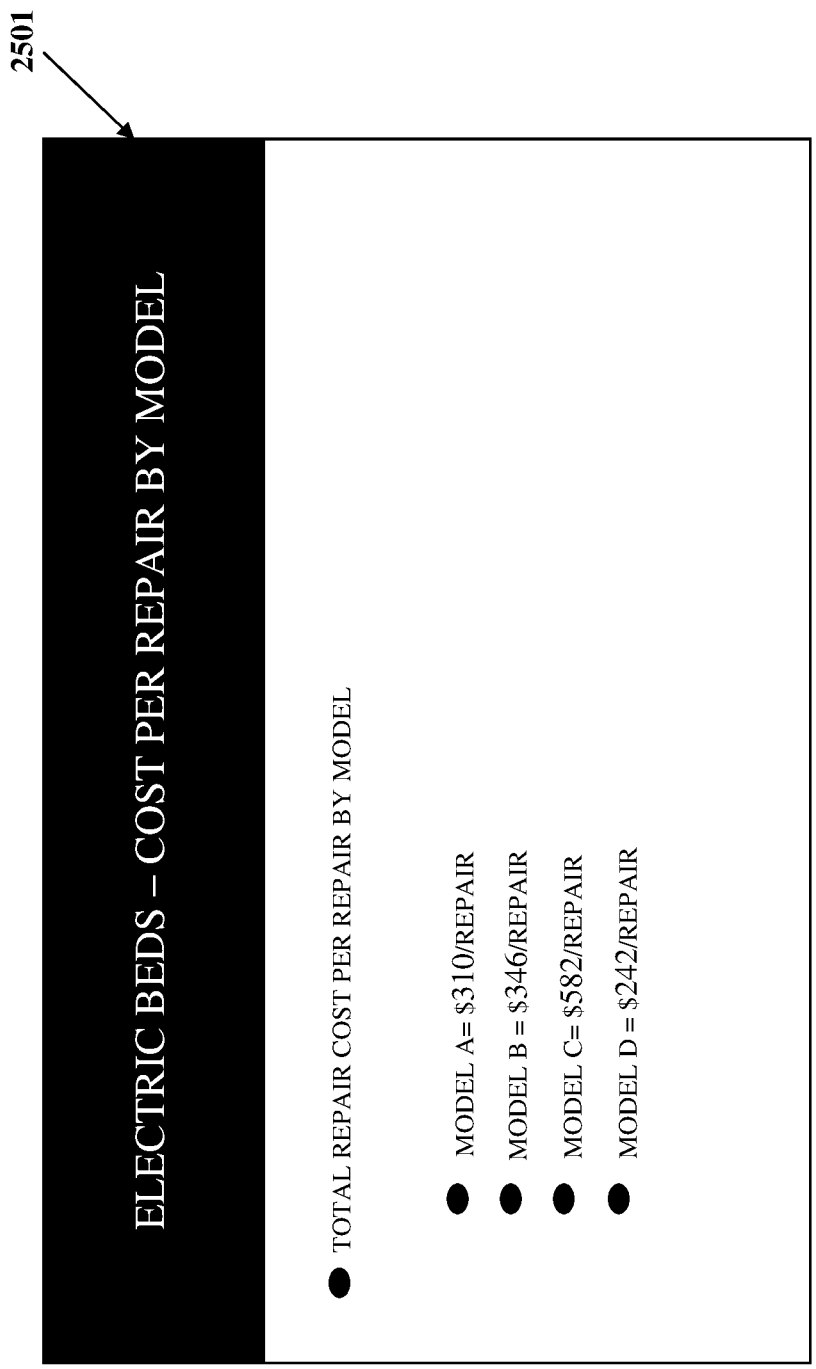
Figure 25C:
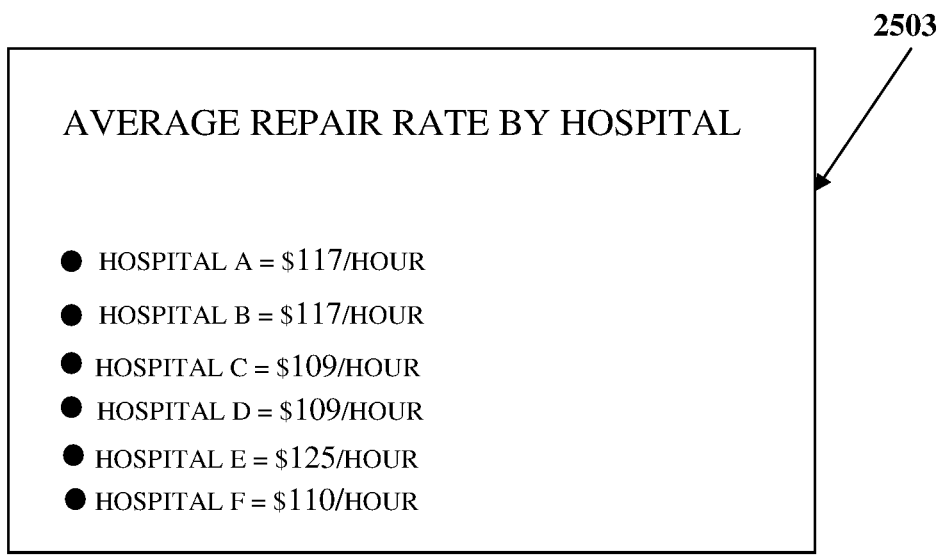

FIGS. 25A-25C exemplarily illustrate screenshots of graphical representations 2501, 2502, and 2503 of invoice line item data utilized by the invoice analytics system for performing a comparative analysis of the invoice line item data extracted and segmented from invoices of vendors, for example, a medical equipment repair service provider in a similar category of business services, for example, medical equipment repair services, for an entity, for example, a health center or different entities. Entities have many vendors they utilize within the same category and all with different pricing and terms. The invoice analytics system performs a line item comparative analysis of all vendors within the same category by month and line item data to indicate pricing gaps and opportunities to reduce costs and consolidate. The graphical representation 2501 exemplarily illustrated in FIG. 25A, displays pricing details per repair by a medical equipment repair service provider for different models of electric beds. The graphical representation 2502 exemplarily illustrated in FIG. 25B, displays details of the time taken on an average per repair per model and labor charges per hour of repair for different models of electric beds. The graphical representation 2503 exemplarily illustrated in FIG. 25C, displays pricing details for repair of the electric beds per hour for different hospitals. The invoice analytics system compares the details in the graphical representations 2501, 2502, and 2503 to determine avenues for cost reduction and utilization optimization when procuring the medical equipment repair services from the medical equipment repair service provider.

Figure 26A:
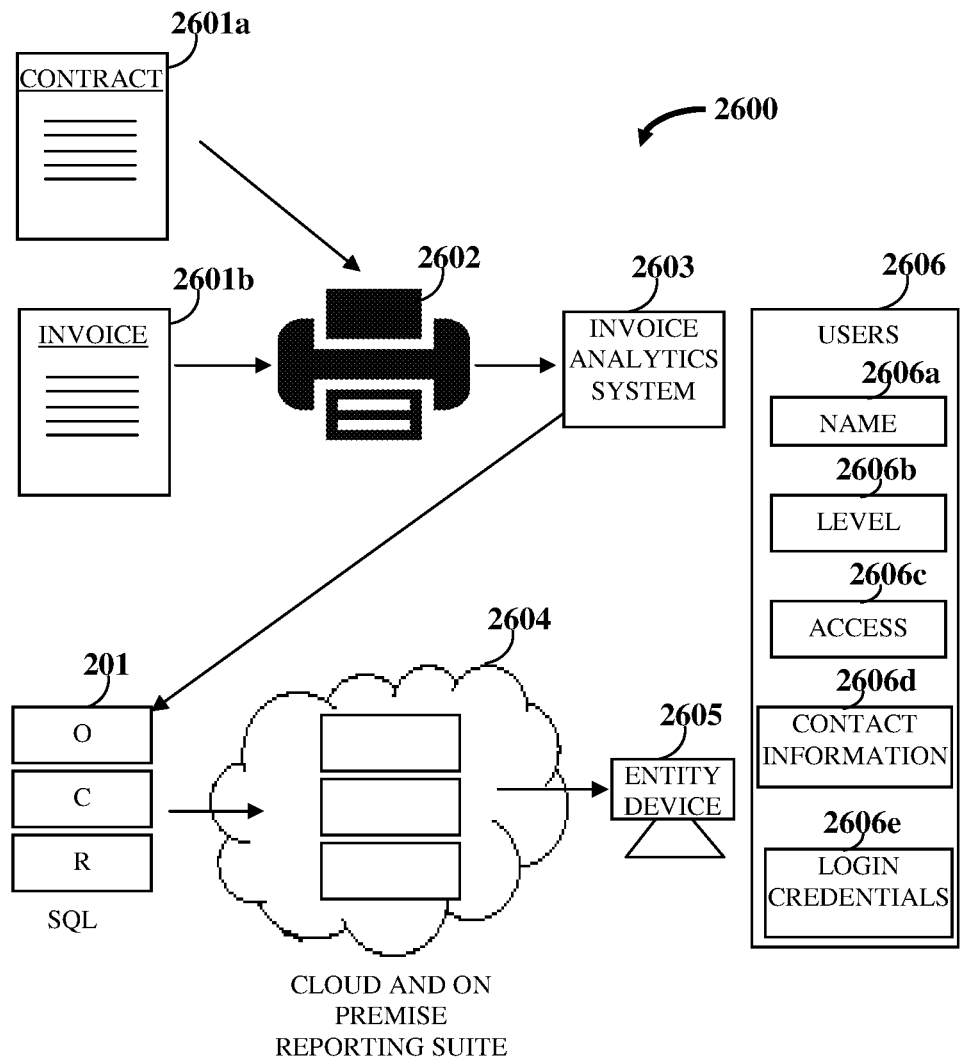
FIGS. 26A-26B exemplarily illustrate an embodiment of a system comprising the invoice analytics system for analyzing business service transactional invoice data of an entity and performing invoice analytics for the entity in real time.
Figure 26B:
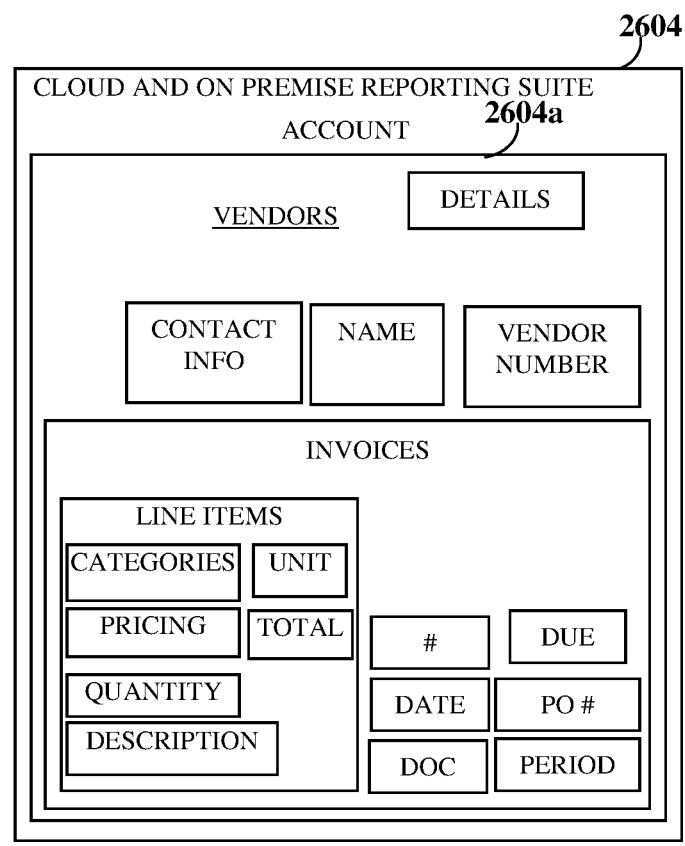

FIGS. 26A-26B illustrate an embodiment of a system 2600 comprising the invoice analytics system 2603 for analyzing business service transactional invoice data of an entity and performing invoice analytics for the entity in real time. The invoice analytics system 2603 communicates with an entity device 2605 in a cloud computing environment. The entity device 2605 is an electronic device that has access to an operational system of the entity for conducting business and to the invoice analytics system 2603 that analyzes business service transactional invoice data of the entity and performs invoice analytics for the entity in real time. The entity device 2605 is, for example, one or more of a personal computer, a tablet computing device, a mobile computer, a mobile phone, a smart phone, a portable computing device, a laptop, a personal digital assistant, a wearable device such as the Google Glass® of Google Inc., the Apple Watch® of Apple Inc., the Android Smartwatch® of Google Inc., etc., a touch centric device, a workstation, a server, a client device, a portable electronic device, a network enabled computing device, an interactive network enabled communication device, a web browser, any other suitable computing equipment, combinations of multiple pieces of computing equipment, etc. In an embodiment, the entity device 2605 is a hybrid computing device that combines the functionality of multiple devices. An examples of a hybrid computing device is a portable device that receives electronic mail (email), supports mobile telephone calls, has a media player functionality, and supports web browsing. In an embodiment, computing equipment is used to implement applications such as media playback applications, a web browser, an electronic mail (email) application, a calendar application, etc.

An administrator of the invoice analytics system 2603 receives physical documents, for example, paper based documents of contracts 2601a and invoices 2601b from one or more data sources and scans the physical documents using a scanner 2602 to convert the physical documents to electronic documents in an electronic format. The electronic documents are, for example, portable document format (pdf) files, Microsoft® Word document files of Microsoft Corporation, etc. The invoice analytics system 2603 receives the contracts 2601a and the invoices 2601b in the electronic format and performs optical character recognition (OCR) 201 and an extract, transform, and load (ETL) operation on the received contracts 2601a and invoices 2601b as disclosed in the detailed description of FIG. 2, to extract contract line item data and to extract and segment invoice line item data respectively. The invoice analytics system 2603 stores the extracted contract line item data and the extracted and segmented invoice line item data in the contract line item database 205 and the invoice line item database 203 exemplarily illustrated in FIG. 2, respectively. The contract line item database 205 and the invoice line item database 203 can be any storage area or medium that can be used for storing extracted contract line item data and the extracted and segmented invoice line item data respectively. In an embodiment, the contract line item database 205 and the invoice line item database 203 can be remotely accessed by the entity device 2605 via a network, for example, the internet.

In this embodiment of the system 2600 disclosed herein, the invoice analytics system 2603 is configured as a software as a service (SaaS) business intelligence and analytics platform. The invoice analytics system 2603 uses both a cloud and on premise reporting suite 2604 that renders real time invoice analytics of the contract line item data and the invoice line item data on a graphical user interface of the entity device 2605. The invoice analytics system 2603 reconciles the received invoices 2601b in accordance with the received contracts 2601a as disclosed in the detailed description of FIGS. 1A-1B, performs invoice analytics on the extracted and segmented invoice line item data, and generates and renders an interactive, dynamic, and searchable invoice analytics report 2604a as a part of the cloud and on premise reporting suite 2604 exemplarily illustrated in FIG. 26B, on the graphical user interface (GUI) of the entity device 2605. The cloud and on premise reporting suite 2604 implements access control to allow users 2606 of the invoice analytics system 2603 to accessing data contained in the interactive, dynamic, and searchable invoice analytics report 2604a. To provide access to the interactive, dynamic, and searchable invoice analytics report 2604a, an administrator of the invoice analytics system 2603 configures personal details, for example, name 2606a, level 2606b, access 2606c, contact information 2606d, etc., and authentication information comprising login credentials 2606e as exemplarily illustrated in FIG. 26A. The cloud and on premise reporting suite 2604 allows mobile reporting of the interactive, dynamic, and searchable invoice analytics report 2604a and allows the users 2606 to access the interactive, dynamic, and searchable invoice analytics report 2604a on any web-enabled entity device 2605. The cloud and on premise reporting suite 2604 provides additional capabilities, for example, an analysis of business services items not under contract, a business service line item analysis year over year, a fee and surcharge analysis, and a what if analysis to show potential cost reduction and utilization optimization opportunities.

Figure 27:
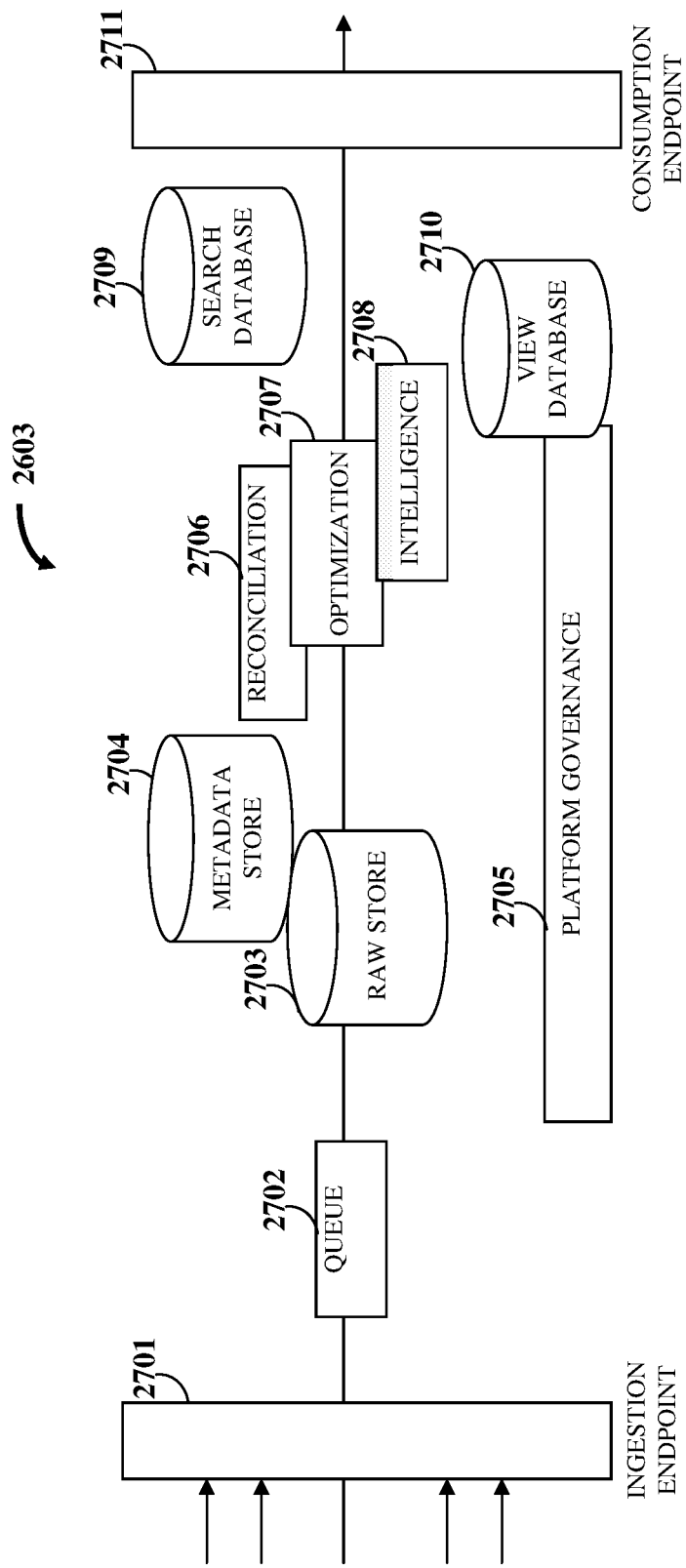
FIG. 27 exemplarily illustrates an embodiment of the invoice analytics system implemented in a data lake architecture for analyzing business service transactional invoice data of an entity and performing invoice analytics for the entity in real time.

FIG. 27 exemplarily illustrates an embodiment of the invoice analytics system 2603 implemented in a data lake architecture for analyzing business service transactional invoice data of an entity and performing invoice analytics for the entity in real time. As used herein, "data lake" refers to a data storage repository that consolidates and stores the business service transactional invoice data involved in analyzing business service transactions between the entity and one or more vendors and performing the invoice analytics. The data lake architecture comprises a raw store 2703 that is a storage repository that holds a vast amount of raw data in a native format until the raw data is requested by the invoice analytics system 2603. In this embodiment, the invoice analytics system 2603 is configured as a software as a service (SaaS) business intelligence and analytics platform. In an embodiment, the invoice analytics system 2603 is developed, for example, using the Google App engine cloud infrastructure of Google Inc., Amazon Web Services® of Amazon Technologies, Inc., the Amazon elastic compute cloud EC2® web service of Amazon Technologies, Inc., the Google® Cloud platform of Google Inc., the Microsoft® Cloud platform of Microsoft Corporation, the Microsoft® Power BI® of Microsoft Corporation, etc., and is Health Insurance Portability and Accountability Act of 1996 (HIPAA) compliant.

As exemplarily illustrated in FIG. 27, in this embodiment, the invoice analytics system 2603 receives invoices and contracts from one or more data sources at an ingestion endpoint 2701. The invoice analytics system 2603 creates a contract terms database comprising the received contracts and aggregates the business service transactional invoice data of the received invoices in an invoice aggregation database. The invoice analytics system 2603 extracts contract line item data from the received contracts and extracts and segments invoice line item data from the aggregated business service transactional invoice data. The invoice analytics system 2603 stores the extracted contract line item data and the extracted and segmented invoice line item data in the raw store 2703 via a queue 2702. In an embodiment, the ingestion of the extracted contract line item data and the extracted and segmented invoice line item data into the raw store 2703 is performed using Health Insurance Portability and Accountability Act of 1996 (HIPAA) compliant security protocols, for example, a secure file transfer protocol (sftp), a hypertext transfer protocol secure (https), etc.

The invoice analytics system 2603 implements platform governance 2705, in communication with a view database 2710, on the raw store 2703. The invoice analytics system 2603 categorizes and catalogues the stored invoice line item data by vendor, by a predefined duration of time, for example, a month, etc., by category of business services procured by the entity, etc. As a part of the platform governance 2705, the invoice analytics system 2603 monitors quality of the ingested data, that is, the extracted contract line item data and the extracted and segmented invoice line item data, ensures comprehensive data categorization, monitors authorization of access of the raw store 2703, monitors protection of sensitive data, for example, financial information in the raw store 2703 using masking, performs quota management of the extracted contract line item data and the extracted and segmented invoice line item data stored in the raw store 2703, etc.

The invoice analytics system 2603 catalogues the ingested data, that is, the extracted contract line item data and the extracted and segmented invoice line item data, and creates a metadata store 2704 corresponding to the ingested data. The invoice analytics system 2603 performs reconciliation 2706, optimization 2707, and intelligence 2708 in communication with the raw store 2703 and the metadata store 2704 to generate an interactive, dynamic, and searchable invoice analytics report, for example, in the form of a user interface dashboard at a consumption endpoint 2711 of the invoice analytics system 2603. At the consumption endpoint 2711, the invoice analytics system 2603 also generates a feed report with data feed comprising the extracted and segmented invoice line item data by category of the business services, by vendor, by predefined duration of time, for example, a month, etc. The invoice analytics system 2603 also generates a benchmark report comprising the determined avenues for cost savings in the business service transactions between the entity and the vendors, at the consumption endpoint 2711 of the invoice analytics system 2603. For performing reconciliation 2706, optimization 2707, and intelligence 2708, the invoice analytics system 2603 generates a search database 2709 comprising search terms used to search the raw store 2703 based on a query. The view database 2710 stores views generated using different queries on the raw store 2703.

The software implementation of the invoice analytics system 2603 is an improvement in computer related and database technology. The data lake architecture of the invoice analytics system 2603 provides multiple methods to query the data in the raw store 2703. The raw store 2703 can store multi-structured data from diverse data sources. The invoice analytics system 2603 utilizes the availability of large quantities of coherent invoice line item data in the raw store 2703 along with deep learning algorithms to recognize invoice line item data that will power real time decision analytics of the entity. The data lake architecture of the invoice analytics system 2603 integrates the ingested contract line item data and invoice line item data with historical data to generate a complete insight on the total spend of the entity for different business services for a predefined duration of time. In the data lake architecture of the invoice analytics system 2603, the invoice analytics system 2603 can store the extracted contract line item data and the extracted and segmented invoice line item data in a raw format in the raw store 2703 for indefinite periods of time and fetch the data from the raw store 2703 while performing invoice analytics as the need arises. The data lake architecture of the invoice analytics system 2603 allows faster loading of data from the raw store 2703 and parallel processing, resulting in a quick generation of the interactive, dynamic, and searchable invoice analytics report.

Figure 28:
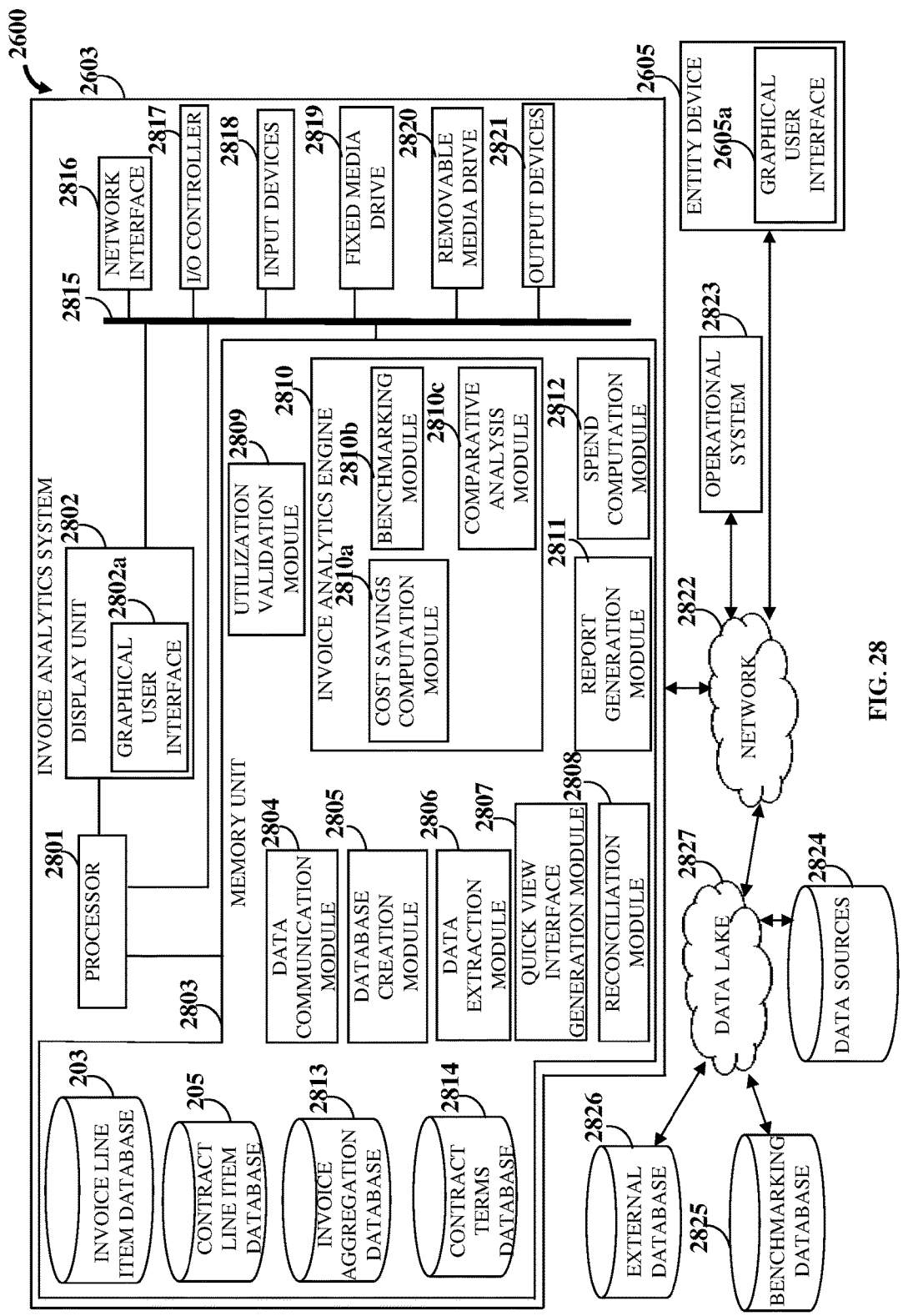
FIG. 28 exemplarily illustrates another embodiment of the system comprising the invoice analytics system for analyzing business service transactional invoice data of an entity and performing invoice analytics for the entity in real time.

FIG. 28 exemplarily illustrates another embodiment of the system 2600 comprising the invoice analytics system 2603 for analyzing business service transactional invoice data of an entity and performing invoice analytics for the entity in real time. The invoice analytics system 2603 is a computer system that is programmable using a high level computer programming language. In an embodiment, the invoice analytics system 2603 uses programmed and purposeful hardware. In an embodiment, the invoice analytics system 2603 is implemented on a computing device, for example, a personal computer, a tablet computing device, a mobile computer, a portable computing device, a laptop, a touch centric device, a workstation, a server, a client device, a portable electronic device, a network enabled computing device, an interactive network enabled communication device, any other suitable computing equipment, combinations of multiple pieces of computing equipment, etc. In the system 2600 disclosed herein, the invoice analytics system 2603 interfaces with one or more data sources 2824 for receiving the contracts and the invoices, an operational system 2823 of the entity for performing invoice analytics and utilization validation, an entity device 2605, an external database 2826 for computing cost savings for the entity, and a benchmarking database 2825 used for benchmarking the contract line item data and the invoice line item data in real time, and therefore uses more than one specifically programmed computing system.

The invoice analytics system 2603 communicates with the data sources 2824, the benchmarking database 2825, the external database 2826, the operational system 2823 of the entity, and the entity device 2605 via a network 2822, for example, a short range network or a long range network. The network 2822 is, for example, one of the internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. In an embodiment, the invoice analytics system 2603 is accessible to users, for example, through a broad spectrum of technologies and devices such as personal computers, internet enabled cellular phones, tablet computing devices, etc., with access to the internet.

As exemplarily illustrated in FIG. 28, the invoice analytics system 2603 comprises a non-transitory computer readable storage medium, for example, a memory unit 2803 for storing programs and data, and at least one processor 2801 communicatively coupled to the non-transitory computer readable storage medium. As used herein, "non-transitory computer readable storage medium" refers to all computer readable media, for example, non-volatile media, volatile media, and transmission media, except for a transitory, propagating signal. Non-volatile media comprise, for example, solid state drives, optical discs or magnetic disks, and other persistent memory volatile media including a dynamic random access memory (DRAM), which typically constitute a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to the processor 2801. The non-transitory computer readable storage medium is configured to store computer program instructions defined by modules, for example, 2804, 2805, 2806, 2807, 2808, 2809, 2810, 2811, 2812, etc., of the invoice analytics system 2603. The modules, for example, 2804, 2805, 2806, 2807, 2808, 2809, 2810, 2811, 2812, etc., of the invoice analytics system 2603 are installed and stored in the memory unit 2803 of the invoice analytics system 2603. The memory unit 2803 is used for storing program instructions, applications, and data. The memory unit 2803 is, for example, a random access memory (RAM) or another type of dynamic storage device that stores information and instructions for execution by the processor 2801. The memory unit 2803 also stores temporary variables and other intermediate information used during execution of the instructions by the processor 2801. The invoice analytics system 2603 further comprises a read only memory (ROM) or another type of static storage device that stores static information and instructions for the processor 2801.

The processor 2801 is configured to execute the computer program instructions defined by the modules, for example, 2804, 2805, 2806, 2807, 2808, 2809, 2810, 2811, 2812, etc., of the invoice analytics system 2603. The processor 2801 refers to any of one or more microprocessors, central processing unit (CPU) devices, finite state machines, computers, microcontrollers, digital signal processors, logic, a logic device, a user circuit, an application specific integrated circuit (ASIC), a field-programmable gate array (FPGA), a chip, etc., or any combination thereof, capable of executing computer programs or a series of commands, instructions, or state transitions. In an embodiment, the processor 2801 is implemented as a processor set comprising, for example, a programmed microprocessor and a math or graphics co-processor. The processor 2801 is selected, for example, from the Intel® processors such as the Itanium® microprocessor or the Pentium® processors, Advanced Micro Devices (AMD®) processors such as the Athlon® processor, Ultra-SPARC® processors, microSPARC® processors, hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The invoice analytics system 2603 disclosed herein is not limited to employing a processor 2801. In an embodiment, the invoice analytics system 2603 employs a controller or a microcontroller. The processor 2801 executes the modules, for example, 2804, 2805, 2806, 2807, 2808, 2809, 2810, 2811, 2812, etc., of the invoice analytics system 2603.

As exemplarily illustrated in FIG. 28, the invoice analytics system 2603 further comprises a display unit 2802, a data bus 2815, a network interface 2816, an input/output (I/O) controller 2817, input devices 2818, a fixed media drive 2819 such as a hard drive, a removable media drive 2820 for receiving removable media, output devices 2821, etc. The display unit 2802, via the graphical user interface (GUI) 2802a, displays information, display interfaces, user interface elements such as swipable arrows, icons, buttons, etc., for example, for selecting filters to be applied on graphical data representations of purchase patterns, outliers, variations, and predictive analytics for the entity in the interactive, dynamic, and searchable invoice analytics report. The display unit 2802 comprises, for example, a video display, a liquid crystal display, a plasma display, an organic light emitting diode (OLED) based display, etc. The display unit 2802 displays the GUI 2802a. The GUI 2802a is, for example, one of a webpage of a website hosted by the invoice analytics system 2603, an online web interface, a web based downloadable application interface, a mobile based downloadable application interface, etc. The GUI 2802a allows a user, for example, an administrator of the invoice analytics system 2603 to configure the invoice analytics system 2603 to perform optical character recognition, to configure the rendering of the interactive, dynamic, and searchable invoice analytics report on a GUI 2605a of the entity device 2605, etc.

The data bus 2815 permits communications between the modules, for example, 2801, 2802, 2803, 2816, 2817, 2818, 2819, 2820, 2821, etc., of the invoice analytics system 2603. The network interface 2816 enables connection of the invoice analytics system 2603 to the network 2822. In an embodiment, the network interface 2816 is provided as an interface card also referred to as a "line card". The network interface 2816 comprises, for example, one or more of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, Ethernet communication interfaces, asynchronous transfer mode (ATM) interfaces, a high speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The I/O controller 2817 controls input actions and output actions performed by the invoice analytics system 2603.

The input devices 2818 are used to input data into the invoice analytics system 2603 and for routine maintenance of the invoice analytics system 2603. The user uses the input devices 2818 to provide inputs to the invoice analytics system 2603. The input devices 2818 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc. The output devices 2821 output the results of operations performed by the invoice analytics system 2603.

The modules of the invoice analytics system 2603 comprise a data communication module 2804, a database creation module 2805, a data extraction module 2806, a quick view interface generation module 2807, a reconciliation module 2808, an invoice analytics engine 2810, and a report generation module 2811. The data communication module 2804 receives multiple contracts comprising agreement information on business service transactions between the entity and one or more vendors from one or more data sources 2824. The data communication module 2804 also receives multiple invoices comprising the business service transactional invoice data corresponding to the business service transactions between the entity and one or more vendors from one or more data sources 2824. A code snippet of the data communication module 2804 executed by the processor 2801 of the invoice analytics system 2603 for receiving multiple contracts and invoices is disclosed below:

contract terms database 2814. The database creation module 2805 creates a contract line item database 205 for storing the extracted contract line item data. The database creation module 2805 also aggregates the business service transactional invoice data of the received invoices by vendor and by a predefined time duration, for example, a month in an invoice aggregation database 2813. The data extraction module 2806 also extracts and segments invoice line item data from the aggregated business service transactional invoice data stored in the invoice aggregation database 2813. The database creation module 2805 also creates an invoice line item database 203 for storing the extracted and segmented invoice line item data. Code snippets of the data communication module 2804, the database creation module 2805, and the data extraction module 2806 executed by the processor 2801 of the invoice analytics system 2603 for a vendor, for example, a document management service provider such as DocumentABC, Inc., are disclosed below:

```
Public Overrides Function OnExportBatch(ByVal ResultDescription As String) As
EExportScriptResult
Const csFunction As String = "OnExportBatch"
Dim batchId As String = App.CurrentJob.SuperDoc.Id
Util.LogDebug(App, csFunction, "JobId=" & App.CurrentJob.Id & " BatchId=" &
batchId)
Dim batchName As String = App.CurrentJob.SuperDoc.UserProperty ("BatchId")
Component.SignalList.SetState(batchId, EExportSignalState.eExpExporting)
Component.SignalList.SetValue(batchId, ESignalAttribute.eExpBatchName, batchId)
Util.LogDebug(App, csFunction, "start exporting" & batchId)
Util.logDebug( App, csFunction, "create FormatterAddIn")
Using formatter As FormatterAddIn = New FormatterAddIn(App, App.Config.ClientId)
        Util.LogDebug(App, csFunction, "FormatterAddIn created")
        Dim batch, unit, document As DCore.SuperDoc
        Batch = App.CurrentJob.SuperDoc
        For Each unit In batch.Children
             For Each document In unit.Children
                 If document. State <> DCore.EDocState.crStateDeleted Then
                     If Not Directory. Exists(_exportRoot) Then
                          Directory.CreateDirectory(_exportRoot)
                     End If
                     'create folder Inova if it does not exists
                     Dim _GEPATH As String = Path.Combine(_exportRoot,
                     "GE")
                     If Not Directory.Exists(_GEPATH) Then
                          Directory.CReateDirectory(_GEPATH)
                     End If
                     If document.ClassData.ToDocument.Result IS Nothing
                     Then
                          Continue For
                     End If
                     Dim result As DRID.RID = document.ClassData.
                     ToDocument.Result
                     'Try
                     '    result =
                     Component.ProcessDocumentResult(document)
                     'Catch ex As Exception
                     '    Continue For
                     ' End Try
                     If result is Nothing Then
                          Continue For
                     End If
                     Dim VendorName As String =
                     result.regions("CreditorId").ToField.Value.Text
```

The database creation module 2805 creates a contract terms database 2814 for storing the received contracts by vendor. The data extraction module 2806 extracts contract line item data from the received contracts stored in the Another code snippet of the data extraction module 2806 executed by the processor 2801 of the invoice analytics system 2603 for a vendor, for example, a scope repair service provider is disclosed below:

```
Result.Regions("HeaderTotalForAllScopes").ToField.Value.Text =
Result.Regions("HeaderTotalForAllScopes").ToField.Value.Text.Replace("'", "")
    'Result.Regions("HeaderGENumber").ToField.Value.Text =
Result.Regions("HeaderGENumber").ToField.Value.Text.Replace("-", "").Replace(" ",
"")
    'End If
    If
Result.Regions(XGlobals.SPAP.Context.FieldMapping.CreditorId).ToField.Value.Text =
"Scope" Then
        ExtractSerialTable(SuperDoc, Result)
        ExtractPositionsTable(SuperDoc, Result)
    End If
    'If
Result.Regions(XGlobals.SPAP.Context.FieldMapping.CreditorId).ToField.Value.Text =
"GECover" Then
    'ExtractCover(SuperDoc, Result)
    ' End If
    "#Anthony complete TaxRate Address
    'If Not String.IsNullOrEmpty(Result.Regions("TaxRate").ToField.Value.Text) Then
    '   Result.Regions("TaxRate").ToField.Value.Text =
Result.Regions("TaxRate").ToField.Value.Text.Replace("Sales", "").Replace("USD",
"").Trim
    'End If
    Return True
End Function
' Public Sub ExtractCover(ByVal SuperDoc As Docutec.AddIn.DCore.SuperDoc,
ByVal Result As Docutec.AddIn.DRID.RID)
' End Sub
Public Sub ExtractSerialTable(ByVal SuperDoc As Docutec.AddIn.DCore.SuperDoc,
ByVal Result As Docutec.AddIn.DRID.RID)
    ' if GEMaterial, extract second table
    Dim tf As DContext.TableFinder = ObjectFactory.CreateTableFinder("SerialTable",
SuperDoc, Result)
    tf.SearchConfiguration = "Serial"
    tf.DoSearch(tf.SearchConfiguration)
    tf.RemoveInvalidLinesFromTable( )
    tf.AddRowsToTarget( )
    Dim lineCount As Integer = 0
    For Each row As DRID.Row In Result.Regions("SerialTable").ToTable.Rows
        Dim rect As DRID.Rect =
row.Regions("SerialPickupDate").ToField.BoundingBox.Copy
        'row.Regions("MaterialsCharges").ToField.Value.Text =
DecimalFix(row.Regions("ClientChargeAmount").ToField.Value.Text)
        If Not rect.IsEmpty Then
            rect = row.Regions("SerialPickupDate").ToField.BoundingBox.Copy
            rect.Left = 467
            rect.Right = 687
row.Regions("SerialPickupDate").ToField.Value.AssignEx(XGlobals.SPAP.Context.Peek
Area(SuperDoc, row.Regions("SerialPickupDate").ToField.SheetIndex, rect, 0.5,
DCID.ERegionType.ciLine).Value)
            rect = row.Regions("SerialInvoiceDate").ToField.BoundingBox.Copy
            rect.Left = 1267
            rect.Right = 1487
row.Regions("SerialInvoiceDate").ToField.Value.AssignEx(XGlobals.SPAP.Context.Peek
Area(SuperDoc, row.Regions("SerialInvoiceDate").ToField.SheetIndex, rect, 0.5,
DCID.ERegionType.ciLine).Value)
            ' extract billing reasson
            rect = row.Regions("SerialPickupDate").ToField.BoundingBox.Copy
            rect.Right = 3000
            rect.Top = rect.Bottom + 5
            rect.Bottom = rect.Top + 50
row.Regions("SerialComplaint").ToField.Value.AssignEx(XGlobals.SPAP.Context.Peek
Area(SuperDoc, row.Regions("SerialPickupDate").ToField.SheetIndex, rect, 0.5,
DCID.ERegionType.ciLine).Value)
            rect = row.Regions("SerialPickupDate").ToField.BoundingBox.Copy
            rect.Left = 0
            rect.Right = 350
            rect.Bottom = rect.Top - 5
            rect.Top = rect.Bottom - 50
row.Regions("SerialNumber").ToField.Value.AssignEx(XGlobals.SPAP.Context.PeekArea
(SuperDoc, row.Regions("SerialPickupDate").ToField.SheetIndex, rect, 0.5,
DCID.ERegionType.ciLine).Value)
            rect = row.Regions("SerialPickupDate").ToField.BoundingBox.Copy
            rect.Left = 355
            rect.Right = 1000
            rect.Bottom = rect.Top - 5
            rect.Top = rect.Bottom - 50
row.Regions("SerialModel").ToField.Value.AssignEx(XGlobals.SPAP.Context.PeekArea
(SuperDoc, row.Regions("SerialPickupDate").ToField.SheetIndex, rect, 0.5,
DCID.ERegionType.ciLine).Value)
            'row.Regions("MaterialsCoverage").ToField.Value.Text =
```

```
row.Regions("MaterialsCoverage").ToField.Value.Text.Replace(".", "").Replace("\",
"").Replace("-", "").Trim
        "MaterialsSpellCheck(row) '#Anthony fixes common mispellings in poorly
scanned invoices.
      End If
    Next
  End Sub
  Public Sub ExtractPositionsTable(ByVal SuperDoc As
Docutec.AddIn.DCore.SuperDoc, ByVal Result As Docutec.AddIn.DRID.RID)
    Dim tf As DContext.TableFinder =
ObjectFactory.CreateTableFinder("TableOfPositionData", SuperDoc, Result)
    tf.SearchConfiguration = "Positions"
    tf.DoSearch(tf.SearchConfiguration)
    tf.RemoveInvalidLinesFromTable( )
    tf.AddRowsToTarget( )
    'Dim tableEnd As Integer = 0
    ' For i As Integer = Result.Regions("TableOfPositionData").ToTable.Rows.Count −
1 To 0 Step −1
    'Dim row As DRID.Row =
Result.Regions("TableOfPositionData").ToTable.Rows(i)
    'If row.Regions("FieldID").ToField.Value.Text = "---LST" Then
    'tableEnd = i
    ' Exit For
    'End If
    'While Not tableEnd < Result.Regions("FieldIDTable").ToTable.Rows.Count
    'Try
    'Catch ex As Exception
    '   Result.Regions("FieldIDTable").ToTable.Rows.Remove(tableEnd)
    ' End Try
    'tableEnd = tableEnd + 1
    'End While
    ' Next
    '"""""""""""
    '#Anthony Cleans Up Bad Lines based on the information of each field
    For i As Integer = Result.Regions("TableOfPositionData").ToTable.Rows.Count − 1
To 0 Step −1
        Dim row As DRID.Row =
Result.Regions("TableOfPositionData").ToTable.Rows(i)
        Dim rect As DRID.Rect = row.Regions("PosAppr").ToField.BoundingBox.Copy
        If Not rect.IsEmpty Then
            rect = row.Regions("PosAppr").ToField.BoundingBox.Copy
            Dim height As Integer = rect.Bottom − rect.Top
            'rect.Right = rect.Right + 10
            rect.Top = rect.Bottom + 2
            rect.Bottom = rect.Top + height + 10
            Dim help As DRIP.Field = XGlobals.SPAP.Context.PeekArea(SuperDoc,
row.Regions("PosAppr").ToField.SheetIndex, rect, 0.5, DCID.ERegionType.ciLine)
            rect = row.Regions("PosAppr").ToField.BoundingBox.Copy
            If String.IsNullOrEmpty(help.Value.Text) Then
                'has second row
                'rect.Bottom = rect.Bottom + height '#Anthony Original
                rect.Bottom = rect.Bottom + height + 10 '#Anthony Alteration
            Else
                rect.Bottom = rect.Bottom
                ' no second row
            End If
            rect.Left = 555
            rect.Right = 1430
row.Regions("PosRepairItemDescription").ToField.Value.AssignEx(XGlobals.SPAP.Context
.PeekArea(SuperDoc, row.Regions("PosAppr").ToField.SheetIndex, rect, 0.5,
DCID.ERegionType.ciLine).Value)
            row.Regions("PosRepairItemDescription").ToField.Value.Text =
row.Regions("PosRepairItemDescription").ToField.Value.Text.Replace("@", "at")
            row.Regions("PosRepairItemDescription").ToField.Value.Text =
row.Regions("PosRepairItemDescription").ToField.Value.Text.Replace("lern", "1 cm")
            'row.Regions("PosRate").ToField.Value.Text =
DecimalFix(row.Regions("PosRate").ToField.Value.Text)
            'row.Regions("PosTotal").ToField.Value.Text =
DecimalFix(row.Regions("PosTotal").ToField.Value.Text)
        End If
        'POSLineCheck(row, i, SuperDoc, Result)
        'POSSpellCheck(row)
    Next
    ' For i As Integer = Result.Regions("TableOfPositionData").ToTable.Rows.Count −
1 To 0 Step −1
    'Dim row As DRID.Row =
Result.Regions("TableOfPositionData").ToTable.Rows(i)
    'If row.Regions("FieldID").ToField.BoundingBox.Left > 700 Then
    'Result.Regions("TableOfPositionData").ToTable.Rows.Remove(i)
```

```
    'End If
  'Next
End Sub
```

A code snippet of the data extraction module 2806 executed by the processor 2801 of the invoice analytics system 2603 for performing a spell check on the invoice line item data extracted from the received invoice is disclosed below:

```
Public Sub POSSpellCheck(ByVal row As DRID.Row)
  Try
    Row.Regions("PosArticleNumber"). ToField.Value.Text =
row.Regions("PosArticleNumber").ToField.Value.Text.Replace("Paris", "Parts")
  Catch ex As Exception
  End Try
  Try
    row.Regions("PosArticleNumber").ToField.Value.Text =
    row.Regions("PosArticleNumber").ToField.Value.Text.Replace("Parte;",
    "Parts")
  Catch ex As Exception
  End Try
  Try
    row.Regions("PosArticleNumber").ToField.Value.Text =
    row.Regions("PosArticleNumber").ToField.Value.Text.Replace("Pans;", "Parts")
  Catch ex As Exception
  End Try
  Try
    row.Regions("PosArticleNumber").ToField.Value.Text =
    row.Regions("PosArticleNumber").ToField.Value.Text.Replace("P,,rrs;",
    "Parts")
  Catch ex As Exception
  End Try
  Try
    row.Regions("PosArticleNumber").ToField.Value.Text =
    row.Regions("PosArticleNumber").ToField.Value.Text.Replace("Parls;", "Parts")
  Catch ex As Exception
  End Try
  Try
    row.Regions("PosArticleNumber").ToField.Value.Text =
    row.Regions("PosArticleNumber").ToField.Value.Text.Replace("ParLs;",
    "Parts")
  Catch ex As Exception
  End Try
  Try
    row.Regions("PosArticleNumber").ToField.Value.Text =
    row.Regions("PosArticleNumber").ToField.Value.Text.Replace("FiatRate;",
    "Flat Rate")
  Catch ex As Exception
  End Try
  Try
    row.Regions("PosArticleNumber").ToField.Value.Text =
    row.Regions("PosArticleNumber").ToField.Value.Text.Replace("FlalRale;",
    "Flat Rate")
  Catch ex As Exception
  End Try
  Try
    row.Regions("PosArticleNumber").ToField.Value.Text =
    row.Regions("PosArticleNumber").ToField.Value.Text.Replace("FiatRdlc;",
    "Flat Rate")
  Catch ex As Exception
  End Try
  Try
    row.Regions("PosArticleNumber").ToField.Value.Text =
    row.Regions("PosArticleNumber").ToField.Value.Text.Replace("FlalRate;",
    "Flat Rate")
  Catch ex As Exception
  End Try
```

The quick view interface generation module 2807 transforms the extracted contract line item data into a quick view format and generates and renders a contract quick view interface on the graphical user interface 2605a of the entity device 2605. The contract quick view interface displays the extracted contract line item data of the received contracts in the quick view format for optimal review, interpretation, comparison, and statistical analysis. The reconciliation module 2808 identifies, details, and outlines billing pricing errors, contract compliance errors, and off-contract business service items from the extracted and segmented invoice line item data with reference to the extracted contract line item data for predefined time intervals, for example, monthly, automatically in real time using the created invoice line item database 203 and the created contract line item database 205. The reconciliation module 2808 also rectifies the identified, detailed, and outlined billing pricing errors and the contract compliance errors, and resolves the off-contract business service items in real time to reconcile the received invoices in accordance with the received contracts for the predefined time intervals. A code snippet of the reconciliation module 2808 executed by the processor 2801 of the invoice analytics system 2603 for identifying, detailing, and outlining the billing pricing errors, the contract compliance errors, and the off-contract business service items, for rectifying the billing pricing errors and the contract compliance errors, and for resolving the off-contract business service items in real time to reconcile the received invoices in accordance with the received contracts for the predefined time intervals is disclosed below:

```
r.entries = [ ];
    for(var i = 0; i < facilityItems.length; i++) {
        let hit = contractItemsNonFacility[facilityItems[i].Description];
        let c = {
            date: facilityItems[i].InvoiceDate,
            location: facilityItems[i].Location,
            description: facilityItems[i].Description,
            invoice_price: facilityItems[i].Price,
            contract_price: (hit) ? hit.Price : 0.0,
            quantity: facilityItems[i].Quantity,
        };
        c.impact = parseFloat((c.invoice_price * c.quantity).toFixed(2));
        c.totalspend = parseFloat((c.invoice_price *
        c.quantity).toFixed(2));
        c.pct = '';
        if (hit) {
            if (c.invoice_price == c.contract_price)
                c.status = 'onContractOnPrice';
            else
                c.status = 'onContractOffPrice';
        } else {
            c.status = 'offContract';
        }
        r.entries.push(c);
    }
}
```

Another code snippet of the reconciliation module 2808 executed by the processor 2801 of the invoice analytics system 2603 for identifying, detailing, and outlining the billing pricing errors, the contract compliance errors, and the off-contract business service items, for rectifying the billing pricing errors and the contract compliance errors, and for resolving the off-contract business service items in real time to reconcile the received invoices in accordance with the received contracts for the predefined time intervals is disclosed below:

```
class FacilityPhaseController {
    /**@ngInject*/
    constructor($state,$scope,$stateParams,dataService) {
        this._$state = $state;
            category: $stateParams.category,
            facility: $stateParams.facility
    };
        this.phases=dataService.facilityPhase($stateParams.facility,
$stateParams.phase);
        $scope.phase=dataService.phase($stateParams.phase).name;
        let phaseCounts={ };
        let countTypes={
        {
            name:"Off Contract"
        },
        {
            name:"On Contract- On Price"
        },
        {
            name:"On Contract- Off Price"
        }
    };
    let onContractOnPrice=[ ];
    let onContractOnPrice=[ ];
    let offContract=[ ];
    for (let i=0, i<this.phases.length;i++) {
        let phase=this.phases[i];
        for (let j=0, j<phase.entries.length;j++) {
            let entry=phase.entries[j];
            if (entry.status=='offContract')
                offContract.push(entry);
            else if (entry.status=='conContractOfffPrice')
                onContractOffPrice.push(entry);
            else
                onContractOnPrice.push(entry);
        }
    }
```

The contract terms database 2814, the invoice aggregation database 2813, the contract line item database 205, and the invoice line item database 203 can be any storage area or medium that can be used for storing data and files. In an embodiment, the contract terms database 2814, the invoice aggregation database 2813, the contract line item database 205, and the invoice line item database 203 can be any of a structured query language (SQL) data store or a not only SQL (NoSQL) data store such as the Microsoft® SQL Server®, Microsoft® Power BI®, the Oracle® servers, the MySQL® database of MySQL AB Company, the mongoDB® of MongoDB, Inc., the Neo4j graph database of Neo Technology Corporation, the Cassandra database of the Apache Software Foundation, the HBase® database of the Apache Software Foundation, etc. In an embodiment, the contract terms database 2814, the invoice aggregation database 2813, the contract line item database 205, and the invoice line item database 203 can also be locations on a file system. In another embodiment, the contract terms database 2814, the invoice aggregation database 2813, the contract line item database 205, and the invoice line item database 203 can be remotely accessed by the invoice analytics system 2603 via the network 2822. In another embodiment, the contract terms database 2814, the invoice aggregation database 2813, the contract line item database 205, and the invoice line item database 203 are configured as cloud based databases implemented in a cloud computing environment, where computing resources are delivered as a service over the network 2822.

In an embodiment, the modules of the invoice analytics system 2603 further comprise a utilization validation module 2809 for generating a utilization validation interface that links to the operational system 2823 of the entity for validating utilization of the business services on the reconciliation of the received invoices. The utilization validation module 2809 renders the generated utilization validation interface on the graphical user interface 2605a of the entity device 2605. On reconciliation of the received invoices, the invoice analytics engine 2810, in communication with the operational system 2823 of the entity, performs the invoice analytics on the extracted and segmented invoice line item data with supplementary data for price and utilization optimization of the business services and benchmarking in real time for cost savings. In an embodiment, the supplementary data for price and utilization optimization of the business services is stored in the external database 2826. The invoice analytics engine 2810 comprises a cost savings computation module 2810*a*, a benchmarking module 2810*b*, and a comparative analysis module 2810*c*. The cost savings computation module 2810*a*, in communication with the external database 2826, computes the cost savings for the entity based on analytics criteria comprising, for example, the identified billing pricing errors, the contract compliance errors, and the off-contract business service items. The benchmarking module 2810*b* benchmarks the contract line item data and the invoice line item data using the benchmarking database 2825 in real time for determining avenues for cost savings in the business service transactions. The benchmarking database 2825 stores, for example, pricing benchmarks. The comparative analysis module 2810*c* performs a comparative analysis of the extracted and segmented invoice line item data from the received invoices of each of at least two vendors in a similar category of the business services at the predefined time intervals, for example, monthly, for determining pricing gaps between the vendors and cost reduction and utilization optimization opportunities per extracted and segmented invoice line item data.

The report generation module 2811 of the invoice analytics system 2603 generates an interactive, dynamic, and searchable invoice analytics report comprising graphical data representations of purchase patterns, outliers, variations, and predictive analytics for the entity over the predefined time duration at the predefined time intervals based on the invoice analytics of the extracted and segmented invoice line item data. In an embodiment, the report generation module 2811 generates a feed report comprising the extracted and segmented invoice line item data by category of the business services, by vendor, and by a predefined time duration. In an embodiment, the modules of the invoice analytics system 2603 further comprise a spend computation module 2812 for computing a total spend for each of the business services over the predefined time duration using the extracted and segmented invoice line item data. The spend computation module 2812 renders the computed total spend in the generated interactive, dynamic, and searchable invoice analytics report. Code snippets for the utilization validation module 2809, the invoice analytics engine 2810, and the spend computation module 2812 executed by the processor 2801 of the invoice analytics system 2603 are disclosed below:

```
const conf = require('./gulp.conf');
module.exports = function ( ) {
    return {
        server: {
            baseDir: [
                conf.paths.dist
            ]
        },
            open: false
        };
const conf=require('./gulp.conf');
module.exports=function(config) {
    const configuration= {
        basePath: '../',
        singleRun: false,
        autoWatch: true,
        logLevel: 'INFO',
        junitReporter: {
            outputDir: 'test-reports'
        },
        browsers: [
            'PhantomJS'
```

```
        ],
        frameworks: [
            'jasmine'
        ],
        files: [
            'node_modules/es6-shim/es6-shim.js',
            conf.path.src('index.spec.js'),
            conf.path.src('**/*.html')
        ],
        preprocessors: {
            [conf.path.src('index.spec.js')]: [
                'webpack'
            ],
            [conf.path.src('**/*.html')]: [
                'ng-html2js'
            ]
        },
        ngHtml2JsPreprocessor: {
            stripePrefix: '${conf.paths.src}/'
        },
        reporters: ['progress', 'coverage'],
        coverageReporter: {
            type: 'html',
            dir: 'coverage/'
        },
        webpack: require('./webpack-test.conf'),
        webpackMiddleware: {
                noInfo: true
        },
        plugins: [
            require('karma-jasmine'),
            require('karma-junit-reporter'),
            require('karma-coverage'),
            require('karma-phantomjs-launcher'),
            require('karma-phantomjs-shim'),
            require('karma-ng-html2js-preprocessor'),
            require('karma-webpack')
        ]
    };
    config.set(configuration);
};
const webpack=require('webpack');
    const conf=require('./gulp.conf');
    const path=require('path');
    const HtmlWebpackPlugin=require('html-webpack-plugin');
    const FailPlugin=require('webpack-fail-plugin');
    const ExtractTextPlugin=require('extract-text-webpack-plugin');
    const pkg=require('../package.json');
    const autoprefixer=require('autoprefixer');
    module.exports={
        module: {
            loaders:[
            {
                test: /.json$/,
                loaders:[
const path=require ('path');
    const gulp=require('gulp');
    const del=require('del');
    const filter=require('gulp-filter');
    const conf=require('../conf/gulp.conf');
    gulp.task('clean',clean);
    gulp.task('other',other);
    function clean( ) {
        return del([conf.paths.dist, conf.paths.tmp]);
    }
    function other( ) {
        const fileFilter=filter(file=>file.stat.isFile( ));
    return gulp.src([
        path.join(conf.paths.src, '/**/*'),
        path.join('!$(conf.paths.src}','/**/*.{scss,js,html}')
    ])
```

A code snippet of the report generation module 2811 executed by the processor 2801 of the invoice analytics system 2603 for generating the interactive, dynamic, and searchable invoice analytics report comprising graphical data representations of purchase patterns, outliers, variations, and predictive analytics for the entity over the predefined time duration at the predefined time intervals based on the invoice analytics of the extracted and segmented invoice line item data is disclosed below:

---

```
[{"category":"linen",
 "phase":"reconciliation",
 "lineItem":"Baby Blanket",
 "facility":{
      "id":0,
      "name":"Ochsner Satellite",
      "address":"",
      "city":"",
      "state":""},
 "entries":[{"date":"5/7/17","location":"Baby Blanket","description":"BaBy Blanket","invoice_price":"0.45","contract_price":0,"quantity":"3","impact":1.35,"totalspend":1.35,"pct":"","status":"offContract"},
            {"date":"6/7/17","location":"Baby Blanket","description":"BaBy Blanket","invoice_price":"0.45","contract_price":0,"quantity":"3","impact":1.35,"totalspend":1.35,"pct":"","status":"offContract"},
            {"date":"7/5/17","location":"Baby Blanket","description":"Baby Blanket","invoice_price":"0.45","contract_price":0,"quantity":"3","impact":1.35,"totalspend":1.35,"pct":"","status":"offContract"},
            {"date":"8/7/17","location":"Baby Blanket","description":"Baby Blanket","invoice_price":"0.45","contract_price":0,"quantity":"3","impact":1.35,"totalspend":1.35,"pct":"","status":"offContract"},
            {"date":"9/11/17","location":"Baby Blanket","description":"Baby Blanket","invoice_price":"0.45","contract_price":0,"quantity":"3","impact":1.35,"totalspend":1.35,"pct":"","status":"offContract"},
            {"date":"10/8/17","location":"Baby Blanket","description":"Baby Blanket","invoice_price":"0.45","contract_price":0,"quantity":"6","impact":2.7,"totalspend":2.7,"pct":"","status":"offContract"},
            {"date":"11/8/17","location":"Baby Blanket","description":"Baby Blanket","invoice_price":"0.45","contract_price":0,"quantity":"6","impact":2.7,"totalspend":2.7,"pct":"","status":"offContract"}
 ]
}]
```

---

A code snippet the data communication module 2804, the database creation module 2805, and the data extraction module 2806 executed by the processor 2801 of the invoice analytics system 2603 for receiving a contract and an invoice, extracting contract line item data and invoice line item data from the received contract and the received invoice respectively, and creating the contract line item database 205 and the invoice line item database 203 is disclosed below:

---

```
var fs = require('fs');
const csv=require('csvtojson')
const _ = require('underscore');
var moment = require('moment');
var json2csv = require('json2csv');
let map = [ ];
let mapHash = { };
let invoiceItems = [ ];
let contractItems = [ ];
let contractFacilities = [ ];
function read_map(file, cb) {
 csv( )
 .fromFile(file)
 .on('json',(jsonObj)=>{
  map.push(jsonObj);
  mapHash[jsonObj.Facility] = jsonObj;
 })
 .on('done',(error)=>{
  cb( );
 });
}
function read_contract(file, category, cb) {
 csv( )
 .fromFile('./idata/Ochsner/companyS/'+file+'.csv')
```

```
    .on('json',(jsonObj)=>{
     if (jsonObj.Description != null && jsonObj.Description != '') {
      var tObj = { };
      tObj.Price = clean(jsonObj['Contract Pricing']);
      tObj.Units = jsonObj.Units.replace(/,/g, '');
      tObj.Description = jsonObj.Description.replace(/,/g, '');
      tObj.Category = category;
      contractItems.push(tObj);
     }
    })
    .on('done',(error)=>{
     cb( );
    });
   }
   function read_contract_costs(file, category, cb) {
    csv( )
    .fromFile('./data/Inova/'+file+'.csv')
    .on('json',(jsonObj)=>{
     if (jsonObj.Location != null && jsonObj.Location != '') {
      var tObj = { };
      tObj.Price = clean(jsonObj.Price);
      tObj.Category = category;
      tObj.FacilityId = jsonObj.FacilityId;
      tObj.IsAcute = jsonObj.IsAcute;
      tObj.BillTo = jsonObj.BillTo;
      contractFacilities.push(tObj);
     }
    })
    .on('done',(error)=>{
     cb( );
    });
   }
   function read_contract_fees(file, category, cb) {
    csv( )
    .fromFile('./data/Inova/'+file+'.csv')
    .on('json',(jsonObj)=>{
     if (jsonObj.Description != null && jsonObj.Description != '') {
      var tObj = { };
      tObj.Description = jsonObj.Description;
      tObj.Price = clean(jsonObj.Price);
      tObj.Units = jsonObj.Units;
      tObj.Category = jsonObj.Category;
      tObj.Type = category;
      contractItems.push(tObj);
     }
    })
    .on('done',(error)=>{
     cb( );
    });
   }
   function clean(v) {
    return parseFloat(v.replace(/,/g, '').replace('$', ''));
   }
   function lookup_facilityid(location) {
    let facility = mapHash[location];
    if(facility != null)
     return facility.FacilityId;
    return null;
   }
   function read_invoice(asof, cb) {
    csv( )
    .fromFile('./data/ochsner/linen/invoice-'+asof+'.csv')
    .on('json',(jsonObj)=>{
     if (jsonObj.Location != null &&
         jsonObj.Location != '' &&
         jsonObj.Description != null &&
         jsonObj.Description != '') {
      tObj = { };
      tObj.InvoiceDate = jsonObj.InvoiceDate; //moment(jsonObj.InvoiceDate,
   "MM/DD/YYYY").format("YYYY-MM-DD");
      tObj.Quantity = parseFloat(jsonObj.Quantity);
      tObj.Price = clean(jsonObj.Amount);
      tObj.Amount = clean(jsonObj.Amount);
      tObj.Description = jsonObj.Description.replace(/,/g, '');
      tObj.Location = jsonObj.Location.replace(/,/g, '');
      tObj.FacilityId = lookup_facilityid(jsonObj.Location);
      tObj.Source = 'linens';
      invoiceItems.push(tObj);
     }
```

```
})
  .on('done',(error)=>{
    cb( );
  });
}
function persist(data, filename) {
  fs.writeFile(filename, data, function (err) {
    if (err) console.log(err);
  });
}
read_map('./data/ochsner/companyS/map.csv', function( ) {
  read_invoice('all', function( ) {
    persist(json2csv({ data: invoiceItems, quotes: "", hasCSVColumnTitle: false }),
'db/ochsner/linens/invoices.csv')
    persist(json2csv({ data: invoiceItems, quotes: ""}), 'db/ochsner/linens/invoices2.csv')
  });
  /*read_contract_costs('costperpound', '', function( ) {
    read_contract_fees('feeschedule', '', function( ) {
      persist(json2csv({ data: contractItems, quotes: "", hasCSVColumnTitle: false }),
'db/ochsner/dietary/contracts-item.csv')
      persist(json2csv({ data: contractItems, quotes: "" }), 'db/ochsner/dietary/contracts-
item2.csv')
    });
  });*/
});
```

Another code snippet for the data communication module 2804, the database creation module 2805, the data extraction module 2806, the reconciliation module 2808, the invoice analytics engine 2810, the report generation module 2811, the spend computation module 2812 executed by the processor 2801 of the invoice analytics system 2603 for a vendor is disclosed below:

```
var fs = require('fs');
const csv=require('csvtojson')
const _ = require('underscore');
var moment = require('moment');
var json2csv = require('json2csv');
let lineItems = [ ];
let contractItems = [ ];
let contractItemsNonFacility = { };
let addresses = { };
function read_addresses(cb) {
  csv( )
  .fromFile('./db/addresses2.csv')
  .on('json',(jsonObj)=>{
    addresses[jsonObj.facilityid] = jsonObj;
  })
  .on('done',(error)=>{
    cb( );
  });
}
function read_contract(cb) {
  csv( )
  .fromFile('./db/contracts-facility2.csv')
  .on('json',(jsonObj)=>{
    contractItems.push(jsonObj);
  })
  .on('done',(error)=>{
    cb( );
  });
}
function read_contract_non_facility(cb) {
  csv( )
  .fromFile('./db/contracts-item2.csv')
  .on('json',(jsonObj)=>{
    contractItemsNonFacility[jsonObj.Description] = jsonObj;
  })
  .on('done',(error)=>{
    cb( );
  });
}
function parse(file, cb) {
  csv( )
```

```
      .fromFile(file)
      .on('json',(jsonObj)=>{
        lineItems.push(jsonObj);
      })
      .on('done',(error)=>{
        cb( );
      });
}
function persist(data, filename) {
  fs.writeFile(filename, JSON.stringify(data), function (err) {
    if (err) console.log(err);
  });
}
function bunch(name, onef, fid, facilityItems) {
  let r = { };
  r.category = 'linen';
  r.phase = 'reconciliation';
  r.lineItem = name;
  let address = addresses[fid];
  r.facility = {
    id: fid,
    name: address.name,
    address: address.address,
    city: address.city,
    state: address.state,
    zip: address.zip
  };
  r.entries = [ ];
  for(var i = 0; i < facilityItems.length; i++) {
    let hit = contractItemsNonFacility[facilityItems[i].Description];
    let c = {
      date: facilityItems[i].InvoiceDate,
      location: facilityItems[i].Location,
      description: facilityItems[i].Description,
      invoice_price: facilityItems[i].Price,
      contract_price: (hit) ? hit.Price : 0.0,
      quantity: facilityItems[i].Quantity,
    };
    c.impact = parseFloat((c.invoice_price * c.quantity).toFixed(2));
    c.totalspend = parseFloat((c.invoice_price * c.quantity).toFixed(2));
    c.pct = '';
    if (hit) {
      if (c.invoice_price == c.contract_price)
        c.status = 'onContractOnPrice';
      else
        c.status = 'onContractOffPrice';
    } else {
      c.status = 'offContract';
    }
    r.entries.push(c);
  }
  /*
  if (integrated) {
    let cTotal = _.pluck(r.entries, 'contract_price');
    let iTotal = _.pluck(r.entries, 'invoice_price');
    var cSum = _.reduce(cTotal, function(memo,obj){ return memo + parseFloat(obj); }, 0
);
    var iSum = _.reduce(iTotal, function(memo,obj){ return memo + parseFloat(obj); }, 0
);
    r.metric = (iSum - cSum);
    r.metricType = '$';
    if (r.metric > 0.0) {
      r.status = 'onContractOffPrice';
    } else {
      r.status = 'onContractOnPrice';
    }
  } else {
    let iTotal = _.pluck(r.entries, 'invoice_price');
    var iSum = _.reduce(iTotal, function(memo,obj){ return memo + parseFloat(obj); }, 0
);
    r.metric = iSum;
    r.metricType = '$';
    r.status = 'offContract';
  }
  */
  return r;
}
function wrangle(items) {
  let results = [ ];
```

```
    let uniqItems = __.uniq(__.pluck(items, 'Description'));
    for(var z = 0; z < uniqItems.length; z++) {
      let one=uniqItems[z];
      let theseItems = __.filter(items, function(i) { return i.Description==one; });
      let facilities = __.uniq(__.pluck(theseItems, 'Location'));
      for(var q = 0; q < facilities.length; q++) {
        let onef = facilities[q];
        let facilityItems = __.filter(theseItems, function(i){return i.Location==onef});
        let fid = facilityItems[0].FacilityId;
        if (fid < 1 || fid > 8) {
          fid = 0;
          onef = 'Satellite';
        }
        results.push(bunch(one, onef, fid, facilityItems));
      }
      results.push(bunch(one, 'All', -1, theseItems));
    }
    return results;
  }
  read_addresses(function( ) {
    read_contract(function( ) {
      read_contract_non_facility(function( ) {
        parse('./db/ochsner/linens/invoices2.csv', function( ) {
          //wrangle(lineItems);
          persist(wrangle(lineItems), './db/export/ochsner/linens/linens.json');
        });
      });
    });
  });
```

In an embodiment, the invoice analytics system 2603 implements business analytics services, for example, provided by Microsoft® Power BI®, that aid in modeling the extracted and segmented invoice line item data and the extracted contract line item data of the entity for use by the invoice analytics engine 2810. The business analytics services also aid in authoring of interactive reports and interfaces, for example, the interactive, dynamic, and searchable, invoice analytics report, the utilization validation interface, the reconciliation report, the utilization report, the optimization report, the cost savings opportunity report, etc. The business analytics services also provide advanced analytics to render the interactive reports and interfaces with business service transactional invoice data.

In an embodiment, the invoice analytics system 2603 receives the extracted and segmented invoice line item data and the extracted contract line item data from a data storage repository, for example, the raw store 2703 exemplarily illustrated in FIG. 27, in the data lake architecture as disclosed in the detailed description of FIG. 27. In an embodiment, the contract line item database 205 and the invoice line item database 203 source the stored contract line item data and the stored invoice line item data to the raw store 2703. The invoice analytics system 2603 interacts with the other databases, for example, the benchmarking database 2825 and the external database 2826 via the network 2822. In an embodiment, the benchmarking database 2825 and the external database 2826 are configured as cloud based databases implemented in a cloud computing environment, where computing resources are delivered as a service over the network 2822. In another embodiment, the contract terms database 2814, the contract line item database 205, the invoice aggregation database 2813, the invoice line item database 203, the benchmarking database 2825, and the external database 2826 are implemented as a data lake 2827.

Computer applications and programs are used for operating the invoice analytics system 2603. The programs are loaded onto the fixed media drive 2819 and into the memory unit 2803 of the invoice analytics system 2603 via the removable media drive 2820. In an embodiment, the computer applications and programs are loaded into the memory unit 2803 directly via the network 2822. The processor 2801 executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., the Palm OS®, the Solaris operating system developed by Sun Microsystems, Inc., the Android® operating system of Google Inc., the Windows Phone® operating system of Microsoft Corporation, the iOS operating system of Apple Inc., the Symbian™ operating system of Symbian Foundation Limited, etc. The invoice analytics system 2603 employs the operating system for performing multiple tasks. The operating system is responsible for management and coordination of activities and sharing of resources of the invoice analytics system 2603. The operating system further manages security of the invoice analytics system 2603, peripheral devices connected to the invoice analytics system 2603, and network connections. The operating system employed on the invoice analytics system 2603 recognizes, for example, inputs provided by a user of the invoice analytics system 2603 using one of the input devices 2818, the output devices 2821, files, and directories stored locally on the fixed media drive 2819. The operating system on the invoice analytics system 2603 executes different programs using the processor 2801. The processor 2801 and the operating system together define a computer platform for which application programs in high level programming languages are written.

The processor 2801 retrieves instructions defined by the data communication module 2804, the database creation module 2805, the data extraction module 2806, the quick view interface generation module 2807, the reconciliation module 2808, the utilization validation module 2809, the invoice analytics engine 2810, the report generation module 2811, and the spend computation module 2812 of the invoice analytics system 2603, for performing respective functions disclosed above. The processor 2801 retrieves instructions for executing the modules, for example, 2804, 2805, 2806, 2807, 2808, 2809, 2810, 2811, 2812, etc., of the invoice analytics system 2603 from the memory unit 2803. A program counter determines the location of the instructions in the memory unit 2803. The program counter stores a number that identifies the current position in the program of each of the modules, for example, 2804, 2805, 2806, 2807, 2808, 2809, 2810, 2811, 2812, etc., of the invoice analytics system 2603. The instructions fetched by the processor 2801 from the memory unit 2803 after being processed are decoded. The instructions are stored in an instruction register in the processor 2801. After processing and decoding, the processor 2801 executes the instructions, thereby performing one or more processes defined by those instructions.

At the time of execution, the instructions stored in the instruction register are examined to determine the operations to be performed. The processor 2801 then performs the specified operations. The operations comprise arithmetic operations and logic operations. The operating system performs multiple routines for performing a number of tasks required to assign the input devices 2818, the output devices 2821, and the memory unit 2803 for execution of the modules, for example, 2804, 2805, 2806, 2807, 2808, 2809, 2810, 2811, 2812, etc., of the invoice analytics system 2603. The tasks performed by the operating system comprise, for example, assigning memory to the modules, for example, 2804, 2805, 2806, 2807, 2808, 2809, 2810, 2811, 2812, etc., of the invoice analytics system 2603 and to data used by the invoice analytics system 2603, moving data between the memory unit 2803 and disk units, and handling input/output operations. The operating system performs the tasks on request by the operations and after performing the tasks, the operating system transfers the execution control back to the processor 2801. The processor 2801 continues the execution to obtain one or more outputs. In an embodiment, the outputs of the execution of the modules, for example, 2804, 2805, 2806, 2807, 2808, 2809, 2810, 2811, 2812, etc., of the invoice analytics system 2603 are displayed to a user of the invoice analytics system 2603 on the display unit 2802 via the graphical user interface (GUI) 2802a and/or through the output devices 2821 on the GUI 2605a of the entity device 2605.

For purposes of illustration, the detailed description refers to the invoice analytics system 2603 being run locally as a single computer system; however the scope of the method and system 2600 disclosed herein is not limited to the invoice analytics system 2603 being run locally as a single computer system via the operating system and the processor 2801, but may be extended to run remotely over the network 2822 by employing a web browser and a remote server, a mobile phone, or other electronic devices. In an embodiment, one or more portions of the invoice analytics system 2603 are distributed across one or more computer systems (not shown) coupled to the network 2822.

The non-transitory computer readable storage medium disclosed herein stores computer program codes comprising instructions executable by at least one processor 2801 for analyzing business service transactional invoice data of an entity and performing invoice analytics for the entity in real time. The computer program codes comprise a first computer program code for receiving multiple contracts comprising agreement information on the business service transactions between the entity and one or more vendors from one or more data sources 2824 and creating a contract terms database 2814 for storing the received contracts by vendor; a second computer program code for extracting contract line item data from the received contracts and creating a contract line item database 205 for storing the extracted contract line item data; a third computer program code for transforming the extracted contract line item data into a quick view format and generating and rendering a contract quick view interface on the graphical user interface 2605a of the entity device 2605; a fourth computer program code for receiving multiple invoices comprising business service transactional invoice data corresponding to the business service transactions between the entity and one or more vendors from the data sources 2824 and aggregating the business service transactional invoice data by vendor and by a predefined time duration in the invoice aggregation database 2813; a fifth computer program code for extracting and segmenting invoice line item data from the aggregated business service transactional invoice data and creating an invoice line item database 203 for storing the extracted and segmented invoice line item data; a sixth computer program code for identifying, detailing, and outlining billing pricing errors, contract compliance errors, and off-contract business service items from the extracted and segmented invoice line item data with reference to the extracted contract line item data for predefined time intervals automatically in real time using the created invoice line item database 203 and the created contract line item database 205; a seventh computer program code for rectifying the identified, detailed, and outlined billing pricing errors and contract compliance errors, and resolving the off-contract business service items in real time to reconcile the received invoices in accordance with the received contracts at predefined time intervals; an eighth computer program code for performing the invoice analytics on the extracted and segmented invoice line item data with supplementary data for price and utilization optimization of business services and benchmarking in real time for cost savings in communication with the operational system 2823 of the entity on reconciliation of the received invoices; and a tenth computer program code for generating an interactive, dynamic, and searchable invoice analytics report comprising graphical data representations of purchase patterns, outliers, variations, and predictive analytics for the entity over the predefined time duration at the predefined time intervals based on the invoice analytics of the extracted and segmented invoice line item data.

The eighth computer program code comprises a ninth computer program code for computing the cost savings for the entity, in communication with the external database 2826, based on analytics criteria comprising the identified billing pricing errors, the contract compliance errors, and the off-contract business service items; and in an embodiment, a twelfth computer program code for benchmarking the contract line item data and the invoice line item data using the benchmarking database 2825 in real time for determining avenues for cost savings in the business service transactions; and a thirteenth computer program code for performing a comparative analysis of the extracted and segmented invoice line item data from the received invoices of each of at least two vendors in a similar category of the business services at the predefined time intervals for determining pricing gaps between the vendors and cost reduction and utilization optimization opportunities per the extracted and segmented invoice line item data.

The computer program codes further comprise an eleventh computer program code for generating a utilization validation interface that links to the operational system 2823 of the entity for validating utilization of the business services on the reconciliation of the received invoices. The computer program codes further comprise a fourteenth computer program code for generating a feed report comprising the extracted and segmented invoice line item data by category of the business services, by the vendor, and by the predefined time duration; and a fifteenth computer program code for computing a total spend for each of the business services over the predefined time duration using the extracted and segmented invoice line item data and rendering the computed total spend in the generated interactive, dynamic, and searchable invoice analytics report.

The computer program codes further comprise one or more additional computer program codes for performing additional steps that may be required and contemplated for analyzing business service transactional invoice data of an entity and performing invoice analytics for the entity in real time. In an embodiment, a single piece of computer program code comprising computer executable instructions performs one or more steps of the method disclosed herein for analyzing business service transactional invoice data of an entity and performing invoice analytics for the entity in real time. The computer program codes comprising computer executable instructions are embodied on the non-transitory computer readable storage medium. The processor 2801 of the invoice analytics system 2603 retrieves these computer executable instructions and executes them. When the computer executable instructions are executed by the processor 2801, the computer executable instructions cause the processor 2801 to perform the steps of the method for analyzing business service transactional invoice data of an entity and performing invoice analytics for the entity in real time.

It will be readily apparent in different embodiments that the various methods, algorithms, and computer programs disclosed herein are implemented on non-transitory computer readable storage media appropriately programmed for computing devices. The non-transitory computer readable storage media participate in providing data, for example, instructions that are read by a computer, a processor or a similar device. In different embodiments, the "non-transitory computer readable storage media" also refer to a single medium or multiple media, for example, a centralized database, a distributed database, and/or associated caches and servers that store one or more sets of instructions that are read by a computer, a processor or a similar device. The "non-transitory computer readable storage media" also refer to any medium capable of storing or encoding a set of instructions for execution by a computer, a processor or a similar device and that causes a computer, a processor or a similar device to perform any one or more of the methods disclosed herein. Common forms of the non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in a number of manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used comprise C, C++, C#, Java®, JavaScript®, Fortran, Ruby, Perl®, Python®, Visual Basic®, hypertext preprocessor (PHP), Microsoft® .NET, Microsoft® Power BI®, Objective-C®, etc. Other object-oriented, functional, scripting, and/or logical programming languages can also be used. In an embodiment, the computer program codes or software programs are stored on or in one or more mediums as object code. In another embodiment, various aspects of the method and the invoice analytics system 2603 disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. In another embodiment, various aspects of the method and the invoice analytics system 2603 disclosed herein are implemented as programmed elements, or non-programmed elements, or any suitable combination thereof.

Where databases are described such as the contract terms database 2814, the contract line item database 205, the invoice aggregation database 2813, the invoice line item database 203, the benchmarking database 2825, and the external database 2826, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the invoice analytics system 2603, the databases are integrated to communicate with each other for enabling simultaneous updates of data linked across the databases, when there are any updates to the data in one of the databases.

The method and the invoice analytics system 2603 disclosed herein can be configured to work in a network environment comprising one or more computers that are in communication with one or more devices via the network 2822. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to the network 2822. Each of the computers and the devices executes an operating system, examples of which are disclosed above. While the operating system may differ depending on the type of computer, the operating system provides the appropriate communications protocols to establish communication links with the network 2822. Any number and type of machines may be in communication with the computers.

The method and the invoice analytics system 2603 disclosed herein are not limited to a particular computer system platform, processor, operating system, or network. In an embodiment, one or more aspects of the method and the invoice analytics system 2603 disclosed herein are distributed among one or more computer systems, for example, servers configured to provide one or more services to one or more client computers, or to perform a complete task in a distributed system. For example, one or more aspects of the method and the invoice analytics system 2603 disclosed herein are performed on a client-server system that comprises components distributed among one or more server systems that perform multiple functions according to various embodiments. These components comprise, for example, executable, intermediate, or interpreted code, which communicate over the network 2822 using a communication protocol. The method and the invoice analytics system 2603 disclosed herein are not limited to be executable on any particular system or group of systems, and are not limited to any particular distributed architecture, network, or communication protocol.

The foregoing examples have been provided merely for the purpose of explanation and are in no way to be construed as limiting of the method and the invoice analytics system 2603 disclosed herein. While the method and the invoice analytics system 2603 have been described with reference to various embodiments, it is understood that the words, which have been used herein, are words of description and illustration, rather than words of limitation. Furthermore, although the method and the invoice analytics system 2603 have been described herein with reference to particular means, materials, and embodiments, the method and the invoice analytics system 2603 are not intended to be limited to the particulars disclosed herein; rather, the method and the invoice analytics system 2603 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the method and the invoice analytics system 2603 disclosed herein in their aspects.

I claim:

1. A method for analyzing business service transactional invoice data of an entity and performing invoice analytics for said entity in real time, said method comprising:

providing an invoice analytics system comprising at least one processor configured to execute computer program instructions, wherein said invoice analytics system is implemented using a data lake architecture, wherein the data lake architecture provides multiple methods to query data in a raw store, wherein the raw store stores multi-structured data from one or more data sources, wherein coherent invoice line item data available in the raw store is utilized along with deep learning algorithms to recognize invoice line item data for powering real time decision analytics of the entity, wherein the data lake architecture integrates ingested contract line item data and invoice line item data with historical data to generate a complete insight on total spend of the entity for different business services for a predefined duration of time, wherein the data lake architecture stores extracted contract line item data and extracted and segmented invoice line item data in a raw format in the raw store for indefinite periods of time and fetches data from the raw store while performing the invoice analytics, and wherein the data lake architecture allows for loading of data from the raw store and parallel processing, resulting in a generation of an interactive, dynamic, and searchable invoice analytics report;

receiving invoices and corresponding services contracts from one or more of said data sources at an ingestion endpoint of said invoice analytics system implemented using said data lake architecture;

creating a contract terms database comprising specific financial terms from the received services contracts for reconciling the received invoices to agreed upon contract terms in the received services contracts and aggregating the business service transactional invoice data of the received invoices in an invoice aggregation database of said invoice analytics system implemented using said data lake architecture;

transforming ingested data into a raw store, by said invoice analytics system implemented using said data lake architecture, by extracting the contract line item data from the received services contracts and extracting and segmenting the invoice line item data from the aggregated business service transactional invoice data, and storing the extracted contract line item data and the extracted and segmented invoice line item data in the raw store via a queue;

implementing platform governance on the raw store of said invoice analytics system implemented using said data lake architecture in communication with a view database, wherein implementing said platform governance comprises monitoring quality of the ingested data, ensuring comprehensive data categorization, monitoring authorization of access of the raw store, monitoring protection of sensitive data using masking, and performing quota management of the extracted contract line item data and the extracted and segmented invoice line item data stored in the raw store;

transforming the ingested data into a metadata store, by said invoice analytics system implemented using said data lake architecture, by cataloging the ingested data, and storing the cataloged data in the metadata store;

performing reconciliation, optimization, and intelligence on said data stored in said raw store and said metadata store, by said invoice analytics system implemented using said data lake architecture, to generate the interactive, dynamic, and searchable invoice analytics report, wherein performing said reconciliation, said optimization, and said intelligence comprises generating a search database comprising search terms used to search the raw store based on the query;

storing in the view database of said invoice analytics system implemented using said data lake architecture views generated using different queries on the raw store;

at a consumption end point of said invoice analytics system implemented using said data lake architecture, performing steps comprising:

transforming the extracted and segmented invoice line item data into a feed report, by said invoice analytics system implemented using said data lake architecture, wherein the feed report is generated from the extracted and segmented invoice line item data based on category of the business services, based on vendors, and based on the predefined duration of time;

benchmarking the contract line item data and the invoice line item data using a benchmarking database of said invoice analytics system implemented using said data lake architecture in real time for determining avenues for cost savings in business service transactions; and transforming the determined avenues for the cost savings in the business service transactions between the entity and the vendors into a benchmark report, by said invoice analytics system implemented using said data lake architecture.

2. The method of claim 1, wherein said invoice analytics comprises:
computing said cost savings for said entity by said invoice analytics system, in communication with an external database, based on analytics criteria comprising identified billing pricing errors, contract compliance errors, and off-contract business service items.

3. The method of claim 2, wherein said analytics criteria further comprises cost reduction opportunities and utilization optimization opportunities per said extracted and segmented invoice line item data.

4. The method of claim 1, wherein said contract line item data comprises pricing, operational information, quality information, payment information of said business service transactions recited in said received services contracts, and financial data that impacts line item pricing for business services spend of said entity, and wherein said invoice line item data comprises pricing, operational information, quality information, and payment information of said business service transactions between said entity and said vendors.

5. The method of claim 1, wherein said invoice analytics further comprises performing a comparative analysis of said extracted and segmented invoice line item data from said received invoices of each of at least two vendors in a similar category of said business services over said predefined duration of time, by said invoice analytics system for determining pricing gaps between said at least two vendors and cost reduction and utilization optimization opportunities per said extracted and segmented invoice line item data.

6. The method of claim 1, further comprising computing said total spend for each of said business services over said predefined time duration by said invoice analytics system using said extracted and segmented invoice line item data, and rendering said computed total spend in said generated interactive, dynamic, and searchable invoice analytics report by said invoice analytics system.

7. The method of claim 1, wherein said business services comprise professional services, purchased services, and outsourced services, and wherein said business service transactions comprise professional service transactions, purchased service transactions, and outsourced service transactions.

8. An invoice analytics system for analyzing business service transactional invoice data of an entity and performing invoice analytics for said entity in real time, said invoice analytics system comprising:

a non-transitory computer readable storage medium configured to store computer program instructions for execution by at least one processor of said invoice analytics system, wherein said invoice analytics system is implemented using a data lake architecture, wherein the data lake architecture provides multiple methods to query data in a raw store, wherein the raw store stores multi-structured data from one or more data sources, wherein coherent invoice line item data available in the raw store is utilized along with deep learning algorithms to recognize invoice line item data for powering real time decision analytics of the entity, wherein the data lake architecture integrates ingested contract line item data and invoice line item data with historical data to generate a complete insight on total spend of the entity for different business services for a predefined duration of time, wherein the data lake architecture stores extracted contract line item data and extracted and segmented invoice line item data in a raw format in the raw store for indefinite periods of time and fetches data from the raw store while performing the invoice analytics, and wherein the data lake architecture allows for loading of data from the raw store and parallel processing, resulting in generation of an interactive, dynamic, and searchable invoice analytics report; and said least one processor communicatively coupled to said non-transitory computer readable storage medium, said at least one processor configured to execute said computer program instructions comprising:

receiving invoices and corresponding services contracts from one or more of said data sources at an ingestion endpoint of said invoice analytics system implemented using said data lake architecture;

creating a contract terms database comprising specific financial terms from the received services contracts for reconciling the received invoices to agreed upon contract terms in the received services contracts and aggregating the business service transactional invoice data of the received invoices in an invoice aggregation database of said invoice analytics system implemented using said data lake architecture;

transforming ingested data into a raw store, by said invoice analytics system implemented using said data lake architecture, by extracting the contract line item data from the received services contracts and extracting and segmenting the invoice line item data from the aggregated business service transactional invoice data, and storing the extracted contract line item data and the extracted and segmented invoice line item data in the raw store via a queue;

implementing platform governance on the raw store of said invoice analytics system implemented using said data lake architecture in communication with a view database, wherein implementing said platform governance comprises monitoring quality of the ingested data, ensuring comprehensive data categorization, monitoring authorization of access of the raw store, monitoring protection of sensitive data using masking, and performing quota management of the extracted contract line item data and the extracted and segmented invoice line item data stored in the raw store;

transforming the ingested data into a metadata store by cataloging the ingested data, by said invoice analytics system implemented using said data lake architecture, and storing the cataloged data in the metadata store;

performing reconciliation, optimization, and intelligence on said data stored in said raw store and said metadata store, by said invoice analytics system implemented using said data lake architecture, to generate the interactive, dynamic, and searchable invoice analytics report, wherein performing said reconciliation, said optimization, and said intelligence comprises generating a search database comprising search terms used to search the raw store based on the query;

storing in the view database of said invoice analytics system implemented using said data lake architecture views generated using different queries on the raw store;

storing in the view database of said invoice analytics system implemented using said data lake architecture views generated using different queries on the raw store;

transforming the extracted and segmented invoice line item data into a feed report, at the consumption end point of said invoice analytics system implemented using said data lake architecture, by said invoice analytics system, wherein the feed report is generated from the extracted and segmented invoice line item data based on category of the business services, based on vendors, and based on the predefined duration of time;

benchmarking the contract line item data and the invoice line item data in real time, at the consumption end point of said invoice analytics system implemented using said data lake architecture, using a benchmarking database of said invoice analytics system, for determining avenues for cost savings in business service transactions; and transforming, by said invoice analytics system, the determined avenues for the cost savings in the business service transactions between the entity and the vendors into a benchmark report, at the consumption end point of said invoice analytics system implemented using said data lake architecture.

9. The invoice analytics system of claim 8, wherein said computer program instructions further comprise:

computing said cost savings for said entity, in communication with an external database, based on analytics criteria comprising identified billing pricing errors, contract compliance errors, and off-contract business service items.

10. The invoice analytics system of claim 8, wherein said computer program instructions further comprise performing a comparative analysis of said extracted and segmented invoice line item data from said received invoices of each of at least two vendors in a similar category of said business services over said predefined time duration for determining pricing gaps between said at least two vendors and cost reduction and utilization optimization opportunities per said extracted and segmented invoice line item data.

11. The invoice analytics system of claim 8, wherein said computer program instructions further comprise computing said total spend for each of said business services over said predefined time duration using said extracted and segmented invoice line item data and rendering said computed total spend in said generated interactive, dynamic, and searchable invoice analytics report.

12. The invoice analytics system of claim 8, wherein said contract line item data comprises pricing, operational information, quality information, and payment information of said business service transactions recited in said received services contracts, and financial data that impacts line item pricing for business services spend of said entity, and wherein said invoice line item data comprises pricing, operational information, quality information, and payment information of said business service transactions between said entity and said vendors.

13. A non-transitory computer readable storage medium having embodied thereon, computer program codes comprising instructions executable by at least one processor of an invoice analytics system implemented using a data lake architecture, for analyzing business service transactional invoice data of an entity and performing invoice analytics for said entity in real time, wherein the data lake architecture provides multiple methods to query data in a raw store, wherein the raw store stores multi-structured data from one or more data sources, wherein coherent invoice line item data available in the raw store is utilized along with deep learning algorithms to recognize invoice line item data for powering real time decision analytics of the entity, wherein the data lake architecture integrates ingested contract line item data and invoice line item data with historical data to generate a complete insight on total spend of the entity for different business services for a predefined duration of time, wherein the data lake architecture stores extracted contract line item data and extracted and segmented invoice line item data in a raw format in the raw store for indefinite periods of time and fetches data from the raw store while performing the invoice analytics, wherein the data lake architecture allows for loading of data from the raw store and parallel processing, resulting in generation of an interactive, dynamic, and searchable invoice analytics report, and wherein said computer program codes comprise:

a first computer program code for receiving invoices and corresponding services contracts from one or more of said data sources at an ingestion endpoint of said invoice analytics system implemented using said data lake architecture;

a second computer program code for creating a contract terms database comprising specific financial terms from the received services contracts for reconciling the received invoices to agreed upon contract terms in the received services contracts and aggregating the business service transactional invoice data of the received invoices in an invoice aggregation database of said invoice analytics system implemented using said data lake architecture;

a third computer program code for transforming ingested data into a raw store, by extracting the contract line item data from the received services contracts and extracting and segmenting the invoice line item data from the aggregated business service transactional invoice data, and storing the extracted contract line item data and the extracted and segmented invoice line item data in the raw store via a queue;

a fourth computer program code for implementing platform governance on the raw store of said invoice analytics system implemented using said data lake architecture in communication with a view database, wherein implementing said platform governance comprises monitoring quality of the ingested data, ensuring comprehensive data categorization, monitoring authorization of access of the raw store, monitoring protection of sensitive data using masking, and performing quota management of the extracted contract line item data and the extracted and segmented invoice line item data stored in the raw store;

a fifth computer program code for transforming the ingested data into a metadata store by cataloging the ingested data, and storing the cataloged data in the metadata store;

a sixth computer program code for performing reconciliation, optimization, and intelligence on said data stored in said raw store and said metadata store, to generate the interactive, dynamic, and searchable invoice analytics report, wherein performing said reconciliation, said optimization, and said intelligence comprises generating a search database comprising search terms used to search the raw store based on the query;

an seventh computer program code for storing in the view database of said invoice analytics system implemented using said data lake architecture views generated using different queries on the raw store;

an eighth computer program code for performing steps at a consumption end point, comprising:

transforming the extracted and segmented invoice line item data into a feed report, wherein the feed report is generated from the extracted and segmented invoice line item data based on category of the business services, based on vendors, and based on the predefined duration of time;

benchmarking the contract line item data and the invoice line item data in real time, using a benchmarking database of said invoice analytics system implemented using said data lake architecture, for determining avenues for cost savings in business service transactions; and transforming the determined avenues for the cost savings in the business service transactions between the entity and the vendors into a benchmark report.

14. The non-transitory computer readable storage medium of claim 13, wherein said computer program codes further comprise a ninth computer program code for computing said cost savings for said entity, in communication with an external database, based on analytics criteria comprising identified billing pricing errors, contract compliance errors, and off-contract business service items.

15. The non-transitory computer readable storage medium of claim 13, wherein said computer program codes further comprise a tenth computer program code for performing a comparative analysis of said extracted and segmented invoice line item data from said received invoices of each of at least two vendors in a similar category of said business services over said predefined duration of time for determining pricing gaps between said at least two vendors and cost reduction and utilization optimization opportunities per said extracted and segmented invoice line item data.

16. The non-transitory computer readable storage medium of claim 13, wherein said computer program codes further comprise an eleventh computer program code for computing said total spend for each of said business services over said predefined time duration using said extracted and segmented invoice line item data and rendering said computed total spend in said generated interactive, dynamic, and searchable invoice analytics report.

17. The non-transitory computer readable storage medium of claim 13, wherein said contract line item data comprises pricing, operational information, quality information, payment information of said business service transactions recited in said received services contracts, and financial data that impacts line item pricing for business services spend of said entity, and wherein said invoice line item data comprises pricing, operational information, quality information, and payment information of said business service transactions between said entity and said vendors.

* * * * *